(12) United States Patent
Szeto et al.

(10) Patent No.: US 10,719,129 B2
(45) Date of Patent: *Jul. 21, 2020

(54) COMPOUND HAPTIC EFFECTS USING MULTIMODAL TACTILE FEEDBACK ACTUATOR

(71) Applicant: NANOPORT TECHNOLOGY INC., Markham (CA)

(72) Inventors: Timothy Jing Yin Szeto, Mississauga (CA); Jeremy Zhi-Qiao Chan, Markham (CA); Kyle Crae Skippon, Santa Clara, CA (US)

(73) Assignee: NANOPORT TECHNOLOGY INC., Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,069

(22) Filed: Oct. 17, 2018

(65) Prior Publication Data

US 2019/0050056 A1 Feb. 14, 2019

Related U.S. Application Data

(63) Continuation-in-part of application No. PCT/CA2017/050756, filed on Jun. 21, 2017.
(Continued)

(51) Int. Cl.
*G06F 3/01* (2006.01)
*H01F 7/16* (2006.01)

(52) U.S. Cl.
CPC ........... *G06F 3/016* (2013.01); *H01F 7/1615* (2013.01)

(58) Field of Classification Search
CPC ............................. G06F 3/016; H01F 7/1615
See application file for complete search history.

(56) References Cited

U.S. PATENT DOCUMENTS 4,054,944 A 10/1977 Lau
4,195,277 A 3/1980 Leicht
(Continued)

FOREIGN PATENT DOCUMENTS

EP 2508960 A2 2/2012
EP 2725474 A2 5/2013
(Continued)

OTHER PUBLICATIONS

Apple's Haptic Tech is a Glimpse at the UI of the Future; from the Internet: http://www.wired.com/2015/03/apples-haptic-tech-makes-way-tomorrows-touchable-uis/.

*Primary Examiner* — Peter D McLoone
(74) *Attorney, Agent, or Firm* — Alexandre Daoust; Reno Lessard; Norton Rose Fulbright Canada LLP

(57) ABSTRACT

There is described a method of operating a tactile feedback actuator with a controller. The tactile feedback actuator has a magnetic hammer guidingly mounted for movement along a hammer path, a damper at a first end of the hammer path, a stopper at a second end of the hammer path, and a coil element. The method generally has receiving data indicative of coil activation instructions for moving the magnetic hammer to generate a sequence of haptic effects that simulate a real world event, the coil activation instructions including: a first instruction for generating a first haptic effect in which the magnetic hammer is accelerated towards the stopper, and a second instruction for generating a second haptic effect in which the magnetic hammer is accelerated towards the damper; and activating the coil element upon processing the data indicative of the coil activation instructions to generate the sequence of haptic effects.

20 Claims, 46 Drawing Sheets

Related U.S. Application Data

(60) Provisional application No. 62/627,960, filed on Feb. 8, 2018, provisional application No. 62/574,688, filed on Oct. 19, 2017.

(56) References Cited

U.S. PATENT DOCUMENTS

| | | |
|---|---|---|
| 4,527,469 A | 7/1985 | Wolf et al. |
| 4,658,646 A | 4/1987 | Bell et al. |
| 4,995,744 A | 2/1991 | Goldowsky et al. |
| 5,184,037 A | 2/1993 | Kobayashi et al. |
| 5,436,622 A | 7/1995 | Gutman et al. |
| 5,583,478 A | 12/1996 | Renzi |
| 6,100,655 A | 8/2000 | McIntosh |
| 6,982,696 B1 | 1/2006 | Shahoian |
| 7,204,581 B2 | 4/2007 | Peeters |
| 7,495,656 B2 | 2/2009 | Yuba et al. |
| 7,741,938 B2 | 6/2010 | Kramlich |
| 8,072,418 B2 | 12/2011 | Crawford et al. |
| 8,855,705 B2 | 10/2014 | Pasquero et al. |
| 8,866,774 B2 | 10/2014 | Leem et al. |
| 8,884,746 B1 | 11/2014 | Cho et al. |
| 9,157,460 B2 | 10/2015 | Joshi et al. |
| 9,716,423 B1 | 7/2017 | Szeto |
| 2002/0122029 A1 | 9/2002 | Murphy |
| 2003/0142845 A1 | 7/2003 | Miyamoto et al. |
| 2006/0146036 A1 | 7/2006 | Prados et al. |
| 2006/0197750 A1 | 9/2006 | Kerr et al. |
| 2010/0044121 A1 | 2/2010 | Simon et al. |
| 2011/0261083 A1 | 10/2011 | Wilson |
| 2012/0068835 A1 | 3/2012 | Li |
| 2012/0108299 A1 | 5/2012 | Yang et al. |
| 2012/0126941 A1 | 5/2012 | Coggill |
| 2012/0126959 A1* | 5/2012 | Zarrabi ............ B06B 1/0688 340/407.1 |
| 2013/0061170 A1 | 3/2013 | Friedlander et al. |
| 2013/0076646 A1 | 3/2013 | Krah et al. |
| 2013/0076649 A1 | 3/2013 | Myers et al. |
| 2013/0162667 A1 | 6/2013 | Eskolin et al. |
| 2013/0193693 A1 | 8/2013 | Marin et al. |
| 2013/0215061 A1 | 8/2013 | Rydenhag et al. |
| 2014/0110508 A1 | 4/2014 | Dames et al. |
| 2014/0125612 A1 | 5/2014 | Park et al. |
| 2014/0168135 A1 | 6/2014 | Saukko et al. |
| 2014/0258318 A1* | 9/2014 | Ullrich ............ G06F 16/683 707/758 |
| 2014/0317722 A1 | 10/2014 | Tartz et al. |
| 2014/0346901 A1 | 11/2014 | Hayward et al. |
| 2015/0109223 A1 | 4/2015 | Kessler et al. |
| 2015/0185944 A1 | 7/2015 | Magi et al. |
| 2015/0242675 A1 | 8/2015 | Pope et al. |
| 2015/0247548 A1 | 9/2015 | Battlogg et al. |
| 2015/0349619 A1 | 12/2015 | Degner et al. |
| 2016/0047433 A1 | 2/2016 | Bronowicki |
| 2016/0172953 A1 | 6/2016 | Degner et al. |
| 2016/0179338 A1 | 6/2016 | Miller |

FOREIGN PATENT DOCUMENTS

| | | |
|---|---|---|
| WO | 2010101577 A1 | 9/2010 |
| WO | 2015070321 A1 | 5/2015 |
| WO | 2016010180 A1 | 1/2016 |
| WO | 2016065482 A1 | 5/2016 |
| WO | 2017219137 A1 | 12/2017 |

\* cited by examiner

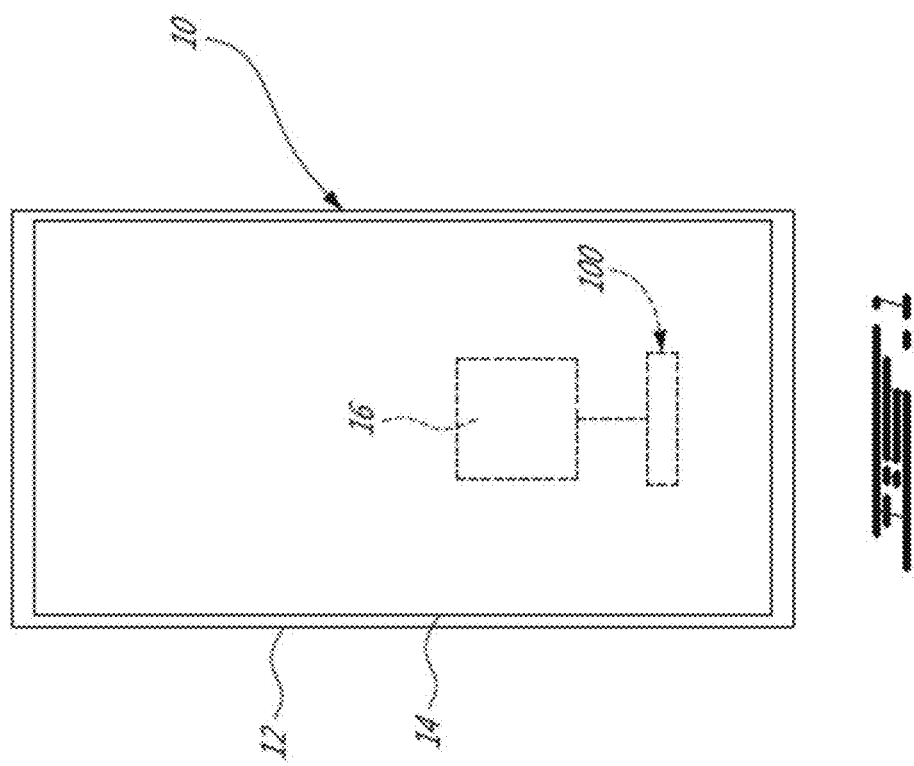

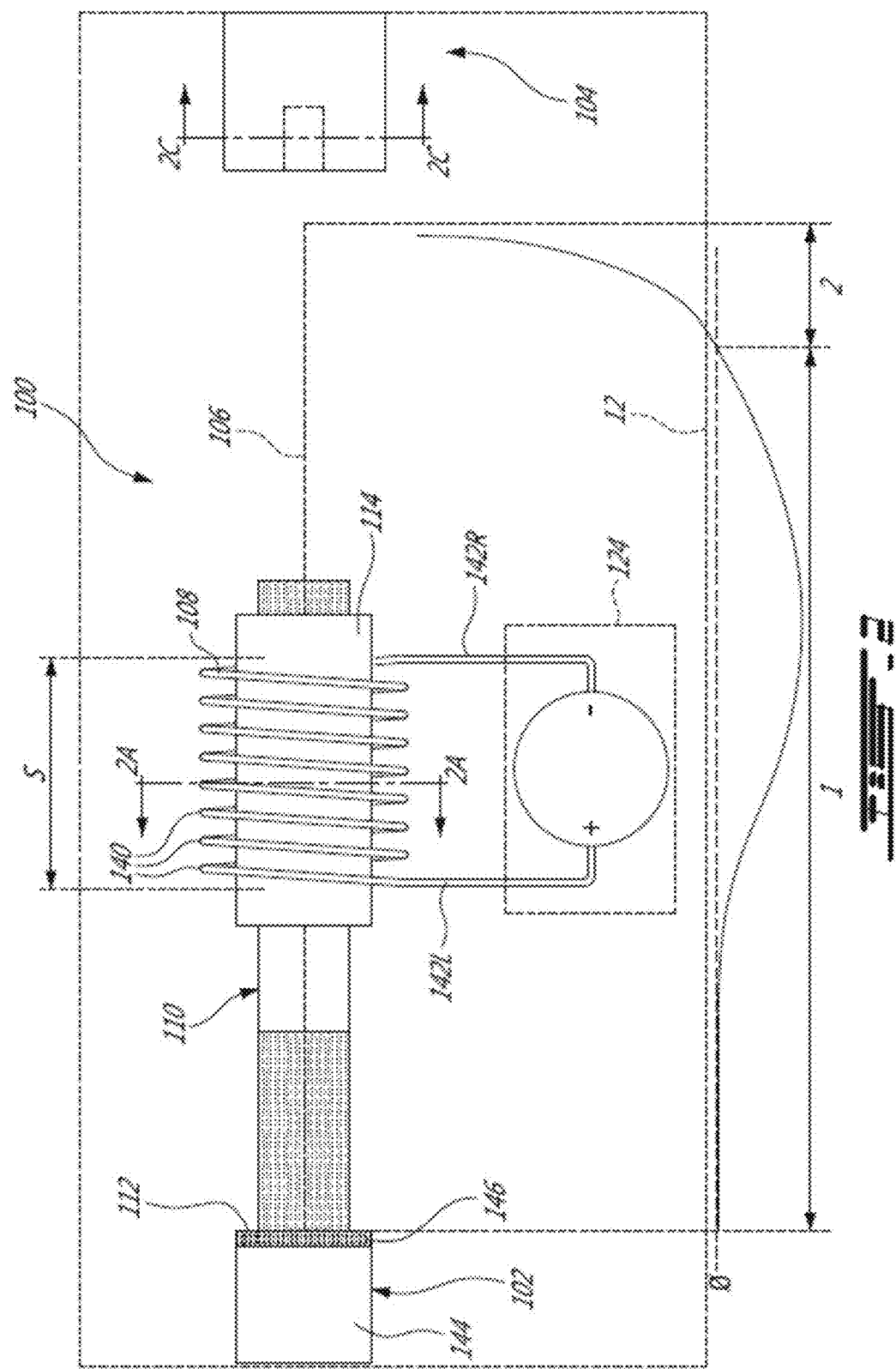

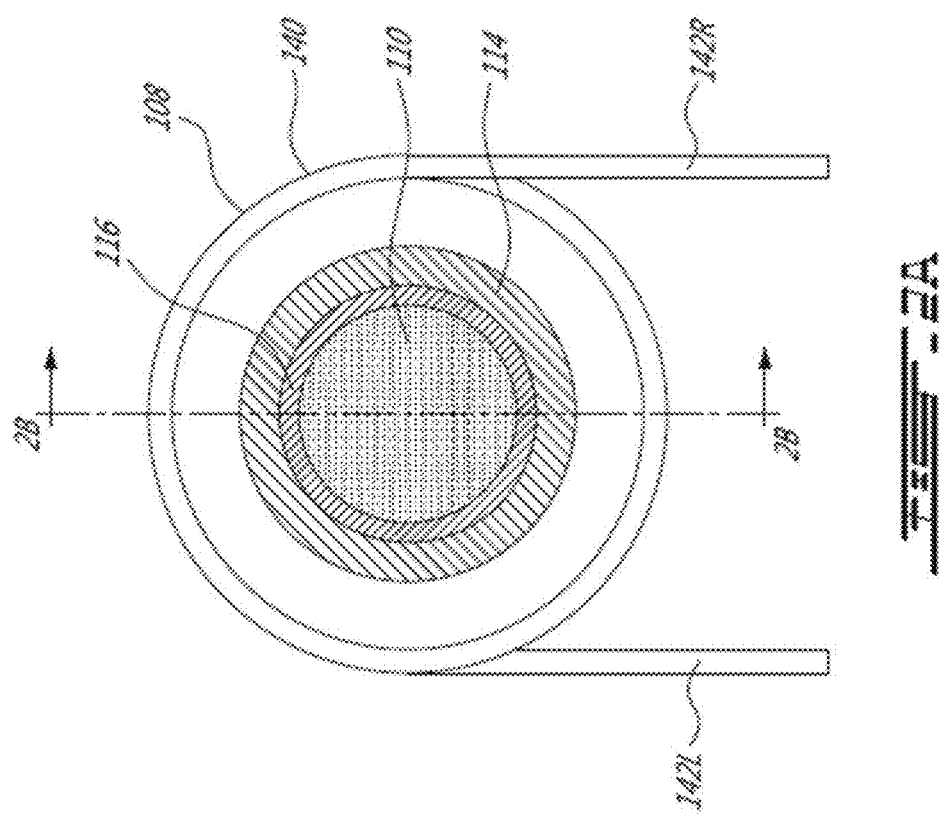

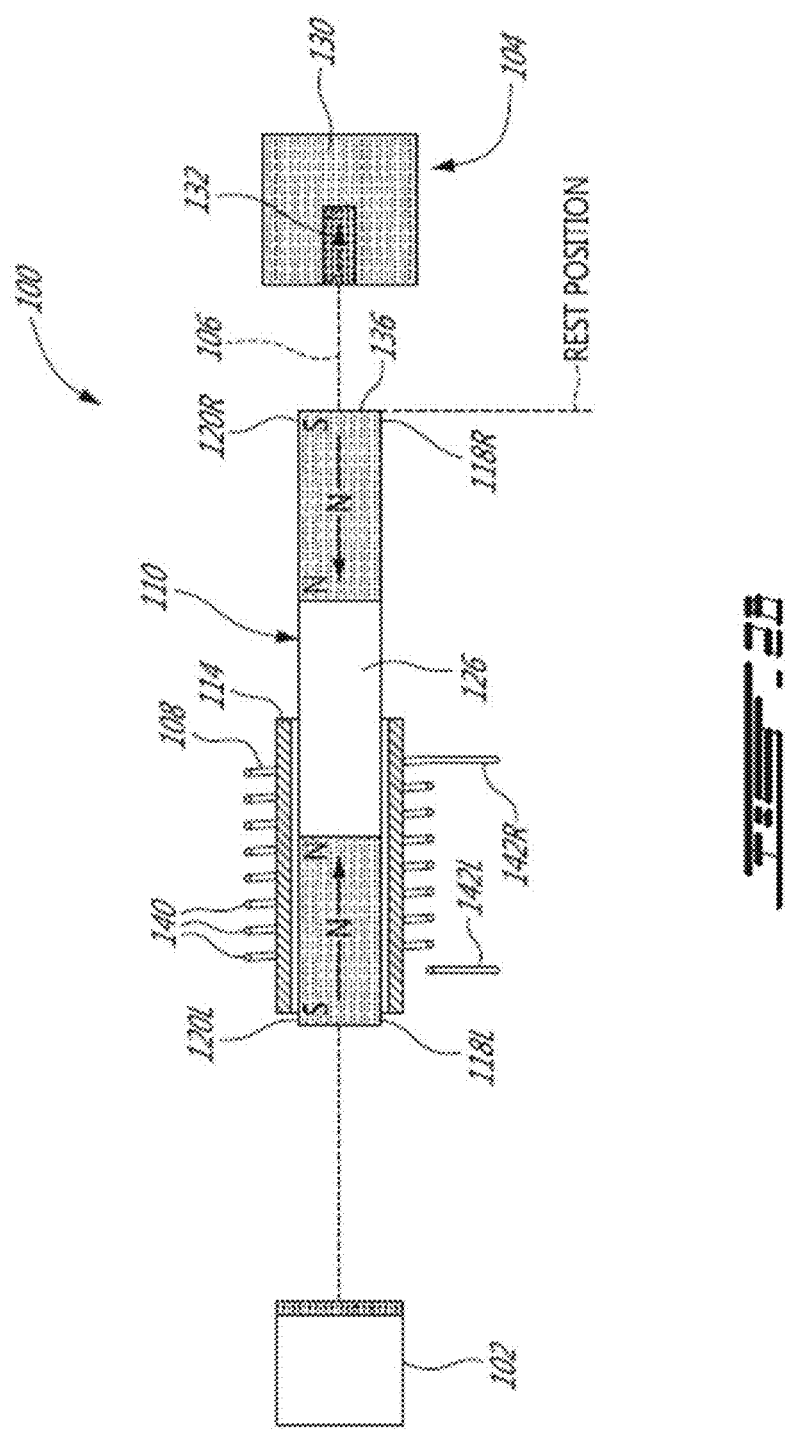

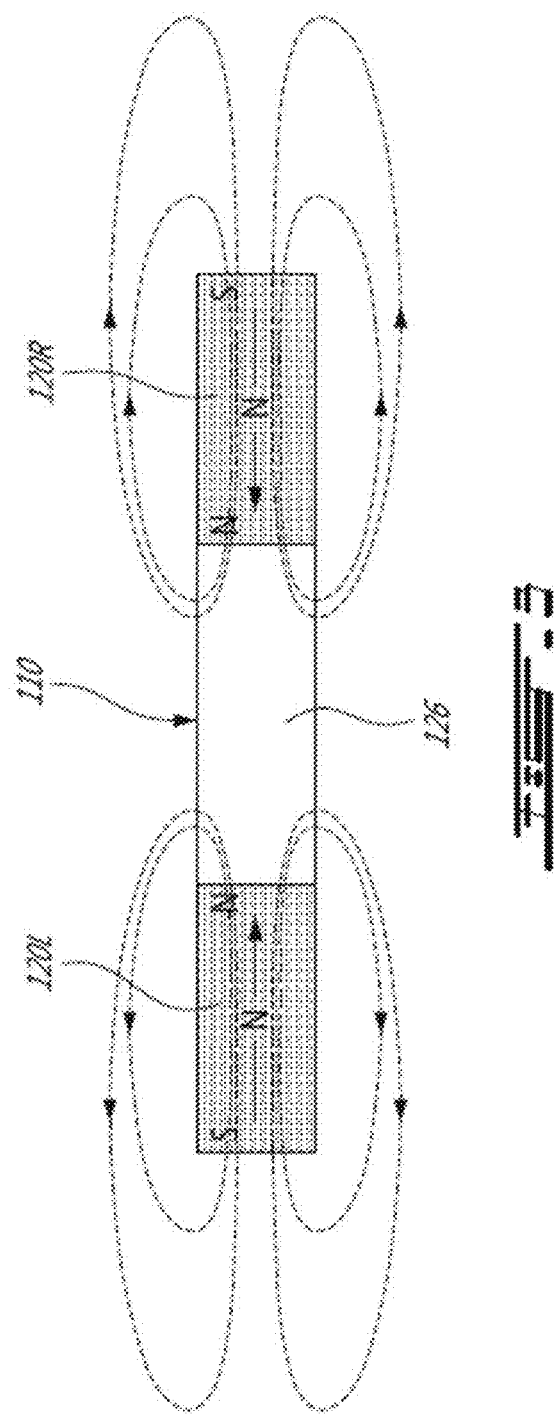

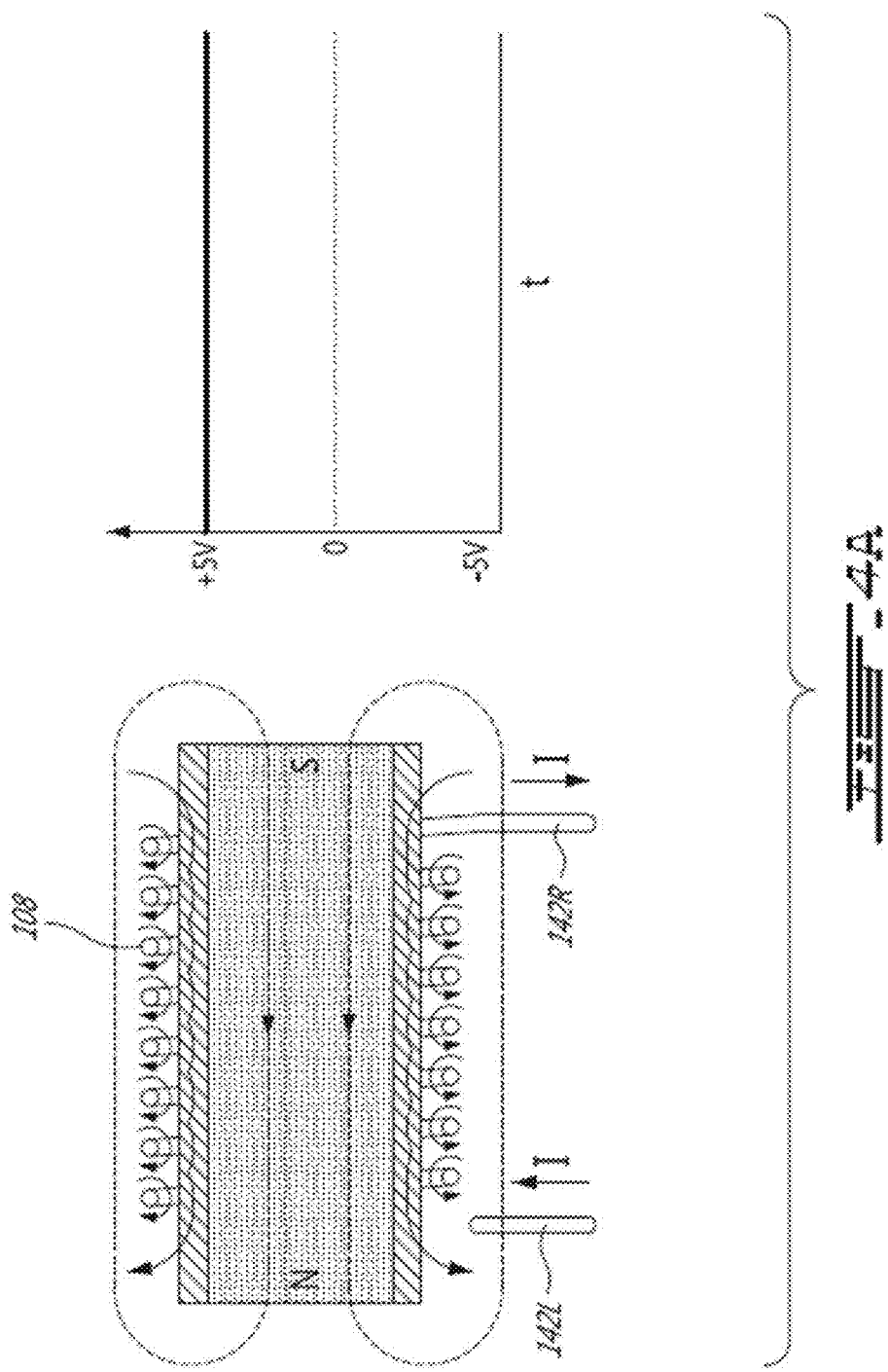

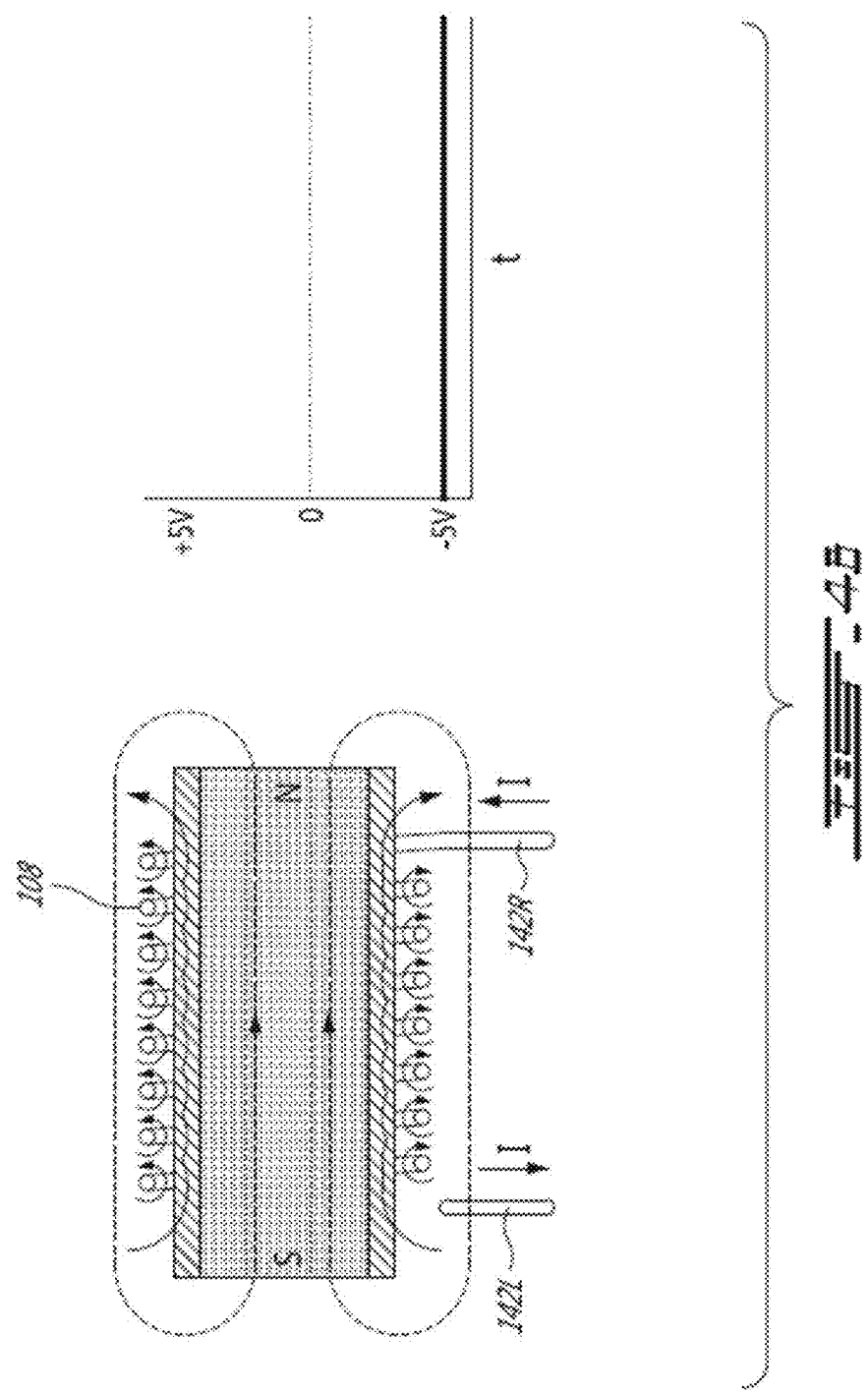

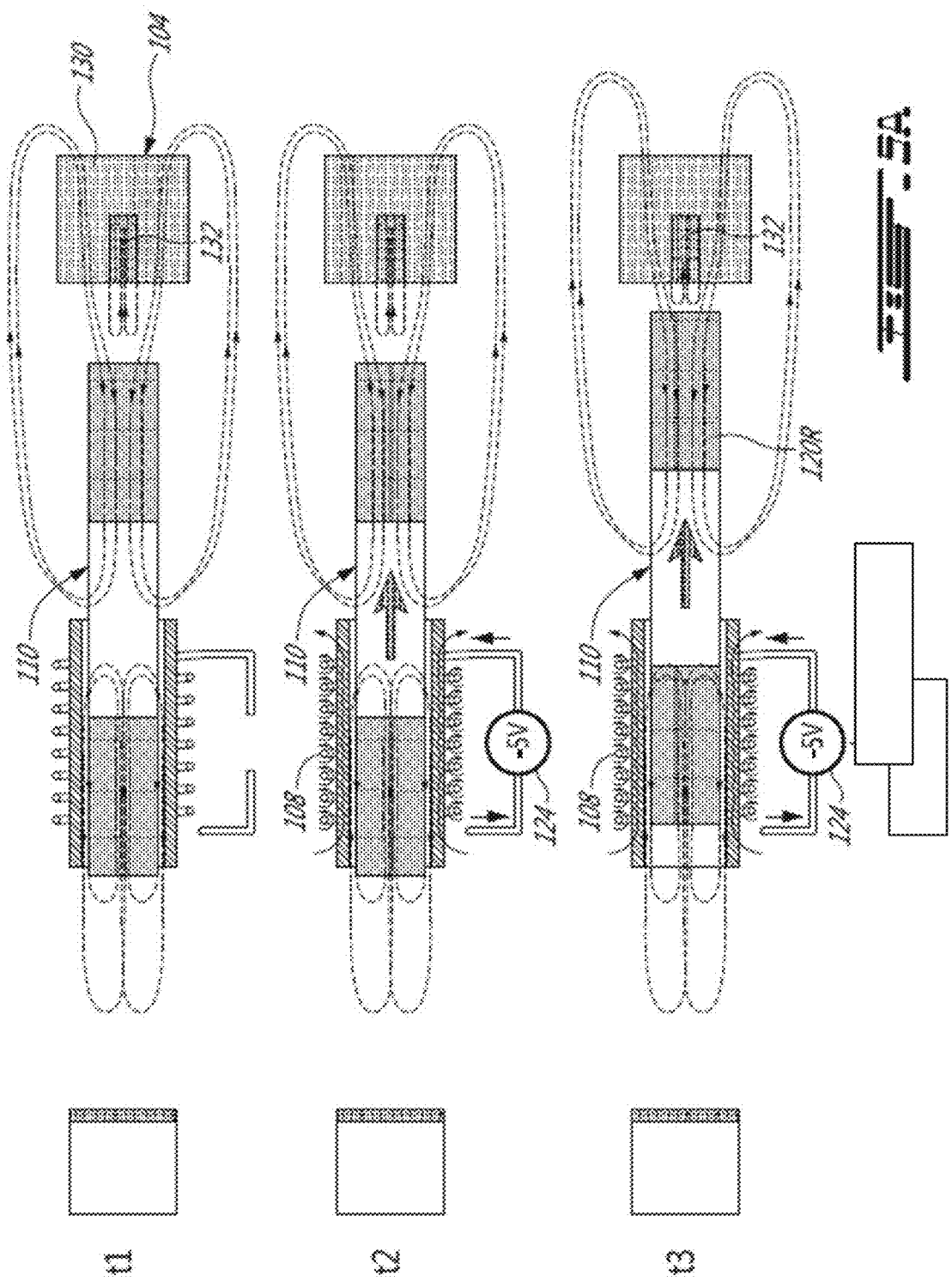

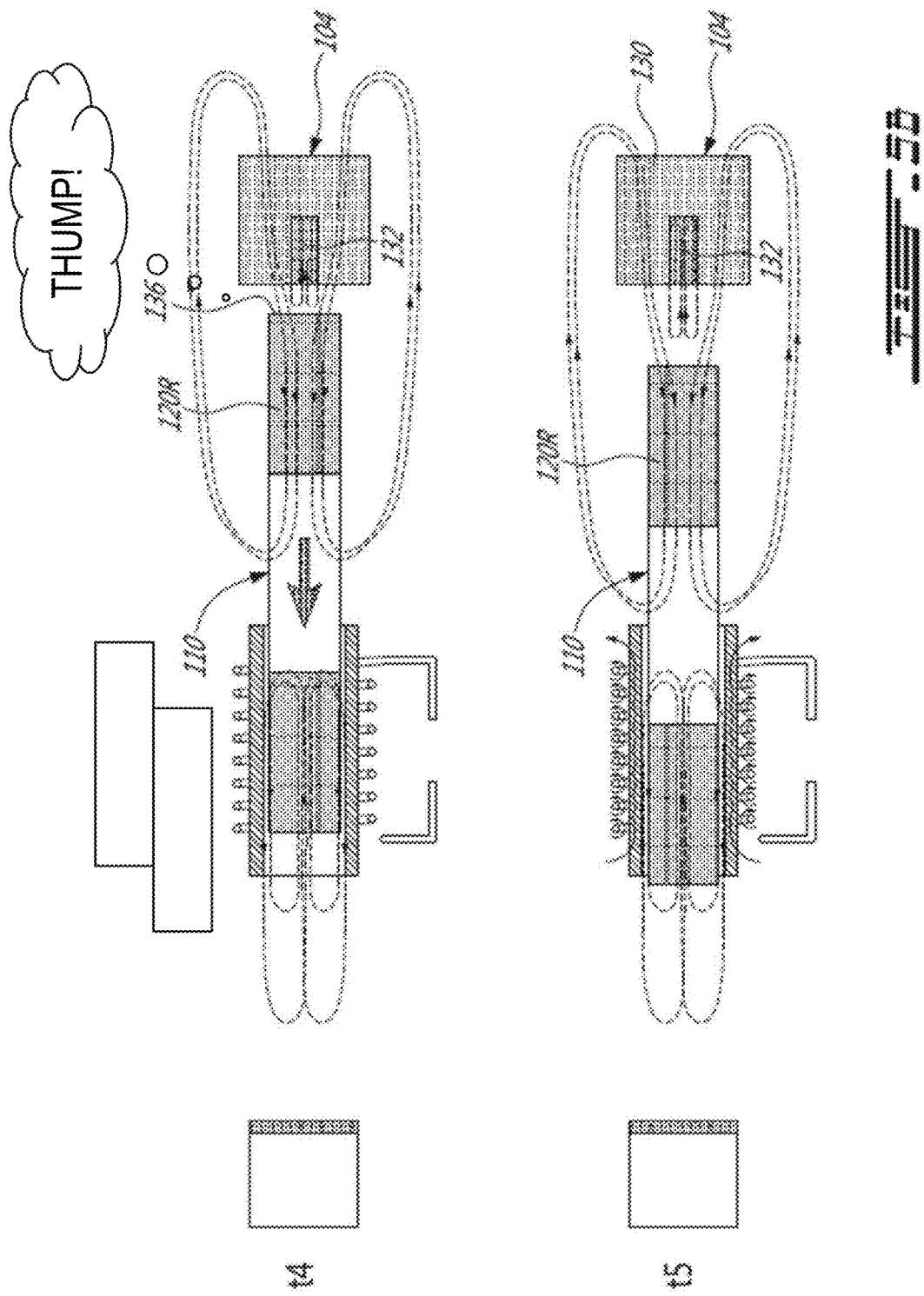

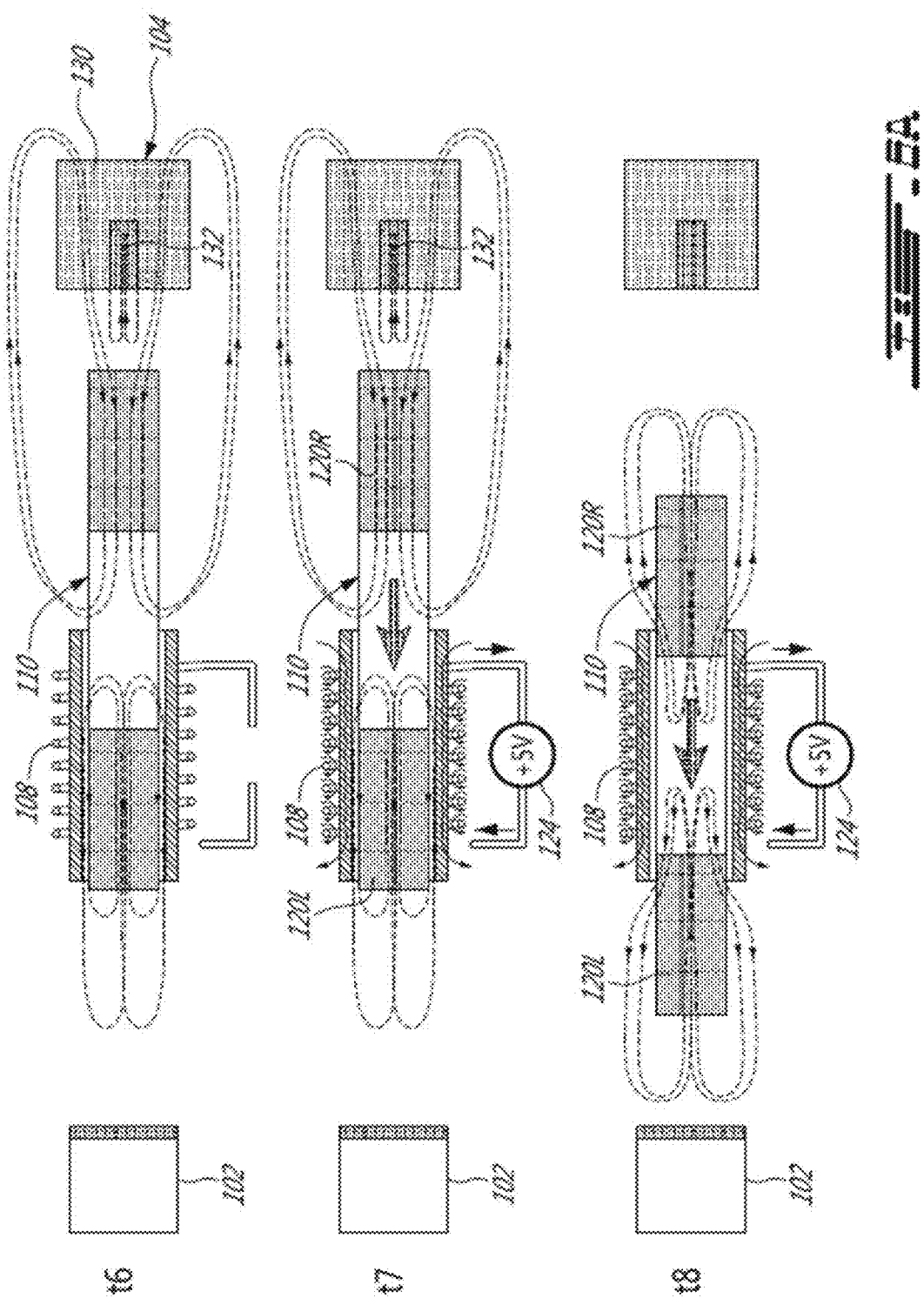

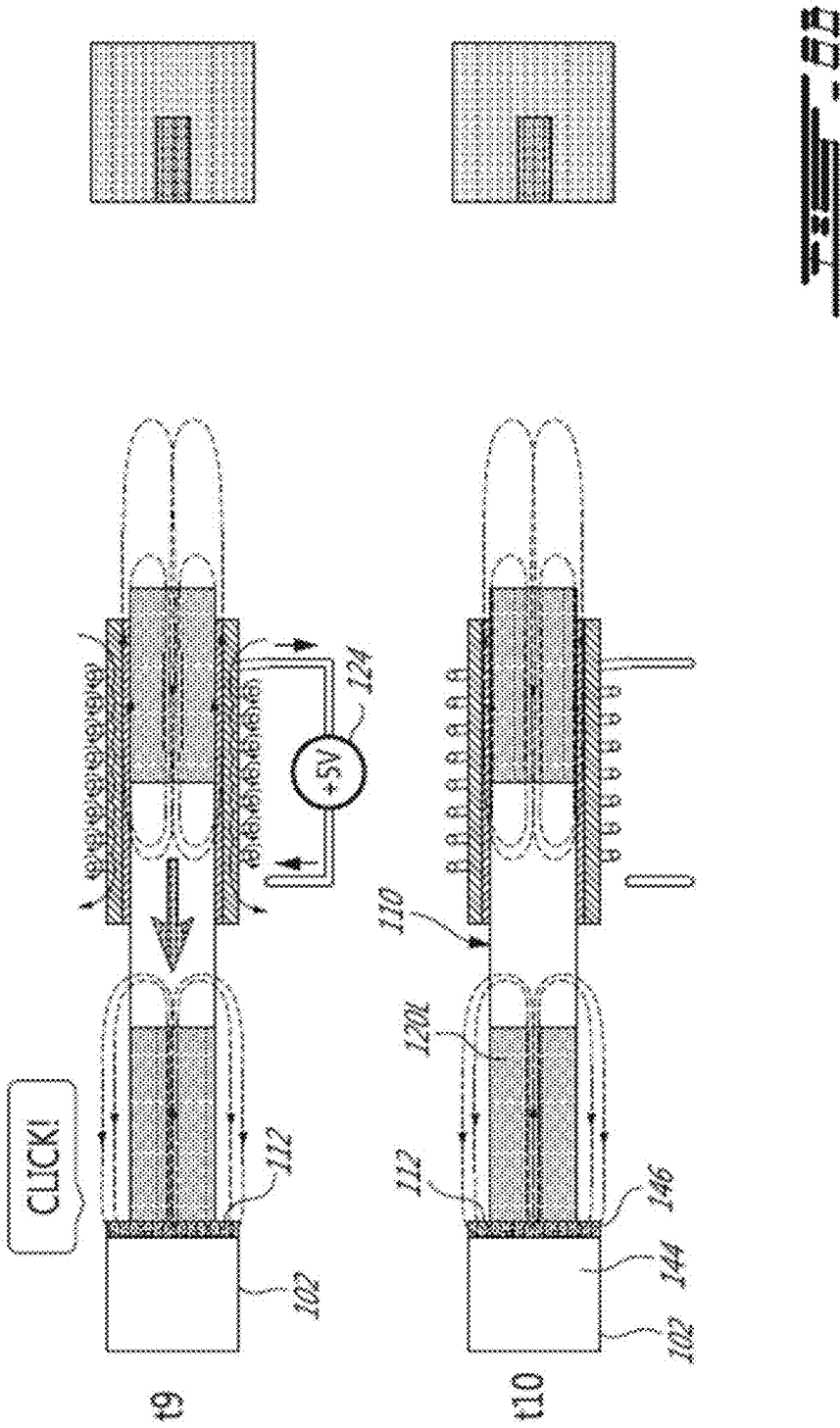

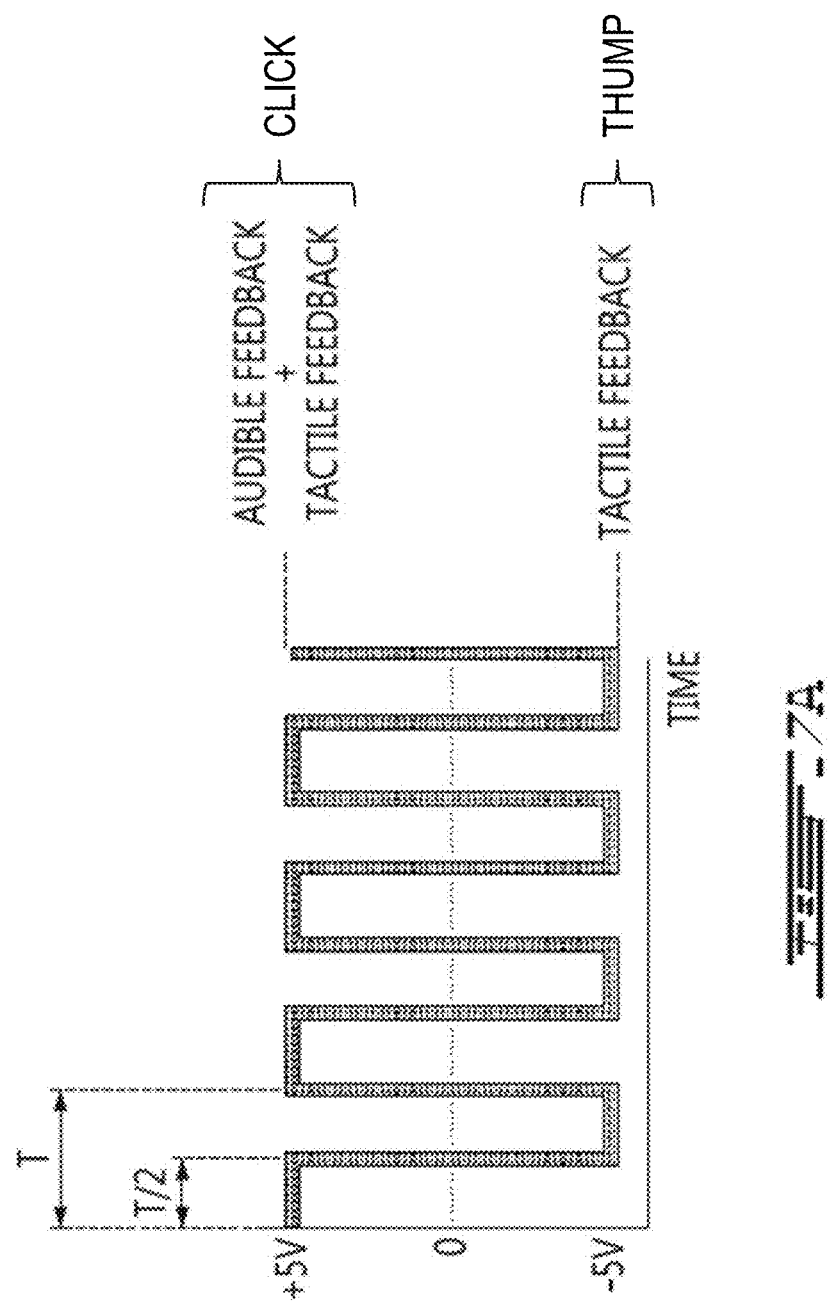

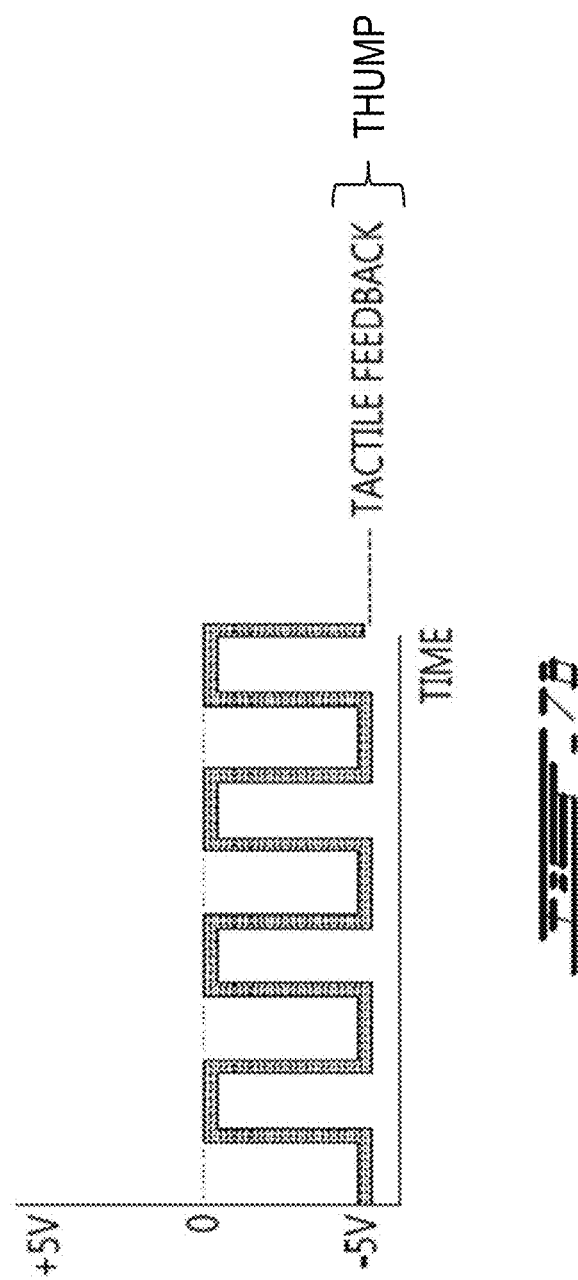

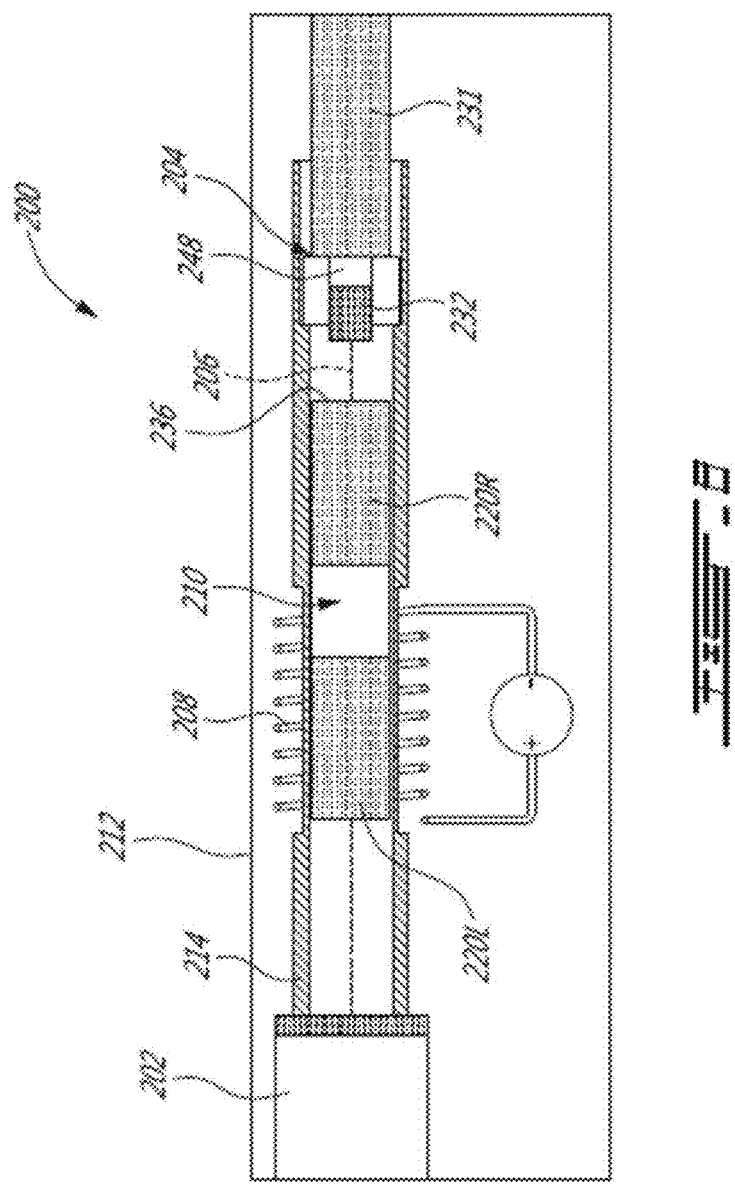

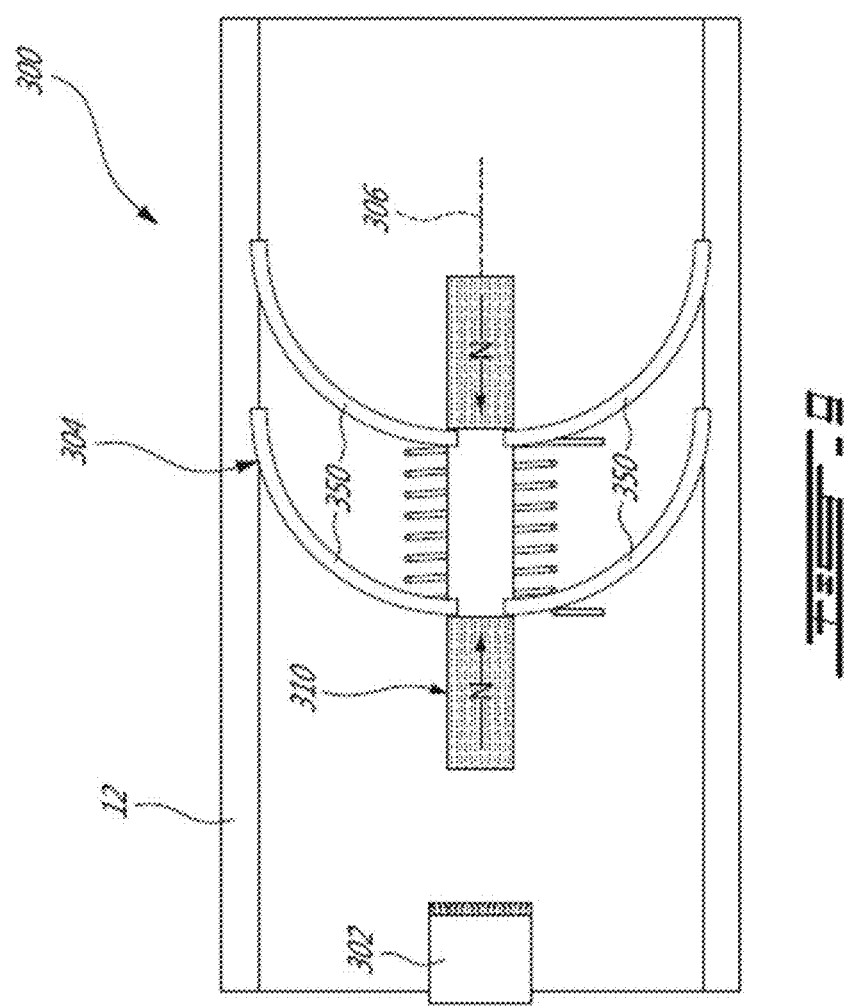

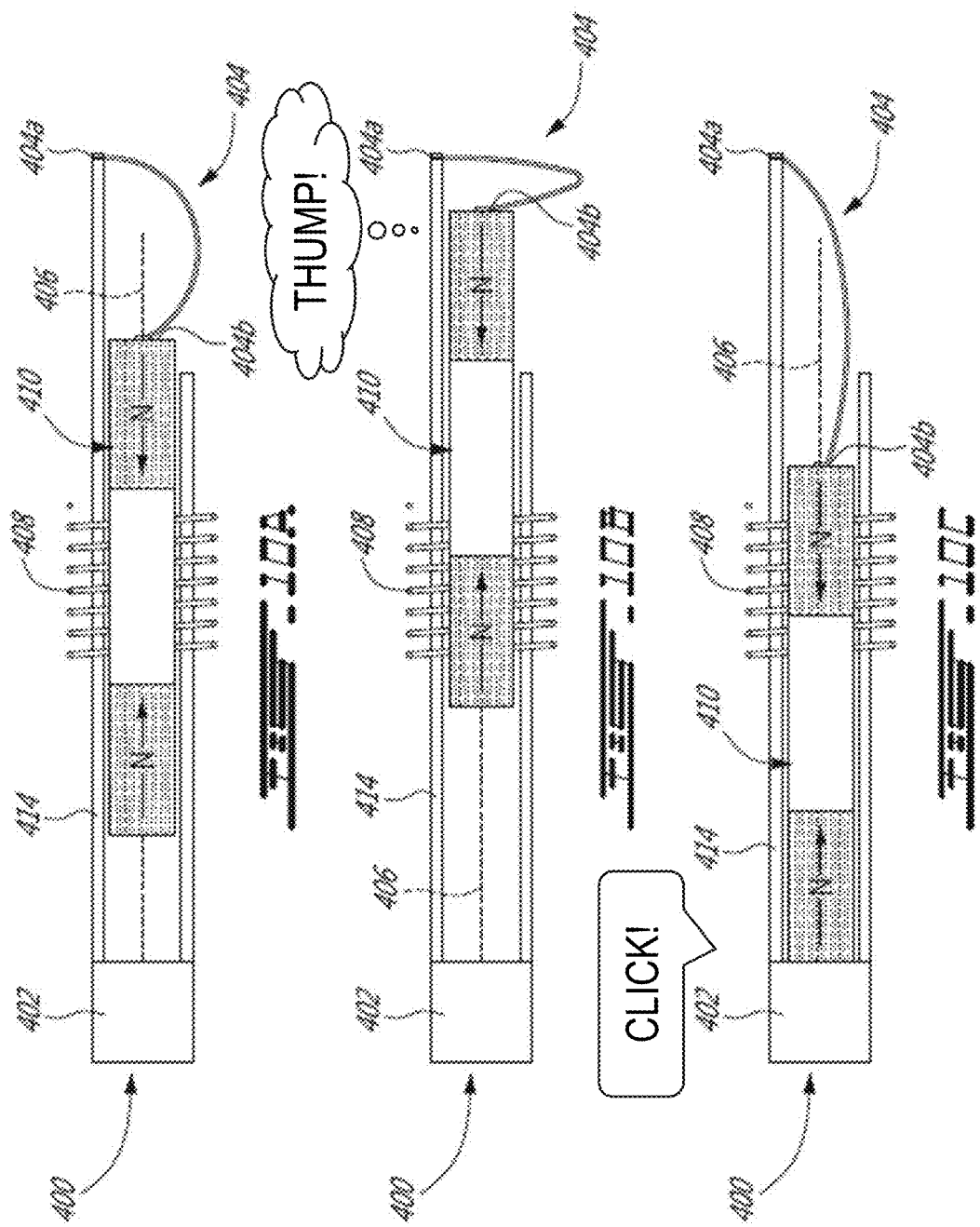

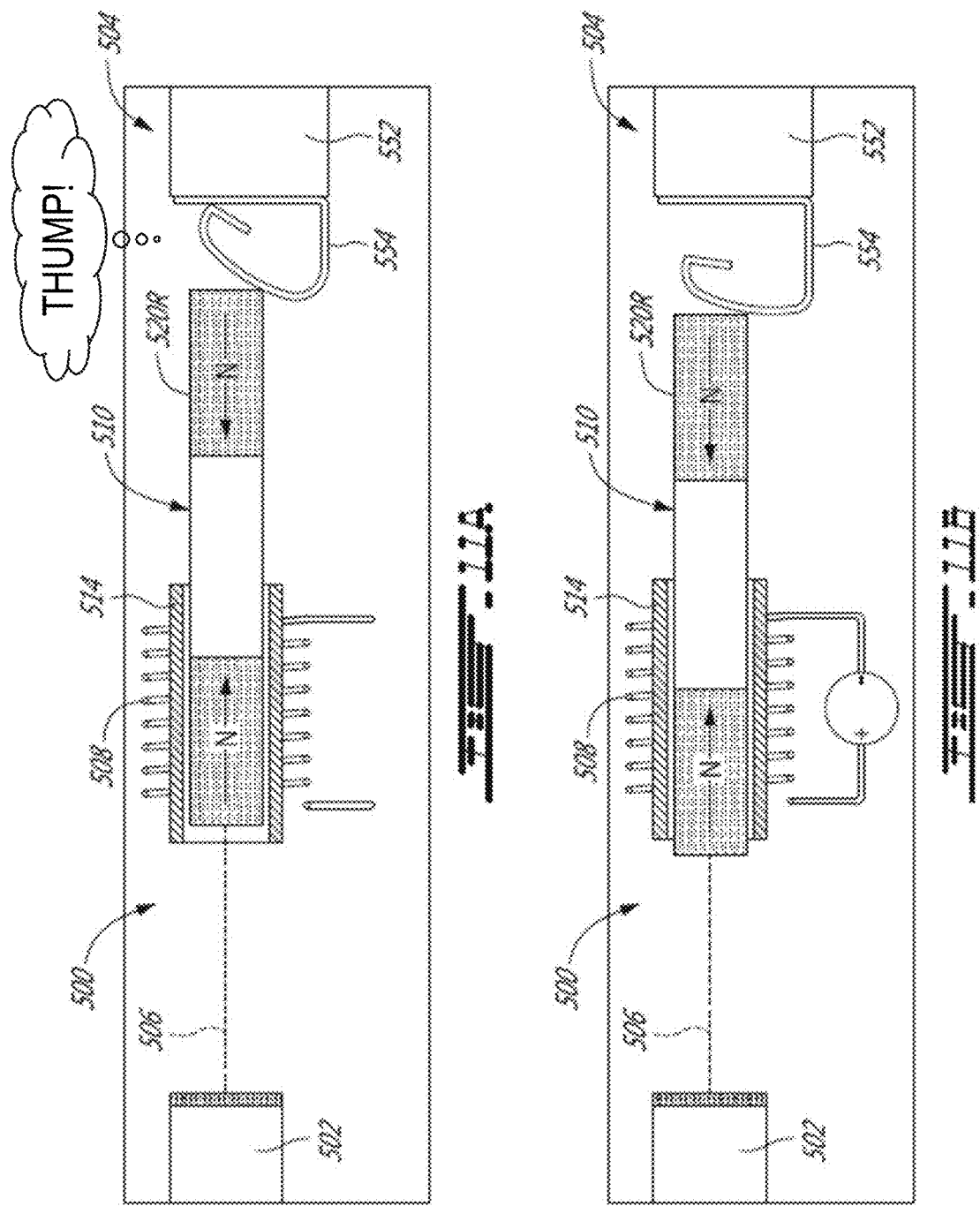

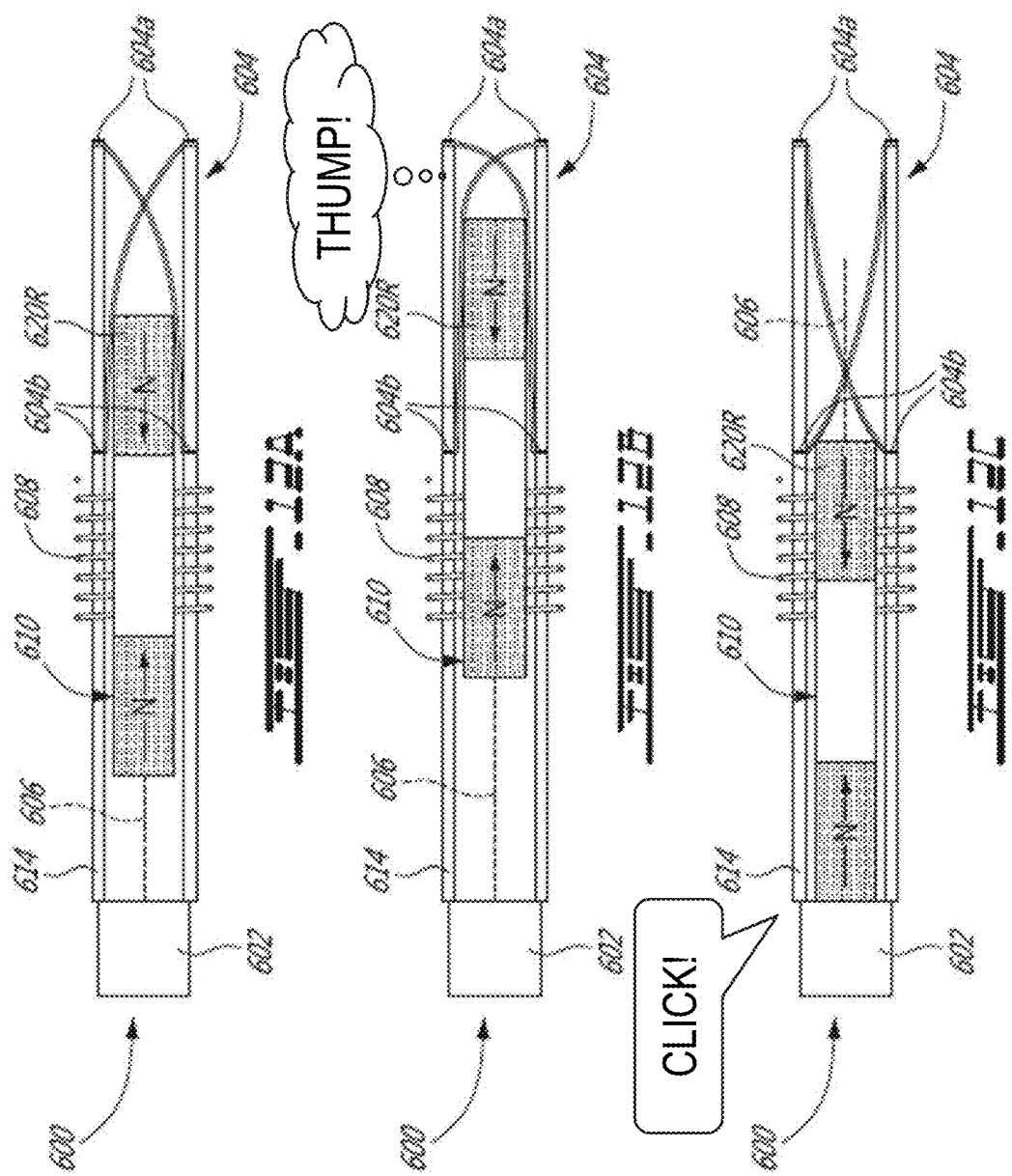

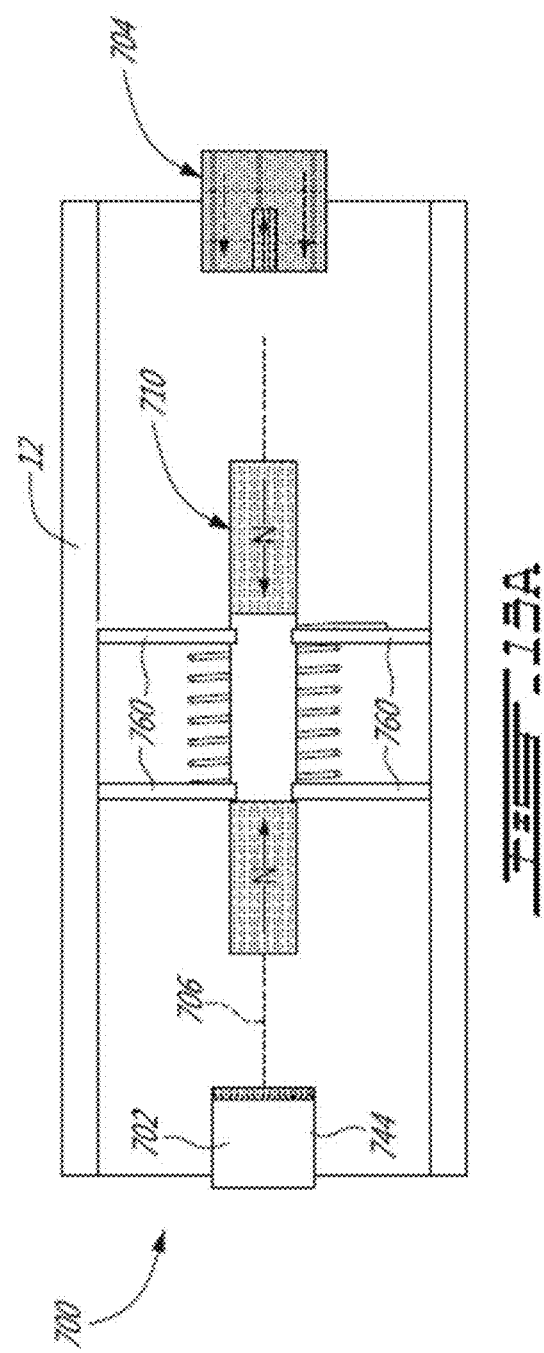

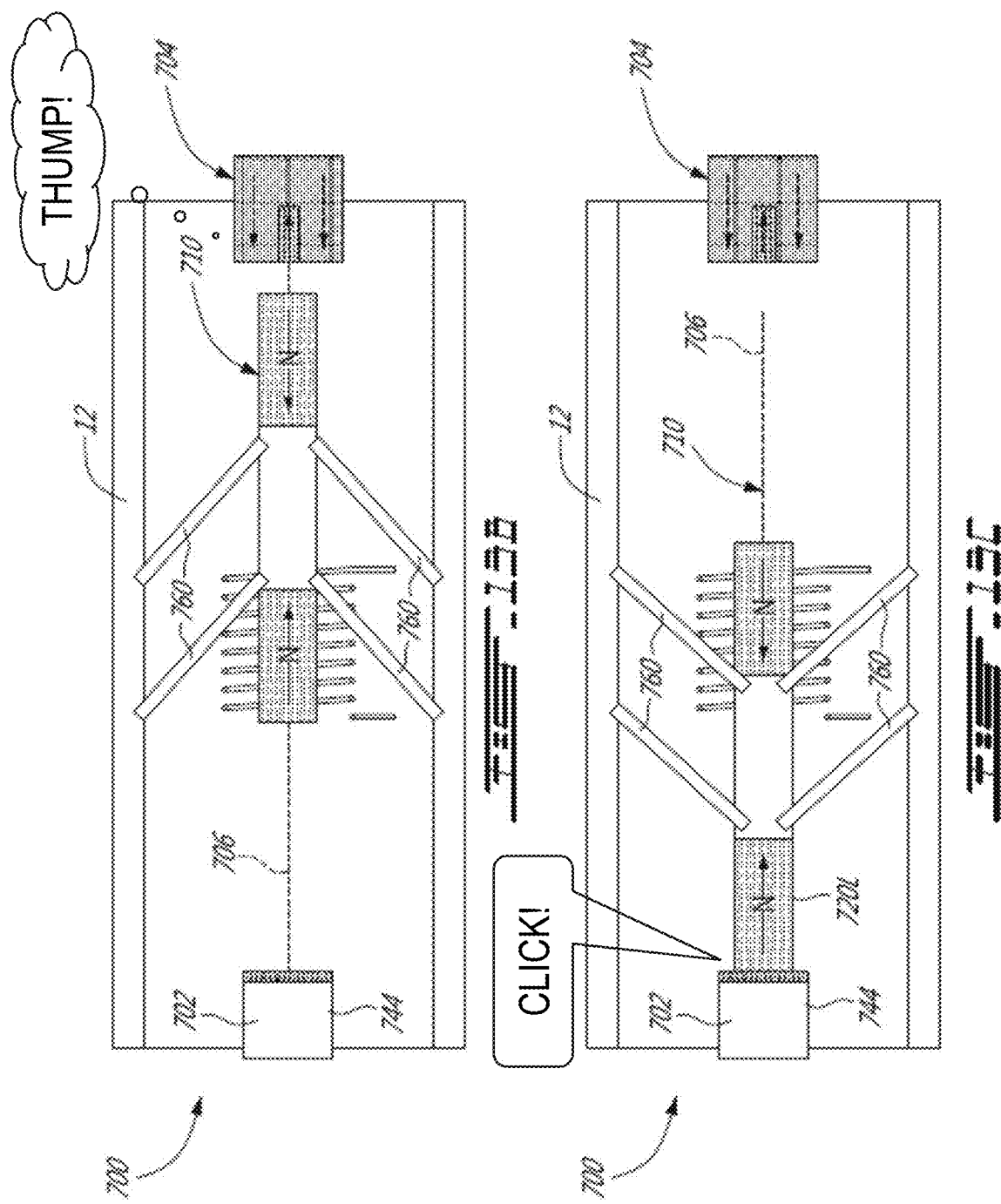

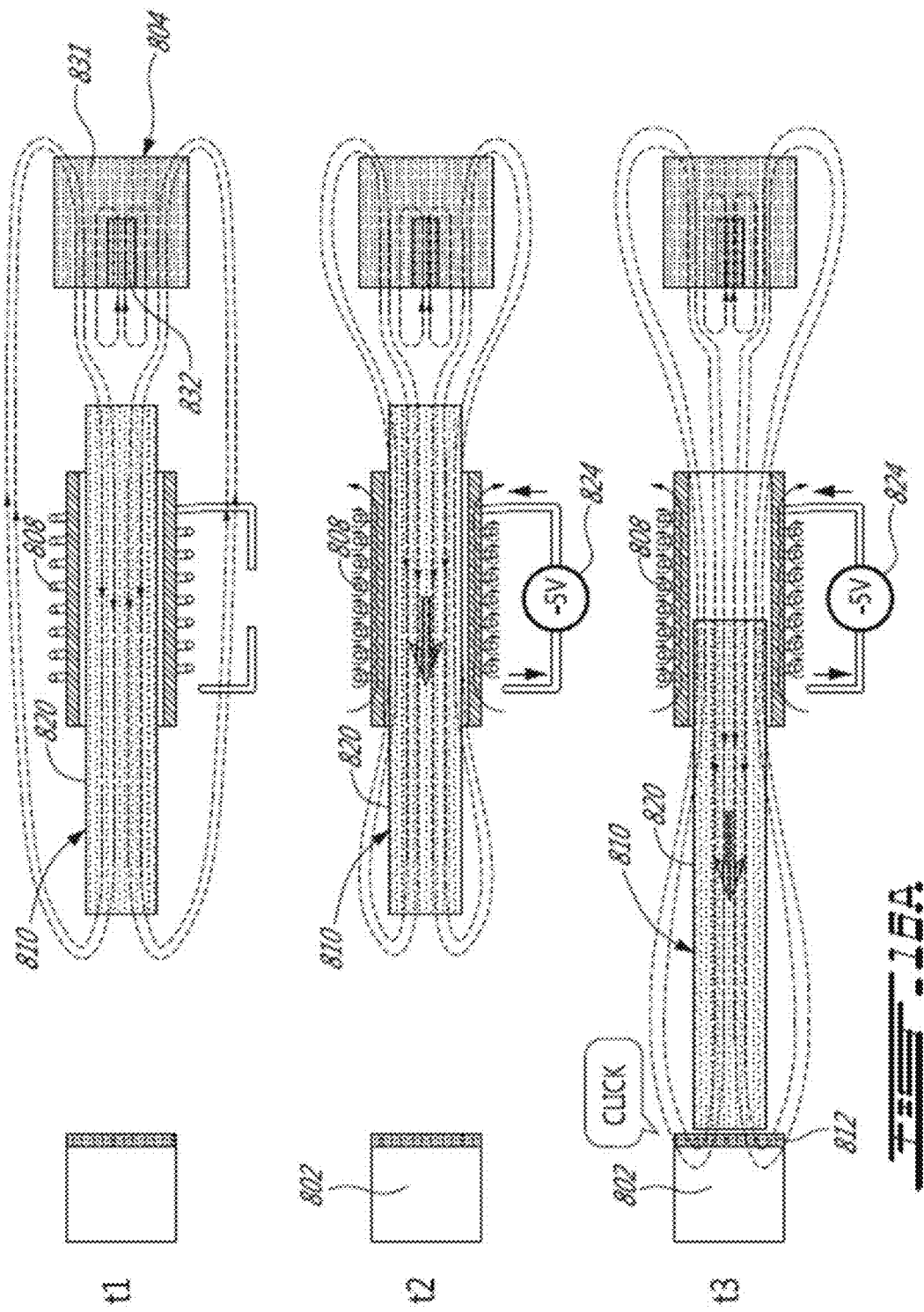

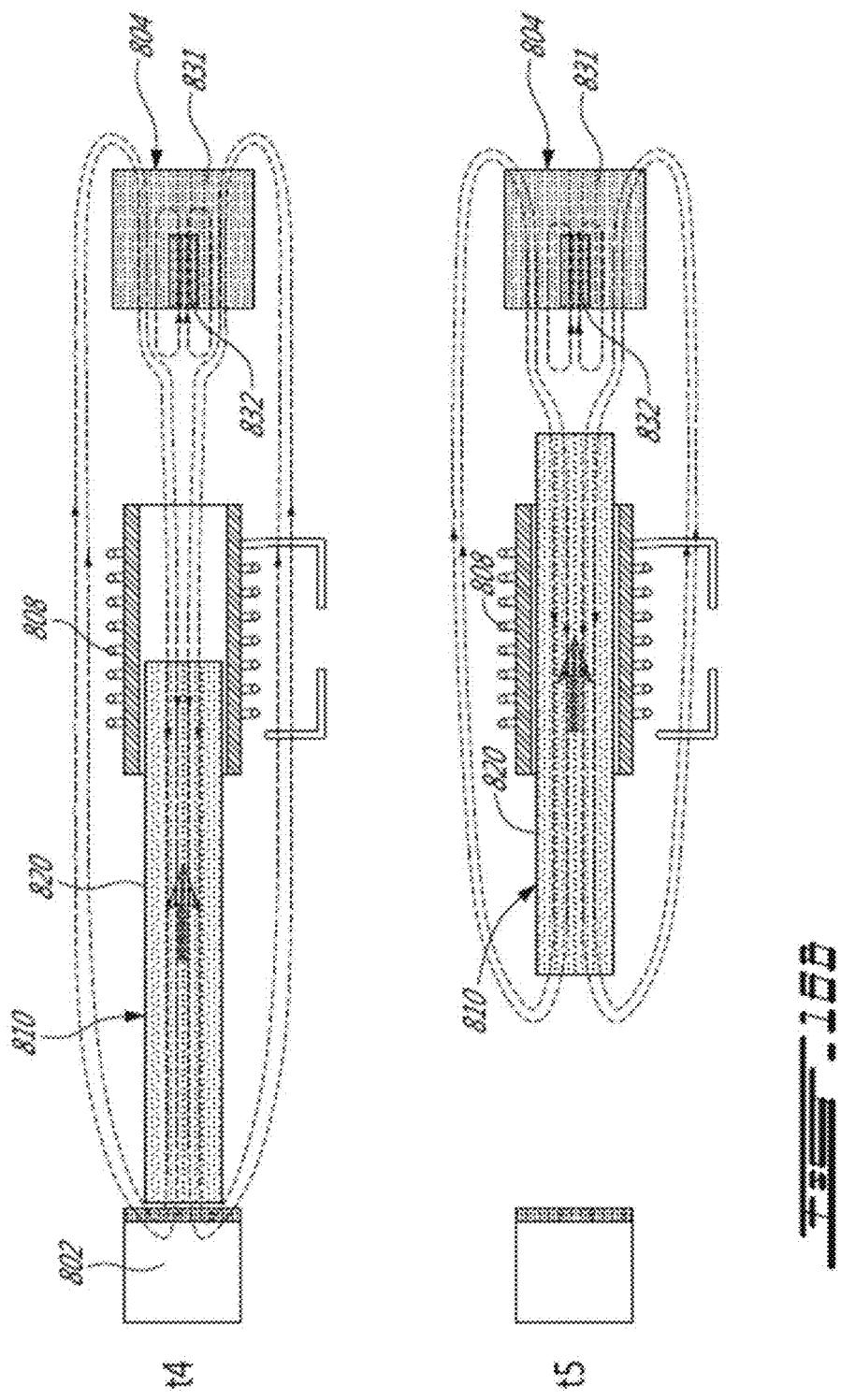

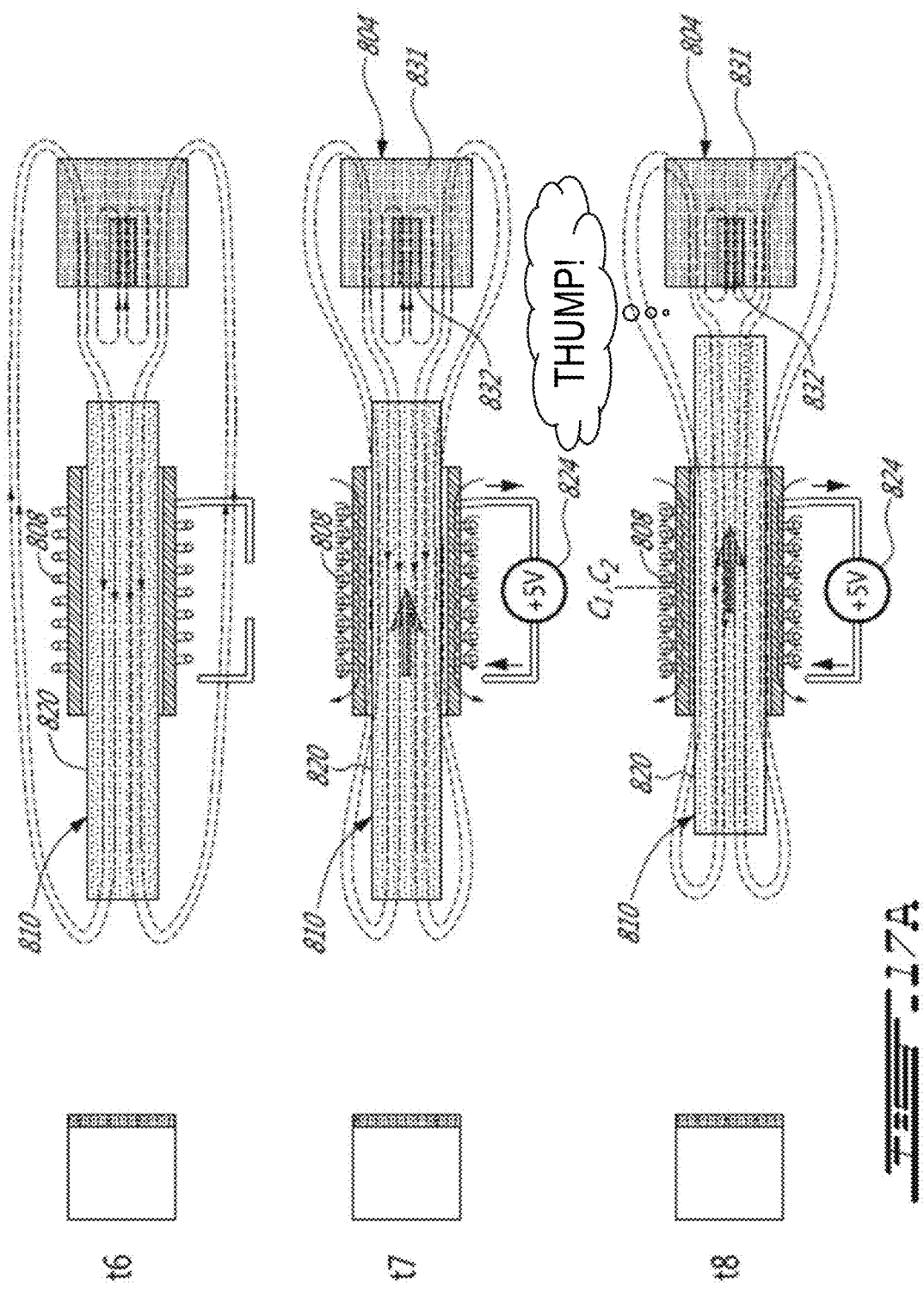

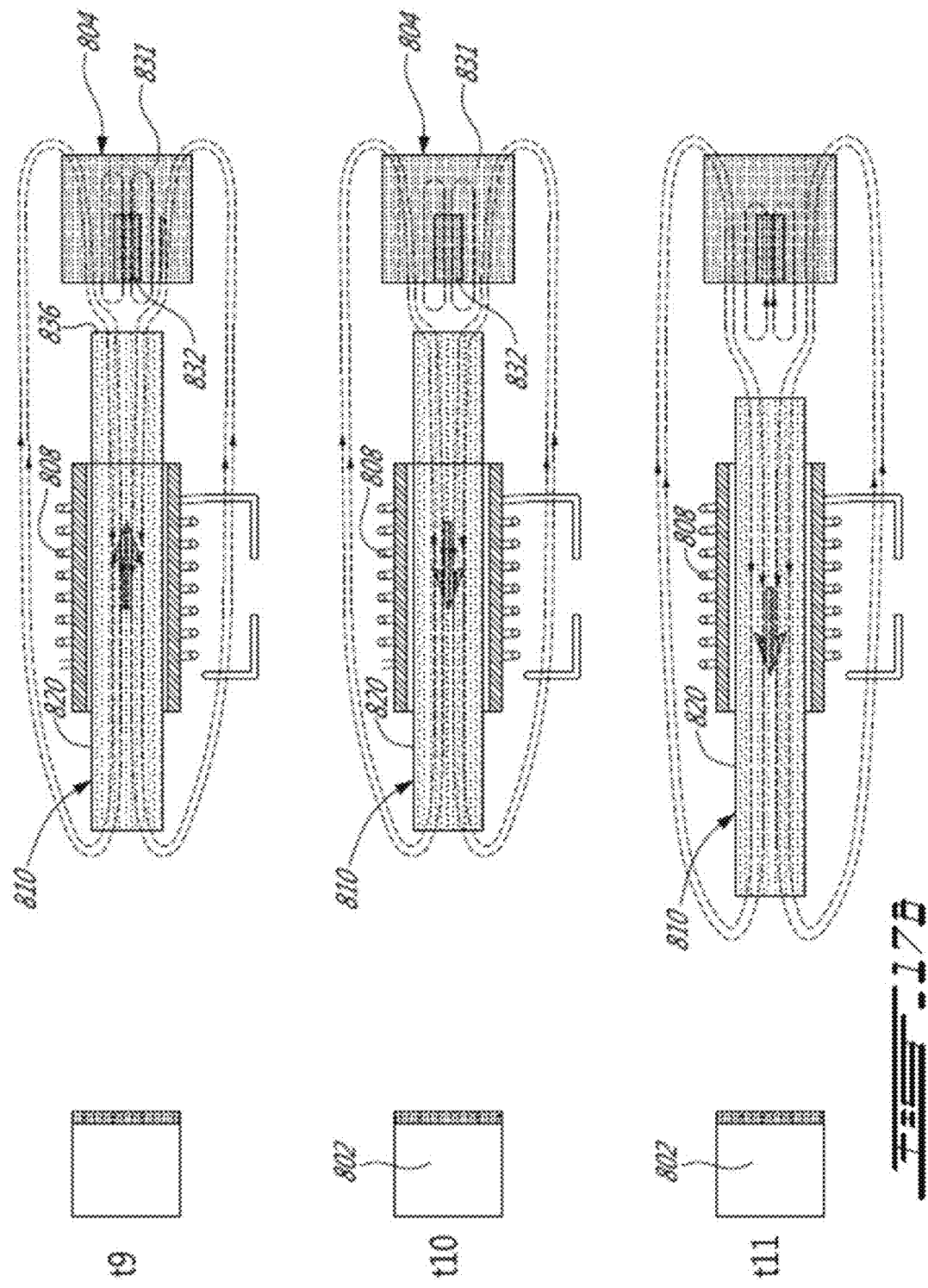

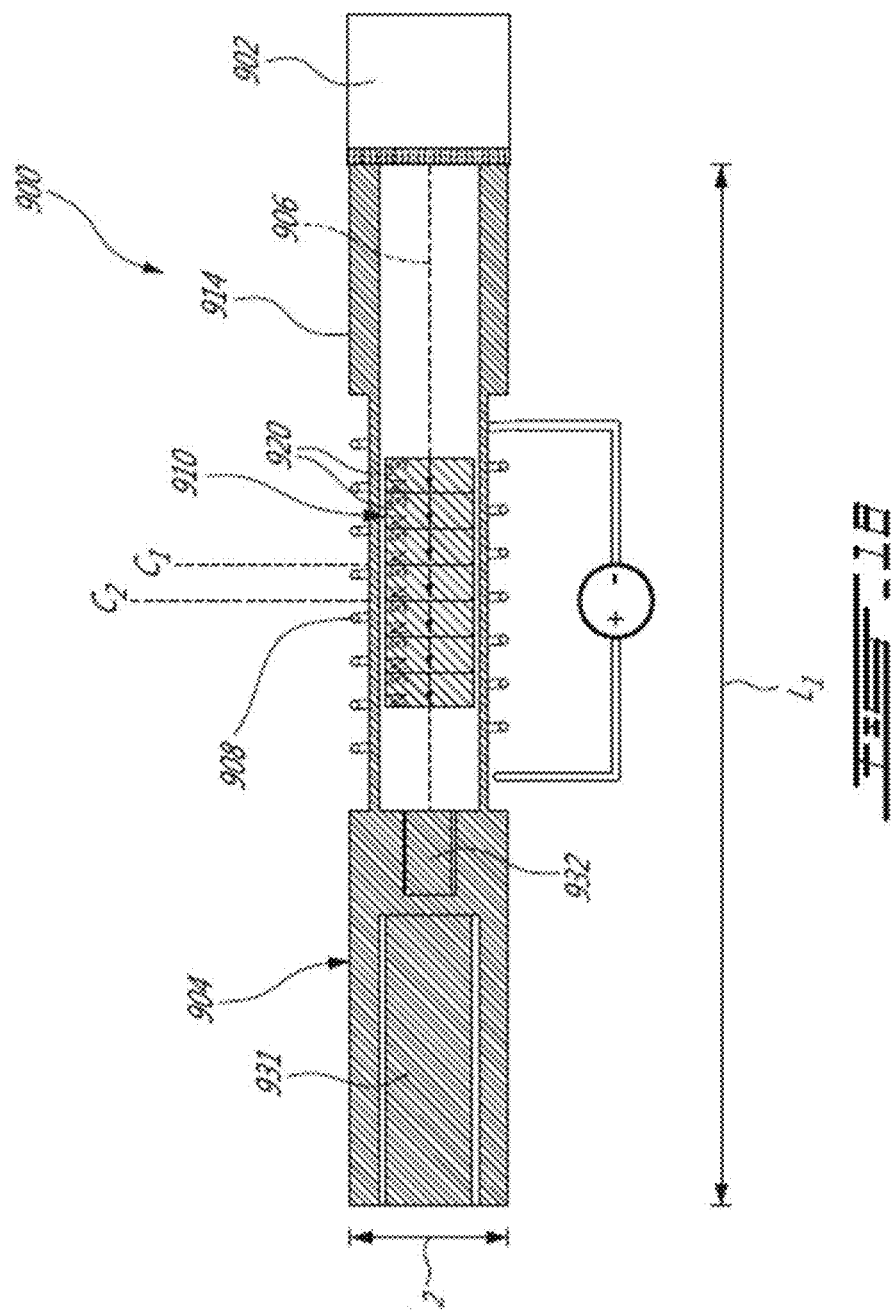

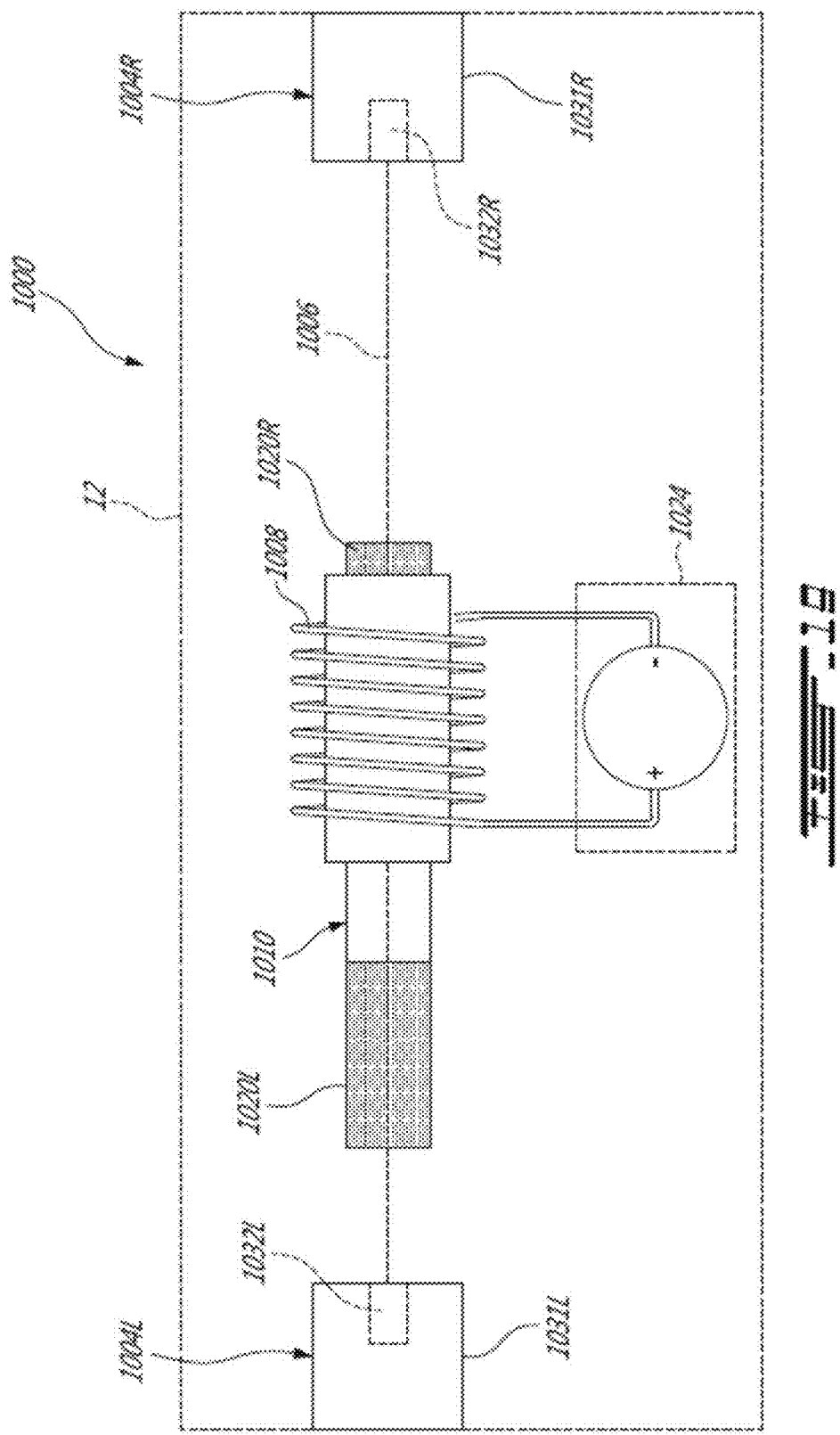

| Haptic Effect Type | Haptic Effect Identifier | Coil Activation Instructions |
|---|---|---|
| Click-bounce | A | V = + V for 0<t<t1 |
| Click-press | B | V = + V for 0<t<t2 |
| Thump-bounce | C | V = - V for 0<t<t1 |
| Thump-press | D | V = - V for 0<t<t2 |

Fig. 26A

| Haptic Effect Types | Numerical indicator | Haptic Effect Identifier | Coil Activation Instructions |
|---|---|---|---|
| Click-bounce | strength = 1 | A1 | $V=0.5*V_{max}$ for $0<t<t1$ |
|  | strength = 2 | A2 | $V=0.6*V_{max}$ for $0<t<t1$ |
|  | strength = 3 | A3 | $V=0.7*V_{max}$ for $0<t<t1$ |
|  | strength = 4 | A4 | $V=-0.4*V_{max}$ for $0<t<t1$ <br> $V=V_{max}$ for $t1<t<t2$ |
|  | strength = 5 | A5 | $V=-0.7*V_{max}$ for $0<t<t1$ <br> $V=V_{max}$ for $t1<t<t2$ |
| Click-press | strength = 1 | B1 | ⋮ |
|  | strength = 2 | B2 | ⋮ |
|  | strength = 3 | B3 | ⋮ |
|  | strength = 4 | B4 | ⋮ |
|  | strength = 5 | B5 | ⋮ |
| Thump-click | strength = 1 | C1 | ⋮ |
|  | strength = 2 | C2 | ⋮ |
|  | strength = 3 | C3 | ⋮ |
|  | strength = 4 | C4 | ⋮ |
|  | strength = 5 | C5 | ⋮ |
| Thump-press | strength = 1 | D1 | ⋮ |
|  | strength = 2 | D2 | ⋮ |
|  | strength = 3 | D3 | ⋮ |
|  | strength = 4 | D4 | ⋮ |
|  | strength = 5 | D5 | ⋮ |

Fig. 26B

| Action Type | Numerical indicator | Identifier | Coil Activation Instructions |
|---|---|---|---|
| Silence | duration = 1<br>duration = 2<br>duration = 3<br>duration = 4<br>duration = 5 | E1<br>E2<br>E3<br>E4<br>E5 | V=0 for 0<t<t1<br>V=0 for 0<t<t2<br>V=0 for 0<t<t3<br>V=0 for 0<t<t4<br>V=0 for 0<t<t5 |
| Reinitialize magnetic hammer position | none | F | ... |

Fig. 28

| Real world event Type | Identifier | Sequence of haptic effect identifiers |
|---|---|---|
| Firing a machine gun | G | F, A5,E2 |
| Feeling a heartbeat | H | F,C1,E1,C4,E5 |
| Firing a pistol | I | F,A5,C2 |
| Firing a shotgun | J | F,A5,E3,C5,E1,A3,E1,C1 |
| Knocking on a door | K | F, A3,E2,A4,E2,A5,E2,B5,E |
| Opening a door | L | F, D3,E2,C3,E2,D3 |
| Custom effect | M | ... |

Fig. 29

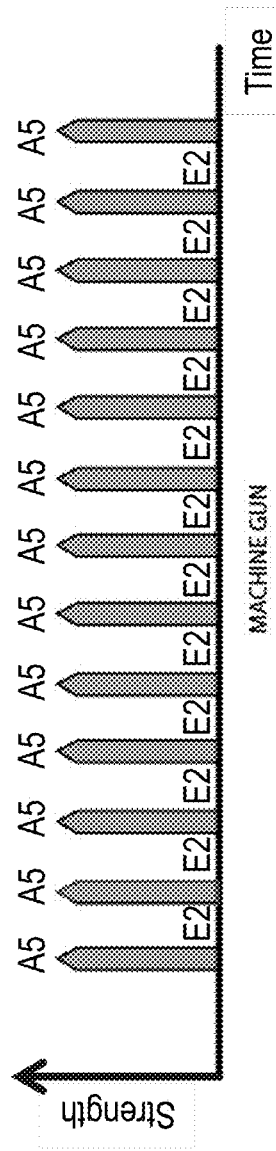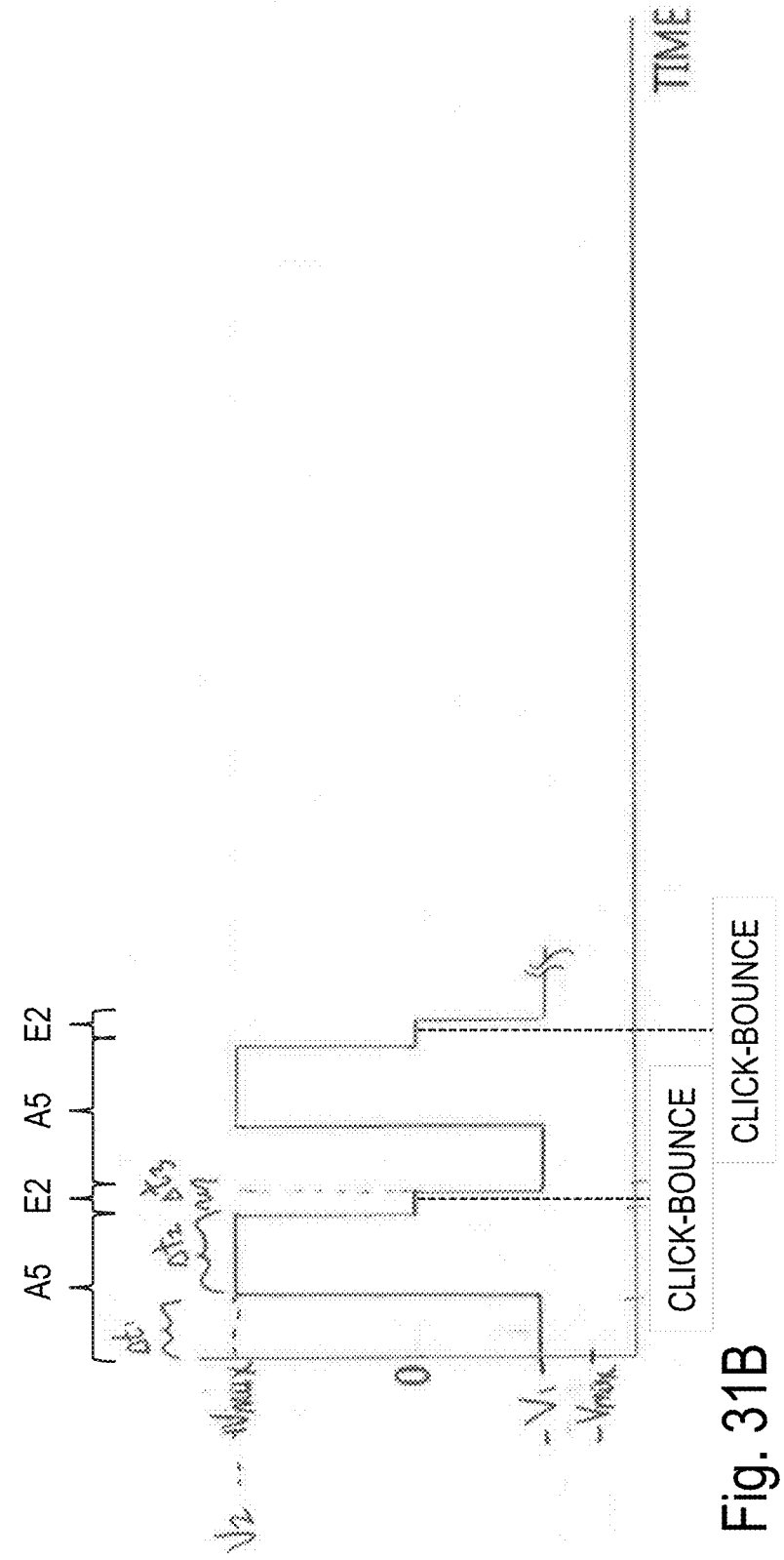

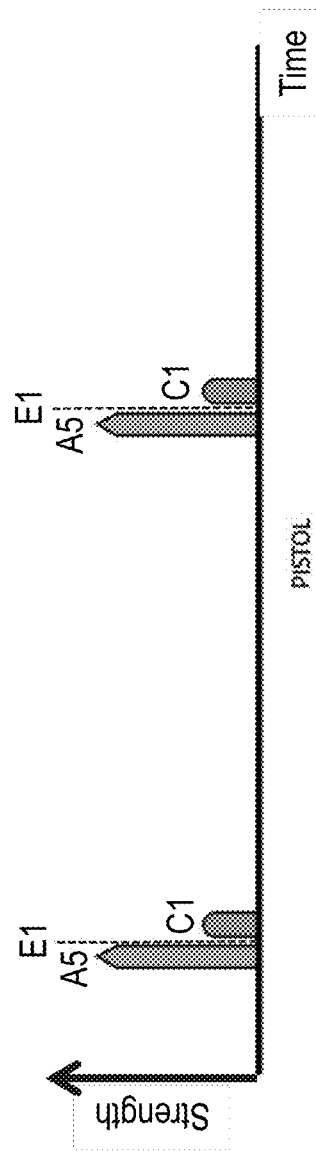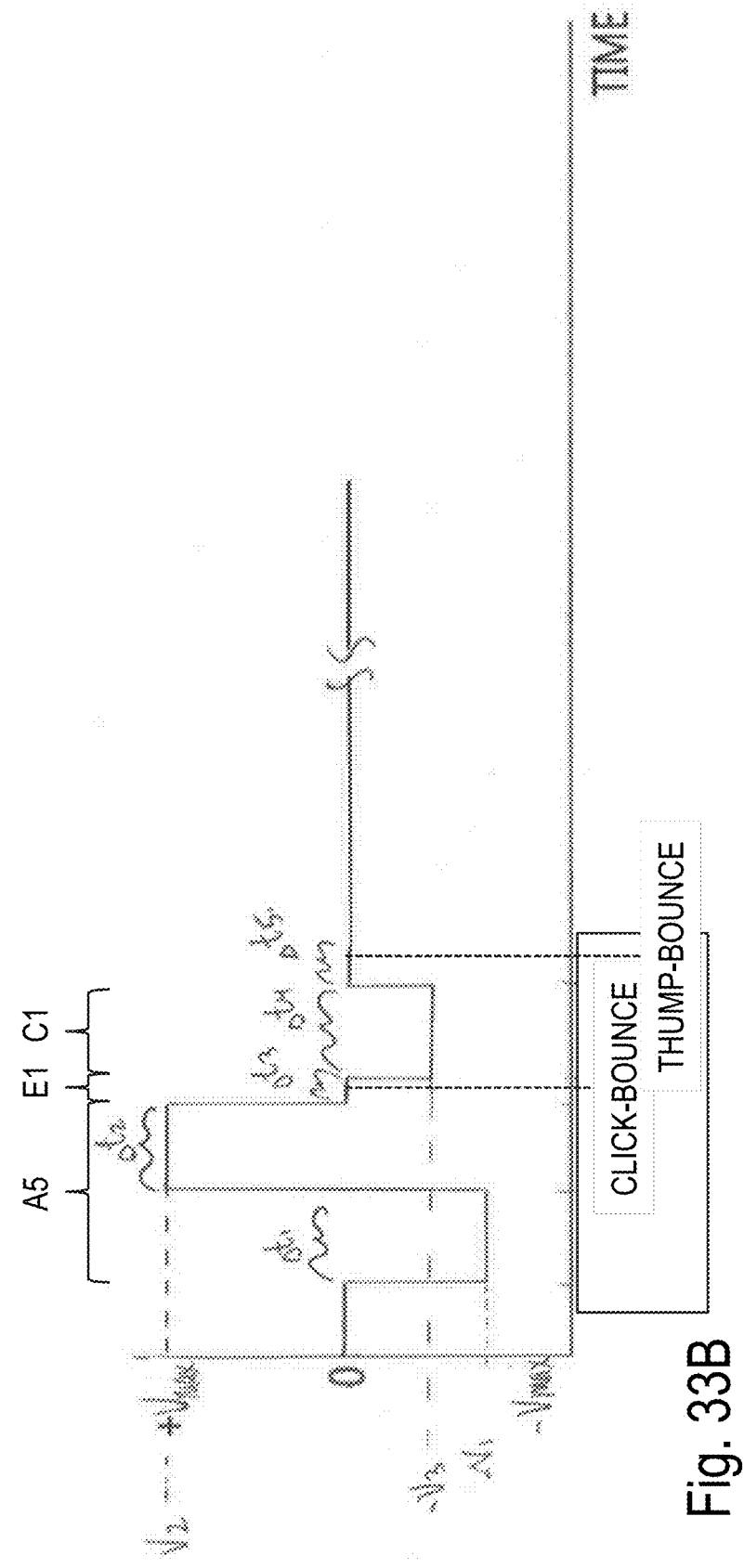
Fig. 33A
Fig. 33B

COMPOUND HAPTIC EFFECTS USING MULTIMODAL TACTILE FEEDBACK ACTUATOR

REFERENCE TO RELATED APPLICATIONS

This patent application is a continuation-in-part of International Application Serial No. PCT/CA2017/050,756, filed on Jun. 21, 2017, and claims priority of U.S. Provisional Application Ser. No. 62/574,688, filed on Oct. 19, 2017 and of U.S. Provisional Application Ser. No. 62/627,960, filed Feb. 8, 2018, the contents of which are hereby incorporated by reference.

FIELD

The improvements generally relate to the field of electronic devices and more specifically to tactile feedback actuators for use in electronic devices.

BACKGROUND

Mechanical actuators have been used in electronic devices to provide tactile (a form of haptic) feedback. Such tactile feedback may be used, for example, to simulate the feel of a mechanical button when a user interacts with an interface without a mechanical button, e.g., a touch pad or a touchscreen, or to generate a vibration alert. An example of a tactile feedback actuator is described in United States Patent Publication No. 2015/0349619.

Although existing tactile feedback actuators have been satisfactory to a certain degree, there remained room for improvement. For instance, there remained room for improvement in providing a tactile feedback actuator in which a magnetic hammer is controlled to perform a vibration, and in providing a tactile feedback actuator in which a magnetic hammer can be controlled selectively to provide either a vibration/silent mode or an audible mode.

SUMMARY

In an aspect, there is described a method of operating a tactile feedback actuator. The tactile feedback actuator has a magnetic hammer guidingly mounted for movement along a hammer path, a damper at one end of the hammer path, a stopper at a second end of the hammer path, and a coil element. The method can include one or more steps of activating the coil element in accordance with a predetermined sequence configured to produce a sequence of haptic effects, such as clicks and thumps, of similar or different strengths, which can simulate a real world event. Accordingly, a user holding an electronic device incorporating the tactile feedback actuator may feel and/or hear the sequence of haptics effects and recognize the simulated real world event.

In accordance with one aspect, there is provided a method of operating a tactile feedback actuator with a controller, the tactile feedback actuator having a magnetic hammer guidingly mounted for movement along a hammer path, a damper at a first end of the hammer path, a stopper at a second end of the hammer path, and a coil element, the method comprising: the controller receiving data indicative of coil activation instructions for moving the magnetic hammer to generate a sequence of haptic effects that simulate a real world event, the coil activation instructions including: a first instruction for generating a first haptic effect by activating the coil element for an instructed amplitude at a first polarity for an instructed duration to accelerate the magnetic hammer in a first direction towards the stopper along the hammer path and resulting in the magnetic hammer striking the stopper, and a second instruction for generating a second haptic effect by activating the coil element for an instructed amplitude at a second polarity for an instructed duration to accelerate the magnetic hammer in a second direction towards the damper along the hammer path and resulting in the magnetic hammer decelerating as the magnetic hammer is longitudinally slid towards the damper; and the controller activating the coil element upon processing the data indicative of the coil activation instructions to generate the sequence of haptic effects.

In accordance with another aspect, there is provided a computer-readable memory having stored thereon instructions executable by a computer to operate a tactile feedback actuator to generate a sequence of haptic effects that simulate a real world event, the tactile feedback actuator having a magnetic hammer guidingly mounted for movement along a hammer path, a damper at a first end of the hammer path, a stopper at a second end of the hammer path, and a coil element, the instructions comprising: a first instruction for generating a first haptic effect by activating the coil element for an instructed amplitude at a first polarity for an instructed duration to accelerate the magnetic hammer in a first direction towards the stopper along the hammer path and resulting in the magnetic hammer striking the stopper, and a second instruction for generating a second haptic effect by activating the coil element for an instructed amplitude at a second polarity for an instructed duration to accelerate the magnetic hammer in a second direction towards the damper along the hammer path and resulting in the magnetic hammer decelerating as the magnetic hammer is longitudinally slid towards the damper.

In accordance with another aspect, there is provided a method of operating a tactile feedback actuator, the tactile feedback actuator having a magnetic hammer guidingly mounted for movement along a hammer path, a damper at one end of the hammer path, a stopper at a second end of the hammer path, and a coil element, the method comprising: activating the coil element in accordance with a predetermined sequence, the predetermined sequence being configured to produce a sequence of haptic effects which simulate a real world event, the predetermined sequence including at least one of each of: activating the coil element with a given amplitude of a first polarity for a given duration, thereby accelerating the magnetic hammer in a first direction towards the stopper along the hammer path and resulting in the magnetic hammer striking the stopper; and activating the coil element with a given amplitude of a second polarity for a given duration, thereby accelerating the magnetic hammer in a second direction towards the damper along the hammer path and resulting in the magnetic hammer decelerating as the magnetic hammer is longitudinally slid towards the damper.

In accordance with another aspect, there is provided a computer-readable memory having stored thereon instruction data executable by a computer to perform a method of operating a tactile feedback actuator, the tactile feedback actuator having a magnetic hammer guidingly mounted for movement along a hammer path, a damper at one end of the hammer path, a stopper at a second end of the hammer path, and a coil element, the instruction data comprising: activating the coil element in accordance with a predetermined sequence, the predetermined sequence being configured to produce a sequence of haptic effects which simulate a real world event, the predetermined sequence including at least one of each of: activating the coil element with a given amplitude of a first polarity for a given duration, thereby accelerating the magnetic hammer in a first direction towards the stopper along the hammer path and resulting in the magnetic hammer striking the stopper; and activating the coil element with a given amplitude of a second polarity for a given duration, thereby accelerating the magnetic hammer in a second direction towards the damper along the hammer path and resulting in the magnetic hammer decelerating as the magnetic hammer is longitudinally slid towards the damper.

In accordance with another aspect, there is provided a method of operating a tactile feedback actuator, the tactile feedback actuator having a magnetic hammer guidingly mounted for movement along a hammer path, a damper at one end of the hammer path, a stopper at a second end of the hammer path, and a coil element, the method comprising: at least one of: activating the coil element with a given amplitude of a first polarity for a first duration, thereby accelerating the magnetic hammer in a first direction towards the stopper along the hammer path and resulting in the magnetic hammer striking the stopper; and activating the coil element with a given amplitude of the second polarity for a first duration, thereby accelerating the magnetic hammer in the second direction towards the damper along the hammer path and resulting in the magnetic hammer decelerating as the magnetic hammer is longitudinally slid towards the damper.

In another aspect, there is described a tactile feedback actuator which provides a rest position for the magnetic hammer. The rest position can be provided by exerting a force independent from the force generated by an electrical coil. This independent force can urge the hammer toward the dampened side when the hammer is moved away from the dampened side and from the rest position, at least to a certain extent.

In accordance with another aspect, there is provided a tactile feedback actuator having a stopper, a damper, a hammer path between the stopper and the damper, a coil element fixedly mounted relative to the hammer path, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

In accordance with another aspect, there is provided a method of operating a tactile feedback actuator, the tactile feedback actuator having a magnetic hammer guidingly mounted for movement along a hammer path, a damper proximate to one end of the hammer path, and a coil element, the method comprising: activating the coil element in a first polarity for a given duration to accelerate the magnetic hammer in the direction towards the damper along the hammer path; decelerating the approaching magnetic hammer and then accelerating the magnetic hammer in the direction away from the damper along the hammer path, at least partially via the damper; activating the coil element in the first polarity for a given duration to accelerate the magnetic hammer in the direction towards the damper along the hammer path; and repeating activating and decelerating steps to generate a tactile feedback.

In accordance with another aspect, there is provided an electronic device comprising a housing and a tactile feedback actuator mounted inside the housing, the tactile feedback actuator having a stopper, a damper, a hammer path between the stopper and the damper, a coil element fixedly mounted relative to the housing, and a magnetic hammer guidingly mounted for movement along the hammer path, the magnetic hammer having two opposite ends, each end of the magnetic hammer having a corresponding permanent magnet, the two permanent magnets having opposing polarities, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper.

In accordance with another aspect, there is provided a tactile feedback actuator having a magnetic hammer guidingly mounted for movement along a hammer path, the hammer having two opposite ends, each end of the hammer having a corresponding hammer magnet, the two hammer magnets having opposing polarities, a coil element activatable to generate a magnetic field which electromagnetically engages the magnetic hammer so as to be moved by the magnetic hammer along the hammer path in a given one of two opposite directions depending on a polarity of activation of the coil element, and a damper proximate to one end of the hammer path, the damper having a ferromagnetic element, and a damper magnet having a hammer-repulsive pole, the ferromagnetic element and the damper magnet being arranged in a manner that in the absence of activation of the coil element, the overall forces imparted by the ferromagnetic element and the damper magnet on the magnetic hammer cancel out when a portion of the magnetic hammer is at a rest position along the hammer path, attract the magnetic hammer when the portion of the magnetic hammer is between the rest position and the stopper, and repulse the magnetic hammer when the portion of the magnetic hammer is between the rest position and the damper.

In accordance with another aspect, there is provided a tactile feedback actuator having a stopper, a damper, a hammer path between the stopper and the damper, a coil element fixedly mounted relative to the hammer path, and a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer, and the damper being adapted for decelerating the magnetic hammer as the magnetic hammer is longitudinally slid towards the damper. In some embodiments, the magnetic hammer has two opposite ends, each end of the magnetic hammer having a corresponding permanent magnet, the two permanent magnets having opposing polarities. In some other embodiments, the magnetic hammer has at least one permanent magnet aligned along the hammer path, the magnetic hammer having a center offset from a center of the coil element along the hammer path when the magnetic hammer is in a rest position.

In accordance with another aspect, there is provided an electronic device comprising a housing and a tactile feedback actuator mounted inside the housing, the tactile feedback actuator having a stopper, a damper, a hammer path between the stopper and the damper, a coil element fixedly mounted relative to the housing, and a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, the stopper having a striking surface adapted for stopping the magnetic hammer and the damper being adapted for decelerating the magnetic hammer as the magnetic hammer is longitudinally slid towards the damper. In some embodiments, the magnetic hammer has two opposite ends, each end of the magnetic hammer having a corresponding permanent magnet, the two permanent magnets having opposing polarities. In some other embodiments, the magnetic hammer has at least one permanent magnet aligned along the hammer path, the magnetic hammer having a center offset from a center of the coil element along the hammer path when the magnetic hammer is in a rest position.

In accordance with another aspect, there is provided a tactile feedback actuator having a first magnetic dampening assembly, a second magnetic dampening assembly, the first and second magnetic dampening assemblies including a ferromagnetic element and a damper magnet having a hammer-repulsive pole, a hammer path between the first and second dampening assemblies, a coil element fixedly mounted relative to the hammer path, and a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, and the first and second dampening assemblies being adapted for decelerating the magnetic hammer as the magnetic hammer is longitudinally slid towards a corresponding one of the first and second dampening assemblies.

In accordance with another aspect, there is provided a tactile feedback actuator having a hammer path extending between a first end and a second end of the hammer path, a first damper at the first end of the hammer path, a coil element fixedly mounted relative to the hammer path, and a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, and the first damper being adapted for decelerating the magnetic hammer as the magnetic hammer is longitudinally slid towards the first damper. In some embodiments, the tactile feedback actuator comprises a stopper at the second end of the hammer path, the stopper having a striking surface adapted for stopping the magnetic hammer. In some other embodiments, the tactile feedback actuator comprises a second damper at the second end of the hammer path, the second damper being adapted for decelerating the magnetic hammer as the magnetic hammer is longitudinally slid towards the second damper. In these embodiments, the first damper can be a first magnetic dampening assembly and the second damper can be a second magnetic dampening assembly.

In accordance with another aspect, there is provided an electronic device comprising a housing and a tactile feedback actuator mounted inside the housing, the tactile feedback actuator having a hammer path extending between a first end and a second end of the hammer path, a first damper at the first end of the hammer path, a coil element fixedly mounted relative to the housing, and a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, and the first damper being adapted for decelerating the magnetic hammer as the magnetic hammer is longitudinally slid towards the first damper. In some embodiments, the tactile feedback actuator comprises a stopper at the second end of the hammer path, the stopper having a striking surface adapted for stopping the magnetic hammer. In some other embodiments, the tactile feedback actuator comprises a second damper at the second end of the hammer path, the second damper being adapted for decelerating the magnetic hammer as the magnetic hammer is longitudinally slid towards the second damper. In these embodiments, the first damper can be a first magnetic dampening assembly and the second damper can be a second magnetic dampening assembly.

It will be understood that the expression 'computer' as used herein is not to be interpreted in a limiting manner. It is rather used in a broad sense to generally refer to the combination of some form of one or more processing units and some form of memory system accessible by the processing unit(s). Similarly, the expression 'controller' as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 1 is a top plan view of an example of an electronic device incorporating a tactile feedback actuator, in accordance with an embodiment;

FIG. 2 is a top plan view of a first example of the tactile feedback actuator of FIG. 1, in accordance with an embodiment;

FIG. 2A is a cross-sectional view of the tactile feedback actuator of FIG. 1, taken along line 2A-2A of FIG. 2;

FIG. 2B is a cross-sectional view of the tactile feedback actuator of FIG. 1, taken along line 2B-2B of FIG. 2A;

FIG. 2C is a cross-sectional view of the tactile feedback actuator of FIG. 1, taken along line 2C-2C of FIG. 2;

FIG. 3 is a top plan view of a magnetic hammer of the tactile feedback actuator of FIG. 2, showing exemplary magnetic field lines therearound;

FIG. 4A is a sectional view of a coil element of the tactile feedback actuator of FIG. 2, showing exemplary magnetic field lines therearound when the coil element is activated with a first polarity;

FIG. 4B is a sectional view of a coil element of the tactile feedback actuator of FIG. 2, showing exemplary magnetic field lines therearound when the coil element is activated with a second polarity;

FIG. 5A and FIG. 5B show cross-sectional views of the tactile feedback actuator of FIG. 2 taken at different moments in time during a swing to the right of the magnetic hammer;

FIG. 6A and FIG. 6B show cross-sectional views of the tactile feedback actuator of FIG. 2 taken at different moments in time during a swing to the left of the magnetic hammer;

FIG. 7A is a graph showing an exemplary periodic activation function usable to activate a coil element of a tactile feedback actuator to generate both a tactile feedback and an audible feedback;

FIG. 7B is a graph showing an exemplary periodic activation function usable to activate a coil element of a tactile feedback actuator to generate a tactile feedback only;

FIG. 8 is a cross sectional view of a second example of a tactile feedback actuator, in accordance with an embodiment;

FIG. 9 is a cross-sectional view of a third example of a tactile feedback actuator including spring mounts, in accordance with an embodiment;

FIG. 10A is a cross-sectional view of a fourth example of a tactile feedback actuator including a leaf spring, in accordance with an embodiment;

FIG. 10B is a cross-sectional view of the tactile feedback actuator of FIG. 10A, showing the leaf spring in a curled state;

FIG. 10C is a cross-sectional view of the tactile feedback actuator of FIG. 10A, showing the leaf spring in an uncurled state;

FIG. 11A is a cross-sectional view of a fifth example of a tactile feedback actuator including a contact spring, in accordance with an embodiment;

FIG. 11B is a cross-sectional view of the tactile feedback actuator of FIG. 11A, showing the contact spring in a curled state;

FIG. 12A is a cross-sectional view of a sixth example of a tactile feedback actuator including scissor springs, in accordance with an embodiment;

FIG. 12B is a cross-sectional view of the tactile feedback actuator of FIG. 12A, showing the scissor springs in a curled state;

FIG. 12C is a cross-sectional view of the tactile feedback actuator of FIG. 12A, showing the scissor springs in an uncurled state;

FIG. 13A is a cross-sectional view of a seventh example of a tactile feedback actuator including flexures, showing a magnetic hammer in a central rest position, in accordance with an embodiment;

FIG. 13B is a cross-sectional view of the tactile feedback actuator of FIG. 13A, showing the magnetic hammer in a first rest position;

FIG. 13C is a cross-sectional view of the tactile feedback actuator of FIG. 13A, showing the magnetic hammer in a second rest position;

FIG. 16A and FIG. 16B show cross-sectional views of the tactile magnetic actuator of FIG. 14 taken at different moments in time during a swing to the left of the magnetic hammer;

FIG. 17A and FIG. 17B show cross-sectional views of the tactile magnetic actuator of FIG. 14 taken at different moments in time during a swing to the right of the magnetic hammer;

FIG. 18 is a cross-sectional view of a ninth example of a tactile feedback actuator with a magnetic hammer including a plurality of permanent magnets having aligned polarities, in accordance with an embodiment;

FIG. 19 is a top plan view of a tenth example of a tactile feedback actuator with a magnetic damper at each side of a hammer path of the tactile feedback actuator, in accordance with an embodiment;

FIG. 26A is a table representing an example of a database of pre-programmed haptic effect types, showing an haptic effect identifier and coil activation instructions for each one of the pre-programmed haptic effect types;

FIG. 26B is a table representing an example of a database of pre-programmed haptic effect types of different strengths, showing an haptic effect identifier and coil activation instructions for each one of the pre-programmed haptic effect types and strengths;

FIG. 28 is a table representing an example of a database of pre-programmed action types, showing an action identifier and coil activation instructions for each one of the pre-programmed action types;

FIG. 29 is a table representing an example of a database of pre-programmed real world event types, showing a real world event identifier and coil activation instructions for each one of the pre-programmed sequence real world event types;

FIG. 31A is a graph showing an example of a sequence of haptic effects to simulate a real world event such as firing a machine gun;

FIG. 31B is a graph showing an example of an activation function for producing the sequence of haptic effects of FIG. 31A;

FIG. 33A is a graph showing an example of a sequence of haptic effects to simulate a real world event such as firing a pistol;

FIG. 33B is a graph showing an example of an activation function for producing the sequence of haptic effects of FIG. 33A;

DETAILED DESCRIPTION

Figure 7C:
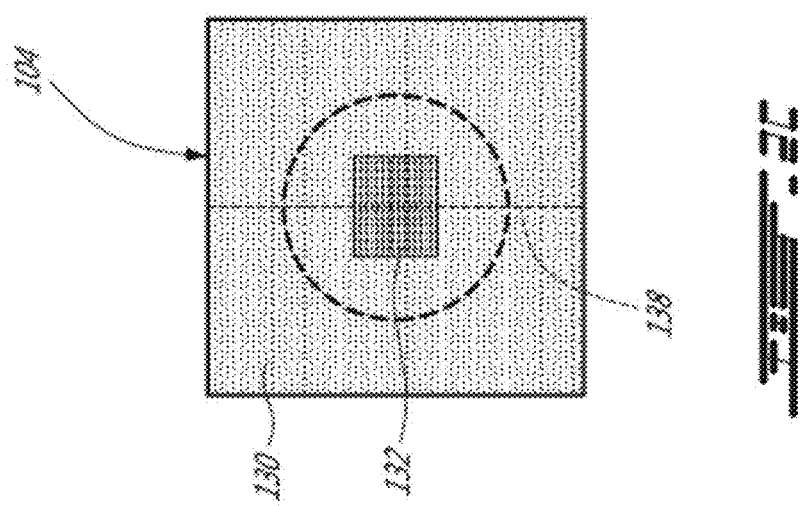
FIG. 7C is a graph showing an exemplary periodic activation function usable to activate a coil element of a tactile feedback actuator to generate a tactile feedback of an increased strength relatively to the tactile feedback generated using the activation function of FIG. 7B.
Figure 7C:
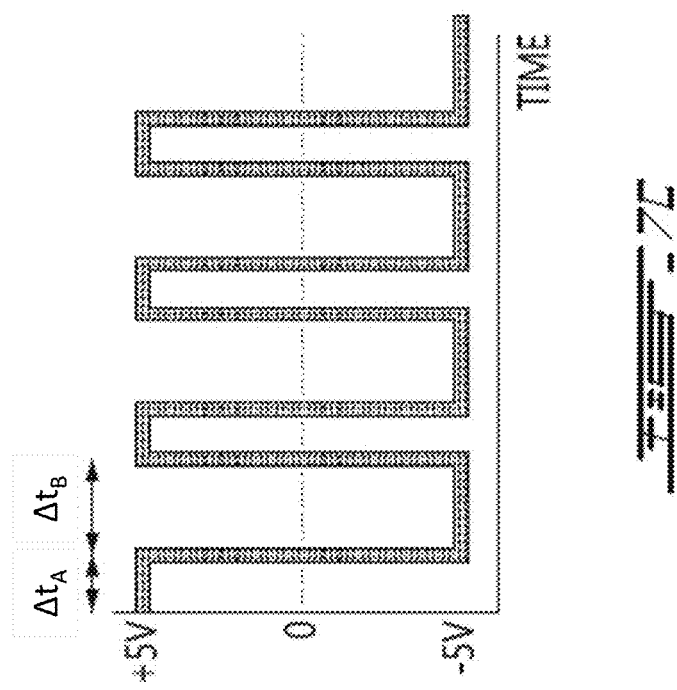

FIG. 1 shows a first example of an actuator 100 that can be operated to provide tactile feedback.

As depicted, the actuator 100 can be included in a handheld electronic device 10 (e.g., a smartphone, a tablet, a remote control, etc.). The actuator 100 can also be used to provide vibration/buzzing/audible functions in the electronic device 10, in lieu of a conventional vibration generator (e.g., a piezoelectric actuator).

The electronic device 10 generally has a housing 12 to which a tactile input interface 14 is provided. For instance, the tactile input interface 14 can be a touch-sensitive sensor or pressure sensor (of capacitive or resistive types). The tactile input interface 14 can include a touch-screen display. As shown in this example, the housing 12 houses and encloses the actuator 100 and a controller 16. The controller 16 is in communication with the tactile input interface 14 and with the actuator 100. The controller 16 can be part of a computer of the electronic device 10 (e.g., its main computing processing unit (CPU)) and/or be provided in the form of a separate micro-controller. It is noted that the electronic device 10 can include other electronic components such as ones found in conventional electronic devices. An example of an electronic device incorporating a pressure-sensitive user interface is described in PCT Patent Application No. PCT/CA2015/051110.

The controller 16 can be used to operate the actuator 100. For instance, during use, the tactile input interface 14 can receive a touch by a user which causes the interface 14 to transmit a signal to the controller 16 which, in turn, operates the actuator 100 to provide a tactile feedback, an audible feedback, or both, in response to the touch.

As can be appreciated, FIG. 2 is a top plan view of the actuator 100; FIG. 2A is a cross-sectional view of the actuator 100, taken along line 2A-2A of FIG. 2; FIG. 2B is a cross-sectional view of the actuator 100, taken along line 2B-2B of FIG. 2A; and FIG. 2C is a cross-sectional view of the actuator 100, taken along line 2C-2C of FIG. 2.

As depicted, the actuator 100 has a stopper 102, a damper 104, a hammer path 106 between the stopper 102 and the damper 104, and a coil element 108 fixedly mounted relative to the hammer path, as defined by the stopper 102 and the damper 104. A magnetic hammer 110 is guidingly mounted for movement along the hammer path 106.

As will be described herebelow, the magnetic hammer 110 is electromagnetically engageable by a magnetic field emitted upon activation of the coil element 108 so as to be longitudinally slid along the hammer path 106 in any one of two opposite directions depending on a polarity of activation of the coil element 108.

The stopper 102 has a striking surface 112 adapted for stopping the magnetic hammer 110 when the magnetic hammer 110 is longitudinally slid towards the stopper 102. In some embodiments, both an audible feedback and a tactile feedback are produced when the magnetic hammer 110 strikes the striking surface 112 of the stopper 102.

The damper 104 has a first function of decelerating the magnetic hammer 110 as the magnetic hammer 110 is longitudinally slid towards the damper 104. Accordingly, only a tactile feedback is produced when the magnetic hammer 110 changes direction in response to repulsive force exerted on the magnetic hammer 110 by the damper 104. The damper 104 can have a second function of providing a rest position (shown in FIG. 2B) to the magnetic hammer 110 wherein the magnetic hammer 110 is in a stable equilibrium along the hammer path 106 when the coil element 108 is deactivated.

In some embodiments, the stopper 102, the damper 104 and the coil element 108 are fixedly mounted to a housing 12. However, in some other embodiments, the stopper 102, the damper 104 and the coil element 108 are fixedly mounted to an interior of the electronic device 10.

The magnetic hammer 110 can be guidingly mounted relative to the coil element 108 differently depending on the embodiments. For instance, in the illustrated embodiment, a hammer path guide 114 is fixedly mounted relative to the stopper 102, the damper 104 and the coil element 108. More specifically, the hammer path guide 114 is provided along the hammer path 106, within the coil element 108 and snugly around the magnetic hammer 110 to longitudinally guide the magnetic hammer 110 in either direction. As best seen in FIG. 2A, the hammer path guide 114 is provided in the form of a sleeve. In this example, the magnetic hammer 110 defines a hollow center cavity 116 in which the magnetic hammer 110 is slidingly received. Any other suitable type of hammer path guide can be used. As described further below, such a hammer path guide can be omitted in some embodiments.

As illustrated, the coil element 108 is activatable by a signal source 124. The electromagnetic engagement between the coil element 108 and the magnetic hammer 110 is described in the following paragraphs.

More specifically, and referring now to FIG. 2B, the magnetic hammer 110 has two opposite ends 118L,118R. Each end 118L,118R of the magnetic hammer 110 has a corresponding one of two permanent magnets 120L,120R. As depicted, the permanent magnet 120L is provided proximate to the stopper 102 and the permanent magnet 120R is provided proximate to the damper 104.

For clarity, in this disclosure, it will be noted that reference numerals identified with the letter L will refer to elements shown at the left-hand side of the page whereas the letter R will refer to elements shown at the right-hand side of the page. For instance, the permanent magnet 120L refers to a first one of the two permanent magnets and is shown at the left-hand side of the page. Similarly, the permanent magnet 120R refers to a second one of the two permanent magnets and is shown at the right-hand side of the page. This nomenclature will apply to other components of the actuator 100.

The two permanent magnets 120L,120R have opposing polarities. For ease of understanding, north and south poles of such permanent magnets are identified with corresponding tags N or S. As will be described below, the two permanent magnets 120L, 120R have opposing polarities such that their magnetic poles form a S-N-N-S arrangement or a N-S-S-N arrangement along the magnetic hammer 110.

Each permanent magnet 120L,120R can include one or more permanent magnet units each sharing a similar polarity orientation. For instance, the permanent magnet 120L can include two permanent magnet units arranged such that the north pole of one of the two permanent magnet units be abutted on a south pole of the other one of the two permanent magnet units. Each permanent magnet 120L,120R can be made from a rare earth material, such as Neodymium-Iron-Boron (NdFeB), Samarium-cobalt, or from iron, nickel or any suitable alloys.

As can be seen, the magnetic hammer 110 has a middle segment 126 separating the two permanent magnets 120L, 120R. The middle segment 126 can be made from a ferromagnetic material or from any other suitable material.

As mentioned above, a first function of the damper 104 can be to decelerate the magnetic hammer 110 as the magnetic hammer 110 is longitudinally slid along the hammer path 106 towards the damper 104, and a second function of the damper 104 can be to provide a rest position where the magnetic hammer 110 is in a stable equilibrium between the stopper 102 and the damper 104, such as shown in FIG. 2B.

Many embodiments of the damper 104 can be provided, some of them are described herebelow. As will be described, some example dampers, such as the damper 104, achieve these functions using magnetic dampening only whereas some other example dampers achieve these functions using both magnetic dampening and mechanical dampening. More specifically, in some embodiments, both the first and second functions can be achieved using magnetic dampening. However, in some other embodiments, the first function may be achieved using mechanical dampening, magnetic dampening, or both, whereas the second function may be achieved using only magnetic dampening. In yet other embodiments, both the first and second functions can be achieved using mechanical dampening.

In this example, the damper 104 is provided in the form of a magnetic dampening assembly and will be referred to as "the magnetic dampening assembly 104". In this example, the magnetic dampening assembly 104 is adapted to achieve these two functions using magnetic dampening.

More specifically, the magnetic dampening assembly 104 has a ferromagnetic element 130 and a damper magnet 132 having a hammer-repulsive pole. As will be understood, the permanent magnet 120R of the magnetic hammer 110 tends to attract the ferromagnetic element 130 when the magnetic hammer 110 approaches the magnetic dampening assembly 104. In contrast, the permanent magnet 120R of the magnetic hammer 110 tends to repel the hammer-repulsive pole of the damper magnet 132 when the magnetic hammer 110 approaches the magnetic dampening assembly 104.

The ferromagnetic element 130 and the damper magnet 132 are arranged in a manner that in the absence of activation of the coil element 108, the overall magnetic forces imparted by the ferromagnetic element 130 and the damper magnet 132 on the magnetic hammer 110 i) mutually cancel out when a portion of the magnetic hammer 110 is at a rest position along the hammer path 106; ii) attract the magnetic hammer 110 when the portion of the magnetic hammer 110 is between the rest position and the stopper 102, and iii) repulse the magnetic hammer 110 when the portion of the magnetic hammer 110 is between the rest position and the magnetic dampening assembly 104.

Still referring to the embodiment illustrated in FIG. 2B, the portion of the magnetic hammer 110 is defined as a tip 136 of the permanent magnet 120R. However, the portion can be any reference part of the permanent magnet 120R proximate to the magnetic dampening assembly 104.

In some embodiments, the ferromagnetic element 130 of the magnetic dampening assembly may include an unmagnetized ferromagnetic material. For instance, the ferromagnetic element 130 may be made of steel. Other suitable unmagnetized ferromagnetic material may apply.

However, in some embodiments, the ferromagnetic element 130 of the magnetic dampening assembly 104 can be replaced, partially or wholly, by a permanent magnet (referred to as "an attractor magnet") having a hammer-attracting pole. In these embodiments, the attractor magnet and the damper magnet 132 have permanently-aligned poles of opposing polarities. Each of the attractor and damper magnets may be made from a rare earth material, such as Neodymium-Iron-Boron (NdFeB), Samarium-cobalt, or from iron, nickel or suitable alloys. It is noted that using the attractor magnet instead of an unmagnetized ferromagnetic material can help decrease the size of the ferromagnetic element 130 and/or can allow to position the ferromagnetic element 130 farther from the magnetic hammer 110, which may be convenient.

In this example, the ferromagnetic element 130 is substantially larger than the damper magnet 132 such that the net effect of the magnetic fields emanating from the magnetic dampening assembly 104 is to attract the permanent magnet 120R of the magnetic hammer 110 and cause the magnetic hammer 110 to move towards the magnetic dampening assembly 104 when the tip 136 of the magnetic hammer 110 is between the stopper 102 and the rest position. However, when the magnetic hammer 110 is pulled sufficiently close to the magnetic dampening assembly 104 (between the rest position and the magnetic dampening assembly 104), the repulsive force of the damper magnet 132 exerted on the permanent magnet 120R of the magnetic hammer 110 cancels out the attractive force between the ferromagnetic element 130 and the permanent magnet 120R of the magnetic hammer 110. In between, the magnetic hammer 110 is in a stable equilibrium at the rest position, such as shown in FIG. 2B. A similar effect can be achieved with an attractor magnet that is a stronger magnet than the damper magnet, for instance.

In this example, the magnetic hammer 110 and the magnetic dampening assembly 104 are aligned with one another and substantially parallel to the hammer path 106. As shown in FIG. 2C, the ferromagnetic element 130 and the damper magnet 132 are aligned with a silhouette 138.

Activation of the coil element 108 to move the magnetic hammer 110 in either direction can be described as follows. As shown in FIG. 3, the permanent magnets 120L,102R of the magnetic hammer 110 have opposing polarities and thus produce magnetic field lines such as the one shown in this figure. For instance, as can be seen, the north pole of each of the two permanent magnets 120L,120R is provided inwardly towards the middle segment 126 whereas the south pole of each of the two permanent magnets 120L,120R is provided outwardly from the middle segment 126.

The middle segment 126 is optional. For instance, in an embodiment where the middle segment 126 is omitted, the two permanent magnets 120L,120R are fastened together with sufficient strength to overcome the repelling forces between them.

Referring back to FIGS. 2, 2A, and 2B, the coil element 108 includes a plurality of turns or windings 140 of a conductive wire of a given diameter which wrap around the hammer path guide 114. The coil element 108 includes two wire ends 142L,142R to which is connected the signal source 124. In some embodiments, the coil element 108 includes 200-500 turns of 0.2 mm gauge insulated copper wire. In these embodiments, the hammer path guide 114 is provided in the form of a sleeve having an outer diameter of about 3.2 mm and the hollow center cavity 116 has an inner diameter of about 3 mm, as best seen in FIG. 2A.

In the embodiment shown, the two permanent magnets 120L,120R have a cylindrical shape of a length Lm of 6 mm and a diameter just under 3 mm (sized to fit through the hollow center cavity 116 of the hammer path guide 114). Still in this embodiment, the middle segment 126 has a cylindrical shape of a length of 7 mm and a diameter similar to the one of the two permanent magnets 120L,120R. It will be understood that people of ordinary skill in the art can choose alternate dimensions for alternate embodiments.

The lengths of the two permanent magnets 120L,120R and of the middle segment 126 can be selected in dependence of the span S of windings 140 of the coil element 108 as shown in FIG. 2. It is understood that the magnetic hammer 110 positioned such that when the permanent magnet 120L abuts on the stopper 102, the permanent magnet 120L is positioned so as to be attracted/pulled by the coil element 108 towards the center of the span S (to the right), and permanent magnet 120R is positioned so as to be repelled/pushed towards the magnetic dampening assembly 104. Similarly, when the magnetic hammer 110 is positioned at the rest position proximate to the magnetic dampening assembly 104, the permanent magnet 120R is positioned so as to be attracted/pulled by the coil element 108 towards the center of the span S, and the permanent magnet 120L is positioned so as to be repelled/pushed towards the stopper 102 when the coil element 108 is activated in the opposite polarity.

The magnetic field produced by the coil element 108 depends on the output of the signal source 124 (shown in FIG. 2), which governs the direction and amplitude of current flow in the coil element 108. Of interest is the direction of the magnetic field lines of the coil element 108 and the effect on the magnetic hammer 110 as to whether it repels or attracts corresponding ones of the two permanent magnets 120L,120R.

The coil element 108 can be activated by applying a given voltage V to the wire ends 142L,142R via the signal source 124. When activated, the coil element 108 forms an electromagnet having a given magnetic polarity with north (N) and south (S) poles at opposing sides of the coil element 108. This given magnetic polarity can be inverted by inverting the voltage V applied to the wire ends 142L,142R.

For instance, FIG. 4A shows that a given voltage of 5 V is applied to the coil element 108 whereas FIG. 4B shows that a given voltage of −5 V is applied to the coil element 108. In other words, changing the polarity of the voltage applied by the signal source is equivalent to inverting the flow direction of the electrical current I along the conductive wire of the coil element 108, and to inverting the polarity of the electromagnet, as shown by the upwards and downwards arrows near wire ends 142L,142R shown in FIGS. 4A and 4B.

For ease of reading, in the following paragraphs, the activation of the coil element 108 as shown in FIG. 4A can be referred to as "activation with a first polarity" whereas the activation of the coil element 108 as shown in FIG. 4B can be referred to as "activation with a second polarity". The first polarity being opposite to that of the first polarity.

During operation of the actuator 100, as detailed below with reference to FIGS. 5A and 5B, the coil element 108 can be activated to cause the magnetic hammer 110 to move towards the magnetic dampening assembly 104, in which case the magnetic dampening assembly 104 dampens the movement of the magnetic hammer 110 to prevent a strike between the magnetic hammer 110 and the magnetic dampening assembly 104 to provide a tactile feedback but not an audible feedback.

FIGS. 5A and 5B show an example of a movement sequence of the magnetic hammer 110 wherein the magnetic hammer 110 initially rests at a rest position proximate the magnetic dampening assembly 104, moves rightward towards the magnetic dampening assembly 104, in response to the activation of the coil element 108, and is repelled back to the rest position by the magnetic dampening assembly 104 when the coil element 108 is deactivated.

More specifically, FIGS. 5A and 5B include a snapshot at different moments in time t1 to t5 during the movement sequence wherein t5>t4>t3>t2>t1. As shown in FIG. 5A at moment in time t1, the magnetic hammer 110 is in the rest position. At this stage, the coil element 108 is not activated. The repulsive force of the damper magnet 132 exerted on the permanent magnet 120R of the magnetic hammer 110 cancels out the attractive force between the ferromagnetic element 130 and the permanent magnet 120R of the magnetic hammer 110. There is thus both a magnetic attraction between the permanent magnet 120R and the ferromagnetic element 130, and a magnetic repulsion between the permanent magnet 120R and the damper magnet 132 which maintains the magnetic hammer 110 in the rest position.

To initiate the movement of the magnetic hammer 110 in this sequence, the controller activates the coil element 108 by a voltage of a second polarity (e.g., −5V) to the coil element 108 via the signal source 124 in a manner to generate a magnetic force between the coil element 108 and the magnetic hammer 110. Such activation of the coil element 108 is maintained for the moments in time t2 and t3.

As shown in FIG. 5A, at moment in time t2, the activation of the coil element 108 causes acceleration of the magnetic hammer 110 from the rest position to a given velocity towards the magnetic dampening assembly 104. At this point, the activation of the coil element 108 attracts the permanent magnet 120L and repels the permanent magnet 120R towards the magnetic dampening assembly 104.

As shown in FIG. 5A at moment in time t3, the activation of the coil element 108 still causes the coil element 110 to attract the permanent magnet 120L and repel the permanent magnet 120R towards the magnetic dampening assembly 104. However, the magnetic repelling between the damper magnet 132 of the magnetic dampening assembly 104 and the permanent magnet 120R causes the magnetic hammer 110 to decelerate, eventually at a null speed, to avoid striking the magnetic dampening assembly 104.

As shown in FIG. 5B at moment in time t4, the tip 136 of the magnetic hammer is between the rest position and the magnetic dampening assembly 104 and the magnetic repelling between the damper magnet 132 and the permanent magnet 120R causes the magnetic hammer 110 to "bounce" without striking the magnetic dampening assembly 104 and to move towards the rest position, even when the coil element 108 is deactivated. The haptic feedback so produced can be referred to as a thump. In this way, a tactile feedback is produced but no audible feedback is produced.

As shown in FIG. 5B at moment in time t5, the magnetic hammer 110 returns to the rest position wherein the magnetic attraction between the permanent magnet 120R and the ferromagnetic element 130 and the magnetic repelling between the permanent magnet 120R and the damper magnet 132 both maintain the magnetic hammer 110 at the rest position.

Operation of the actuator 100 as shown in FIGS. 5A and 5B can create a thump including a tactile feedback. For instance, the thump can be provided in response to press of a button on a touchscreen of an electronic device including the actuator 100. The movement of the magnetic hammer 110 is dampened by the magnetic dampening assembly 104, and the magnetic hammer 110 does not strike the magnetic dampening assembly 104. Accordingly, the thump may be felt, but not heard.

Conversely, during operation of the actuator 100, as detailed below with reference to FIGS. 6A and 6B, the coil element 108 can be activated to push the magnetic hammer 110 towards the stopper 102, in which case the striking surface 112 of the stopper 102 can stop the movement of the magnetic hammer 110 to provide both a tactile feedback and an audible feedback (e.g., an audible click).

FIGS. 6A and 6B show an example of another movement sequence of the magnetic hammer 110 wherein the magnetic hammer 110 initially rests at a first rest position, proximate to the magnetic dampening assembly 104, moves leftward towards the stopper 102 to a second rest position, in response to the activation of the coil element 108.

More specifically, FIGS. 6A and 6B include a snapshot at different moments in time t6 to t10 during the movement sequence wherein t10>t9>t8>t7>t6. As shown in FIG. 6A, at moment in time t6, the magnetic hammer 110 is in the first rest position. At this stage, the coil element 108 is not activated. Both the magnetic attraction between the permanent magnet 120R and the ferromagnetic element 130 and the magnetic repulsion between the permanent magnet 120R and the damper magnet 132 maintain the magnetic hammer 110 in the first rest position.

As shown in FIG. 6A, at moment in time t7, the activation of the coil element 108 with a first polarity (e.g., +5V) causes acceleration of the magnetic hammer 110 from the first rest position to a given velocity towards the stopper 102. At this point, the activation of the coil element 108 repels the permanent magnet 120L and attracts the permanent magnet 120R towards the stopper 102. The magnetic repelling between the damper magnet 132 and the permanent magnet 120R can help in this step.

As shown in FIG. 6A at moment in time t8, the activation of the coil element 108 still causes the coil element 108 to repel the permanent magnet 120L and attracts the permanent magnet 120R towards the stopper 102.

As shown in FIG. 6B, at moment in time t9, the magnetic hammer 110 strikes the striking surface 112 of the stopper 102 at the given velocity which stops the movement of the magnetic hammer 110. The haptic feedback so produced can be referred to as a click.

Operation of the actuator 100 as shown in FIGS. 6A and 6B can create a click including both a tactile feedback and an audible feedback. For instance, the click can be provided in response to press of a button on a touchscreen of an electronic device including actuator 100. The strike of the magnetic hammer 110 against the stopper 102 can be audible, e.g., to simulate the sound of a button being depressed (e.g., a click). Accordingly, the click may be felt and heard. In some embodiments, the thump (i.e. the vibration) is weaker than the click. This may be desirable if an electronic device is in a silent mode, or for providing feedback that is less intrusive.

As shown in FIG. 6B, at moment in time t9, in some embodiments, the magnetic hammer 110 is maintained in the second rest position wherein the permanent magnet 120L abuts on the striking surface 112 of the stopper 102 even when the coil element 108 is deactivated. In these embodiments, the magnetic hammer 110 is maintained at the second rest position via magnetic attraction.

For instance, in these embodiments, the stopper 102 has a ferromagnetic portion 144 made integral thereto. The stopper 102 can be made in whole or in part of a ferromagnetic material (e.g., iron, nickel, cobalt, alloys thereof) so as be magnetically attracted by the permanent magnet 120L of the magnetic hammer 110. In the illustrated embodiment, however, the stopper 102 has a non-ferromagnetic portion 146 which is made integral to the ferromagnetic portion 144 of the stopper 102.

The ferromagnetic portion 144 of the stopper 102 can be sized to be sufficiently large to maintain the magnetic hammer 110 at the second rest position, but sufficiently small to allow the coil element 108 to induce the magnetic hammer 110 to move away from that second rest position when desired. For instance, the ferromagnetic portion 144 of the stopper 102 can be a steel plate.

The non-ferromagnetic portion 146 of the stopper 102 can be made of a non-ferromagnetic material (e.g., aluminium) such that it does not attract the magnetic hammer 110. The non-ferromagnetic portion 146 of the stopper 102 can be made of a material that transmits forces/vibrations imparted by the magnetic hammer 110 when striking the stopper 102. Referring back to FIG. 2, the stopper 102, and more specifically its non-ferromagnetic portions 146, is fixedly mounted relatively to the housing 12 such as to mechanically couple the actuator 100 to the housing 12 of the electronic device 10 to transmit forces/vibrations through such components. In some embodiments, the stopper 102 can be made out only of a ferromagnetic material. However, in this case, the stopper 102 is adapted such that magnetic attraction between the magnetic hammer 110 and the stopper 102 can allow the coil element 108 to dislodge the magnetic hammer 110 from the second rest position.

As will be understood, when the coil element 108 is not activated, the magnetic hammer 110 can be maintained in the first rest position via a combination of magnetic attraction and magnetic repelling or the magnetic hammer 110 can be maintained in the second rest position via magnetic attraction.

In some other embodiments, the stopper 102 can be made from a material that is not ferromagnetic (e.g., aluminium).

In this case, the actuator 100 only has the first rest position proximate to the magnetic dampening assembly 104. The material of the stopper 102 can be chosen for the sound made when the magnetic hammer 110 strikes its striking surface 112.

It is noted that the actuator 100 can be operated to perform any of the movement sequences described above either punctually to provide a punctual feedback or sequentially to provide a series of punctual feedback over a given duration.

For instance, the actuator 100 can be operated to perform the movement sequence shown in FIGS. 6A and 6B, wherein the magnetic hammer 110 moves from the first rest position to the second rest position, sequentially to provide a series of punctual feedback over a given duration. Such a movement can be obtained by activating the coil element 108 with a voltage of a first polarity until the magnetic hammer 110 travels from the first rest position proximate to the magnetic dampening assembly 104 to the stopper 102 to the second rest position in abutment on the stopper 102 and by subsequently activating the coil element 108 with a voltage of a second polarity until the magnetic hammer 110 travels back to the first rest position proximate to the magnetic dampening assembly 104. This specific movement sequence would cause a click including a tactile feedback and an audible feedback, and then cause a thump including a tactile feedback only, after which the movement of the magnetic hammer 110 can be stopped.

The actuator 100 can be operated such as to create a series of feedback. This behavior can be used to create vibration at the electronic device 10.

For instance, FIG. 7A shows an example activation function representing the voltage that can be applied to the coil element 108 by the signal source over time so as to force the magnetic hammer 110 to oscillate between the stopper 102 and the magnetic dampening assembly 104 to provide alternating thumps and clicks, which can translate into a series of inaudible soft taps accompanied by a series of audible sharp taps. Such an oscillating movement includes a plurality of half cycles (of half period T/2) or of full cycles (of period T) performed in a successive manner for a given amount of time. In this example, the magnetic hammer 110 starts at the second rest position.

Alternately, FIG. 7B shows an example activation function representing the voltage that can be applied to the coil element 108 by the signal source over time so as to force the magnetic hammer 110 to oscillate between the first rest position and the magnetic dampening assembly 104 to provide a series of thumps at each bounce. As can be seen, the activation of the coil element 108 includes maintaining the coil element 108 deactivated for a given duration. This activation function may be used to create a weaker vibration, which does not provide audible feedback.

It is envisaged that the amplitude and/or duty cycle of the activation function applied by the signal source can be adjusted, e.g., using a software stored on a memory of the controller of the electronic device. For example, the amplitude and/or the period can be adjusted to change, respectively, the strength and/or the frequency of the thumps and/or clicks.

Indeed, it was found that the strength of the clicks can be proportional to a linear momentum p carried by the magnetic hammer 110 at the moment of the impact between the magnetic hammer 110 and the stopper 102. Similarly, the strength of the thumps can be proportional to a linear momentum p carried by the magnetic hammer 110 at the moment the magnetic hammer 110 changes direction in response to repulsive force exerted on the magnetic hammer 110 by the magnetic dampening assembly 104 to produce a thump. Such linear momentum p can be proportional to the following relation:

$$p = m v_{impact}, \qquad (1)$$

where p is the linear momentum, m is the mass of the magnetic hammer 110 and $v_{impact}$ is the linear speed of the magnetic hammer 110 at the moment of its impact with the stopper 102. Now, the linear speed $v_{impact}$ can in turn be proportional to the following relation:

$$\mu_{impact}^2 = v_0^2 + 2a \cdot \Delta x, \qquad (2)$$

where a is the acceleration of the magnetic hammer 110 caused by activation of the coil element 108, $\Delta x$ is the acceleration length defined as the difference between a position of the magnetic hammer 110 where the acceleration initiates and a position of the magnetic hammer 110 where the acceleration ends, e.g., at impact with the stopper 102 or at a change of direction of the magnetic hammer 110 in response to repulsive force exerted on the magnetic hammer 110 by the magnetic dampening assembly 104, and $v_0$ is the linear speed of the magnetic hammer 110 wherein the acceleration initiates. Assuming that the force of friction between the magnetic hammer 110 and air is negligible, that the force of friction between the magnetic hammer 110 and the hammer path guide 114 is also negligible, that the actuator 100 is oriented such that the force of gravity is negligible, and so forth, Newton's second law of motion can be used to estimate the acceleration a to be proportional to:

$$a = \frac{F_m}{m}, \qquad (3)$$

where $F_m$ is the magnitude of the magnetic force exerted on the magnetic hammer 110 when the coil element 108 is activated with an amplitude V. The relationship between the magnitude of the magnetic force $F_m$ and the amplitude V at which the coil element 108 is activated can be proportional to:

$$F_m \propto \frac{AnV}{Rl}, \qquad (4)$$

wherein A is the cross-section of the magnetic hammer 110, n is the number of turns of the coil element 108, R is the electrical resistance of the coil element 108 and l is the length of the coil element 108. Assuming that the linear speed $v_0$ is null, it can be determined, using equations (1) through (4), that the linear momentum p is proportional to:

$$p \propto \sqrt{2m\Delta x \cdot \frac{AnV}{Rl}}, \qquad (5)$$

and that therefore the strength of the corresponding thump or click is proportional to both the acceleration length $\Delta x$ along which the magnetic hammer 110 is accelerated and the amplitude V at which the coil element 108 is activated during the acceleration.

Accordingly, in some embodiments, for producing a thump or a click of maximal strength, the magnetic hammer 110 is accelerated along a maximal acceleration length $\Delta x_{max}$ during which the coil element 108 is activated with a maximal amplitude $V_{max}$ so that the magnetic hammer 110 carries a maximal linear momentum $p_{max}$ proportional to:

$$p_{max} \propto \sqrt{2m\Delta x_{max} \cdot \frac{AnV_{max}}{Rl}} \quad (6)$$

when the magnetic hammer 110 strikes the stopper 102 or decelerates as the magnetic hammer 110 is longitudinally slid towards the damper.

Thumps or clicks of maximal strengths can be obtained even when the magnetic hammer 110 is at an intermediate position along the hammer path 106. For instance, to provide a thump of maximal strength when the magnetic hammer 110 is initially at an intermediate position (e.g., the rest position), the coil element 108 can be activated to move the magnetic hammer 110 back to the stopper 102. Once the magnetic hammer 110 is adjacent to the stopper 102, the coil element 108 can then be activated with a maximal amplitude $V_{max}$ of the second polarity so as to accelerate the magnetic hammer 110 towards the magnetic dampening assembly 104 all the way through the maximal acceleration length $\Delta x_{max}$, to provide a thump of maximal intensity.

FIG. 7C shows another example of an activation function representing the voltage that can be applied to the coil element 108 by the signal source over time to produce a series of thumps. As can be seen, the activation of the coil element 108 includes activating the coil element 108 in the second polarity for a given duration and in the first polarity for a given duration, wherein the activation in the first polarity and the activation in the second polarity differ in at least one of amplitude and duration.

Specifically, in this example, the activation function is used to cause the magnetic hammer 110 to oscillate between the stopper 102 and the magnetic dampening assembly 104, during which the magnetic hammer 110 decelerates as it is longitudinally slid towards the magnetic dampening assembly 104 until the magnetic hammer 110 changes direction in response to repulsive force exerted on the magnetic hammer 110 so as to produce a thump but does not strike the stopper 102 at each cycle. Indeed, assuming that the linear speed $v_0$ is null, an acceleration travel duration $\Delta t$ required for the magnetic hammer 110 to travel a corresponding acceleration length $\Delta x$ can be proportional to the following relation:

$$\Delta t = \sqrt{\frac{2m\Delta x}{F}} \quad (7)$$

Accordingly, as the acceleration length $\Delta x$ is proportional to the acceleration duration $\Delta t$, moving the magnetic hammer 110 over only a portion of the maximal acceleration length $\Delta x_{max}$ so that the magnetic hammer 110 does not strike the stopper 102 would require activating the coil element 108 with the maximal amplitude $V_{max}$ but for only a portion of the maximal acceleration duration $\Delta t_{max}$. Equivalently, moving the magnetic hammer 110 only over a portion of the maximal acceleration length $\Delta x_{max}$ could also be achieved by activating the coil element 108 with a less than maximal amplitude for a given duration.

In the example shown in FIG. 7C, a short pulse having an acceleration duration $\Delta t_A$ and an amplitude $V_{max}$ of the first polarity is used to move the magnetic hammer 110 closer to the stopper 102 without striking it, and a longer pulse having an acceleration duration $\Delta t_B$ and an amplitude $V_{max}$ of the second polarity is used to accelerate the magnetic hammer 110 towards the magnetic dampening assembly 104 to produce a thump.

The activation function shown in FIG. 7C can increase the amplitude of the thumps compared to the activation function shown in FIG. 7B, as the magnetic hammer 110 is accelerated towards the magnetic dampening assembly 104 over a longer portion of the hammer path 106, and thus decelerates the magnetic hammer 110 as it is longitudinally slid towards the magnetic dampening assembly 104 until the magnetic hammer 110 changes direction to produce a thump with almost a maximal momentum $p_{max}$.

To achieve a similar result, other activation functions could be used as well. For instance, considering that the acceleration duration $\Delta t$ is inversely proportional to the amplitude, as per equation (7), pulses of similar durations but different amplitudes could be used to achieve such a series of thumps.

More specifically, in a specific example, a first pulse having a given duration $\Delta t$ and an intermediate amplitude $V_i$ ($<V_{max}$) of the first polarity can be used to move the magnetic hammer 110 closer to the stopper 102 without striking it, and a second pulse having the same acceleration duration $\Delta t$ and the maximal amplitude $V_{max}$ of the second polarity can be used to decelerate the magnetic hammer 110 as it is longitudinally slid towards the magnetic dampening assembly 104 until the magnetic hammer 110 changes direction in response to repulsive force exerted on the magnetic hammer 110 by the magnetic dampening assembly 104 to produce a thump.

A similar technique may be used to increase the force by which the magnetic hammer 110 strikes the stopper 102. In particular, the coil element 108 can be activated in the second polarity to cause the magnetic hammer 110 to move towards the magnetic dampening assembly 104, before reversing the polarity of the coil element 108 to cause the magnetic hammer 110 to move towards the stopper 102 (and striking it). Indeed, when the activation of the coil element 108 is correctly timed, it can amplify the 'rebounding' action of the magnetic dampening assembly 104 to generate greater velocity and a stronger strike against the stopper 102, examples of which are provided below.

Thumps and/or clicks of intermediate strengths can also be produced. Indeed, as per equations (5) and (7), reducing the acceleration length $\Delta x$ along which the magnetic hammer 110 is accelerated, reducing the acceleration duration $\Delta t$ during which the magnetic hammer 110 is accelerated and/or reducing the amplitude with which the coil element 108 is activated can reduce the momentum with which the magnetic hammer 110 strikes the stopper 102 or is decelerated by the magnetic dampening assembly 104. More specifically, accelerating the magnetic hammer 110 along an intermediate acceleration length $\Delta x_i$, where $0<\Delta x_i<\Delta x_{max}$, and/or activating the coil element 108 with an intermediate amplitude $V_i$, where $0<V_i<V_{max}$, can provide thumps and/or clicks of intermediate, less than maximal strengths.

In some embodiments, the magnetic hammer 110 can be positioned so as to allow the magnetic hammer 110 to be accelerated along a maximal acceleration length $\Delta x_{max}$. In these embodiments, to provide thumps and/or clicks of intermediate strength, the coil element 108 is activated with a less than maximal, intermediate amplitude $V_i$, i.e. $0<V_i<V_{max}$. Indeed, by activating the coil element 108 with an intermediate amplitude $V_i$, the thump or click so produced would be of intermediate strength, even if the magnetic hammer 110 is accelerated over the maximal acceleration length $\Delta x_{max}$.

In some other embodiments, the magnetic hammer 110 can be positioned at an intermediate position along the hammer path 106, thus allowing the magnetic hammer 110 to be accelerated only along an intermediate acceleration length $\Delta x_i$. In these embodiments, the coil element 108 can be activated with either an intermediate amplitude $V_i$ or a maximal amplitude $V_{max}$ and still provide thumps and/or clicks of intermediate strengths.

Examples of activation functions to produce thumps and/or clicks of maximal or intermediate strengths are described in greater detail below.

Moreover, the amplitude and/or the duty cycle can be decreased to cause the magnetic hammer 110 to oscillate between the stopper 102 and the magnetic dampening assembly 104 but without producing clicks or thumps. It is noted that square waves can be generated easily, though the frequency and duty cycle can be controlled. To avoid an impact between the magnetic hammer and the stopper, one can change the polarity of the coil element at a moment in time before the magnetic hammer strikes it, and in sufficient time to decelerate the magnetic hammer. The precise timing can need to be tuned. In alternate embodiments, the position of the magnetic hammer 110 can be 'reset' to the center when desired, moved in half-swings, e.g. from the center position to the stopper 102 or the magnetic dampening assembly 104, or vice-versa. In another embodiment, the effects of gravity are compensated using a position sensor (e.g., a Hall-effect sensor to detect the magnetic field as affected by the position of the magnetic hammer) provided as part of the actuator and/or as part of the electronic device. For instance, to provide feedback for controlling the coil element (e.g., a PID controller or similar). A sensor based on current flowing through the coil element is used in another embodiment, although it is harder to measure current than to measure the magnetic field.

Referring back to FIG. 2, an example profile of force exerted by the magnetic dampening assembly 104 on the magnetic hammer 110 which is counter to the force exerted on the magnetic hammer 110 by the coil element 108 is shown at the bottom of the page. For example, when the coil element 108 is operated to move the magnetic hammer 110 from the first rest position towards the stopper 102 (in region 1), the magnetic dampening assembly 104 can provide an attraction force that pushes the magnetic hammer 110 towards the rest position. In this region, the magnetic attraction between the permanent magnet 120R and the ferromagnetic element 130 takes precedence over the magnetic repelling between the permanent magnet 120R and the damper magnet 132. In contrast, when the coil element 108 is operated to move the magnetic hammer 110 from the first rest position towards the magnetic dampening assembly 104 (region 2), the magnetic dampening assembly 104 provides a counter force that increases as the distance decreases. In this region, the magnetic repelling between the permanent magnet 120R and the damper magnet 132 takes precedence over the magnetic attraction between the permanent magnet 120R and the ferromagnetic element 130. Specifically, the counter force is proportional to the inverse fourth power of the distance in this example. However, the counter force can vary differently in other embodiments. For instance, in some embodiments, the counter force provided by the magnetic dampening assembly 104 in the region 2 can be approximately constant.

Actuator 200—Second Example

FIG. 8 shows a second example of an actuator 200 according to another embodiment. Still in this example, the first and second functions of the damper described above can be achieved using magnetic dampening via the magnetic dampening assembly 204. More specifically, the actuator 200 has a magnetic hammer 210 slidable along a hammer path 206 between a stopper 202 and the magnetic dampening assembly 204. Either or both the thumps and clicks described above can be provided using the actuator 200.

As shown, the actuator 200 has a coil element 208 fixedly mounted relatively to a housing 212 (e.g., a device interior), and the magnetic hammer 210 is longitudinally slidable along the hammer path 206 upon activation of the coil element 208. In these embodiments, the actuator 200 can be operated such that the generation of feedback is responsive to activating the coil element 208 with an activation function such as the ones shown in FIGS. 7A, 7B and 7C. However, it is understood that any other suitable activation function can be used in order to provide either or both the thumps and clicks described above.

In this specific embodiment, the magnetic dampening assembly 204 has an attractor magnet 231 separated from a damper magnet 232 via a spacer 248. The spacer 248 can be made from a ferromagnetic material. In this embodiment, the actuator 200 includes a hammer path guide 214 provided in the form of an elongated sleeve containing the magnetic hammer 210, and the magnetic dampening assembly 204.

As depicted, the magnetic hammer 210 is in the first rest position, wherein the tip 236 of the permanent magnet 220R of the magnetic hammer 210 is about 2.25 mm from the damper magnet 232. As it will be understood, any electronic device, such as the electronic device 10 of FIG. 1, can include the actuator 200.

Actuator 300—Third Example

FIG. 9 shows a third example of an actuator 300 according to another embodiment. In this example, the first and second functions of the damper described above can be achieved using mechanical dampening via the mechanical dampening assembly 304.

More specifically, the actuator 300 has a magnetic hammer 310 slidable along a hammer path 306 between two extremities of the hammer path 306. One of the two extremities of the hammer path 306 is proximate to the stopper 302 whereas the other one of the two extremities of the hammer path 306 is at the opposite of the stopper 302. Either or both the thumps and clicks described above can be provided using the actuator 300.

As depicted, the magnetic hammer 310 is mounted to a housing of an electronic device (e.g., the housing 12) using spring mounts 350 which are part of the mechanical dampening assembly 304. The spring mounts 350 can be configured to dampen the movement of the magnetic hammer 310 when the magnetic hammer 310 is moving in a direction away from the stopper 302. More specifically, the spring mounts 350 can be configured such that movement of the magnetic hammer 310 causes the spring mounts 350 to uncurl (thus causing minimal counterforce), and movement of the magnetic hammer 310 causes the spring mounts 350 to curl and provide a counterforce. The spring mounts 350 may be formed of leaf springs.

In this embodiment, the magnetic dampening assembly 104 of FIG. 2 and 204 of FIG. 8 can be omitted as the dampening is provided by the mechanical dampening assembly 304.

Actuator 400—Fourth Example

FIGS. 10A, 10B and 10C show a fourth example of an actuator 400 according to another embodiment. In this example, the first and second functions of the damper described above can be achieved using mechanical dampening via the mechanical damper 404.

More specifically, the actuator 400 has a magnetic hammer 410 slidable along a hammer path 406 and inside a hammer path guide 414. More specifically, the hammer path guide 414 is provided along the hammer path 406, within the coil element 408 and snugly around the magnetic hammer 410 to longitudinally guide the magnetic hammer 410 in either direction along the hammer path 406. Either or both the thumps and clicks described above can be provided using the actuator 400.

As depicted in this example, the mechanical damper 404 includes a leaf spring (referred to as "leaf spring 404") having an end 404a attached to the hammer path guide 414 and another end 404b attached to the magnetic hammer 410. At rest, the leaf spring 404 is adapted to provide the magnetic hammer 410 at the rest position shown in FIG. 10A.

As shown in FIG. 10B, the leaf spring 404 is in a curled state. More specifically, upon activation of the coil element 408 to move the magnetic hammer 410 towards the leaf spring 404, the leaf spring 404 curls to decelerate the magnetic hammer 410 until it changes direction to produce a thump, which can be felt but not heard.

In contrast, as shown in FIG. 10C, the leaf spring 404 is in an uncurled state. Specifically, upon activation of the coil element 408 to move the magnetic hammer 410 towards the stopper 402, the leaf spring 404 uncurls such as to allow the magnetic hammer 410 to strike the stopper 402 and produce a click, which can be felt and heard.

Actuator 500—Fifth Example

FIGS. 11A and 11B show a fifth example of an actuator 500 according to another embodiment. In this example, the first and second functions of the damper described above can be achieved using both magnetic and mechanical dampening via the damper assembly 504.

As shown, the actuator 500 has a magnetic hammer 510 slidable along a hammer path 506 and inside a hammer path guide 514. More specifically, the hammer path guide 514 is provided along the hammer path 506, within the coil element 508 and snugly around the magnetic hammer 510 to longitudinally guide the magnetic hammer 510 in either direction along the hammer path 506 and between the stopper 502 and the damper assembly 504. The damper assembly 504 can include any suitable type of spring (e.g., a coil spring, a leaf spring, etc.).

In this example, the damper assembly 504 includes a base 552 fixed relative to the stopper 502 and a contact spring 554. FIG. 11A shows the contact spring 554 in a curled state. More specifically, the contact spring 554 is used to dampen the movement of the magnetic hammer 510 as it is moved toward the damper assembly 504 to provide a thump, as shown in FIG. 11A.

In some embodiments, the contact spring 554 is made of a ferromagnetic material such that magnetic attraction between the permanent magnet 520R of the magnetic hammer 510 provides the first rest position as shown in FIG. 11B. In some other embodiments, the base 552 is made of a ferromagnetic material such that magnetic attraction between the permanent magnet 520R of the magnetic hammer 510 provides for the first rest position. In alternate embodiments, both the contact spring 554 and the base 552 are made of a ferromagnetic material, or eventually of a permanent magnet.

In some embodiments, the contact spring 554 is directly fixed relative to a housing (e.g., the housing 12 of the electronic device 10) such that the base 552 can be omitted. In this case, the damper assembly 504 can be referred to simply as a damper (not an assembly) and the contact spring 554 can be ferromagnetic.

Actuator 600—Sixth Example

FIGS. 12A, 12B and 12C show a sixth example of an actuator 600 according to another embodiment. In this example, the first and second functions of the damper described above can be achieved using mechanical and magnetic dampening via the mechanical damper 604.

More specifically, the actuator 600 has a magnetic hammer 610 slidable along a hammer path 606 and inside a hammer path guide 614. More specifically, the hammer path guide 614 is provided along the hammer path 606, within the coil element 608 and snugly around the magnetic hammer 610 to longitudinally guide the magnetic hammer 610 in either direction along the hammer path 606. Either or both the thumps and clicks described above can be provided using the actuator 600.

As depicted in this example, the mechanical damper 604 includes a pair of scissor springs (referred to as "scissor springs 604") each having an end 604a attached at a distal location of the hammer path guide 614 and another end 604b attached at a proximal location of the hammer path guide 614. At rest, the scissor springs 604 are adapted to provide the magnetic hammer 610 at the rest position shown in FIG. 12A.

In this embodiment, the scissor springs 604 are made of a ferromagnetic material such that magnetic attraction between the permanent magnet 620R of the magnetic hammer 610 provides the rest position as shown in FIG. 12A.

FIG. 12B shows the scissor springs 604 in a curled state. Indeed, upon activation of the coil element 608 to move the magnetic hammer 610 towards the scissor springs 604, the scissor springs 604 curl to decelerate the magnetic hammer 610 until it changes direction to produce a thump, which can be felt but not heard.

In contrast, FIG. 12C shows the scissor springs 604 in an uncurled state. More specifically, upon activation of the coil element 608 to move the magnetic hammer 610 towards the stopper 602, the scissor springs 604 uncurl such as to allow the magnetic hammer 610 to strike the stopper 602 and produce a click, which can be felt and heard.

Actuator 700—Seventh Example

FIGS. 13A, 13B and 13C show a seventh example of an actuator 700 according to another embodiment. In this example, the first and second functions of the damper described above can be achieved using magnetic dampening via the magnetic dampening assembly 704. The magnetic dampening assembly 704 is similar to the magnetic dampening assembly 104 and will thus not be described again.

In this example, the magnetic hammer 710 is mounted to a housing (e.g., the housing 12 of the electronic device 10 of FIG. 1) using flexures 760. Some examples of flexures are described in the literature (e.g., see http://web.mit.edu/mact/www/Blog/Fls/FrlexureIndex.html for more information regarding flexures).

The flexures 760 are configured to constrain movement of the magnetic hammer 710 in a hammer path 706 between a stopper 702 and the magnetic dampening assembly 704. Providing an actuator 700 with the flexures 760 eliminates the need to provide a hammer path guide, such as shown at 114 in FIG. 2, to constrain movement of the magnetic hammer 710.

FIG. 13A shows the magnetic hammer 710 at a central rest position between the stopper 702 and the magnetic dampening assembly 704.

FIG. 13B shows the bending of the flexures 760 when the magnetic hammer 710 is moved towards the magnetic dampening assembly 704 to produce a thump. As described above, in this case, the magnetic hammer 710 can be maintained in the first rest position.

In contrast, FIG. 13C shows the bending of the flexures 760 when the magnetic hammer 710 is moved towards the stopper 702 to produce a click. When a ferromagnetic portion 744 is provided to the stopper 702, attraction between the ferromagnetic portion 744 and the permanent magnet 720L of the magnetic hammer 710 can provide the second rest position.

Actuator 800—Eighth Example

Figure 14:
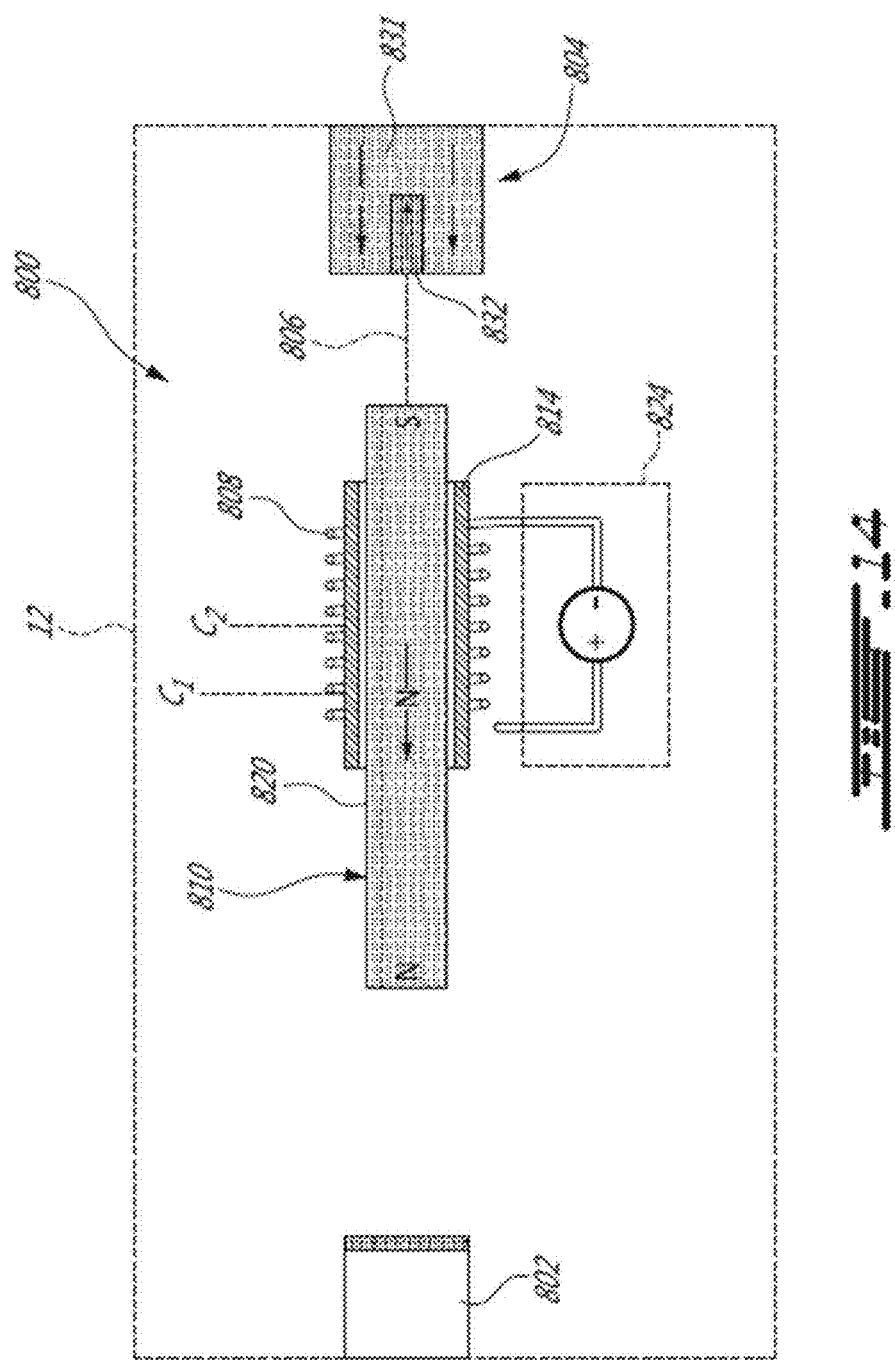
FIG. 14 is a cross-sectional view of an eighth example of a tactile feedback actuator with a magnetic hammer including a single permanent magnet, in accordance with an embodiment.

FIG. 14 shows an eighth example of an actuator 800 that can be operated to provide tactile feedback. Similarly to embodiments described above, the actuator 800 can be secured relative to the housing 12 of an electronic device in order to provide vibration/buzzing/audible functions to the corresponding electronic device.

Figure 15:
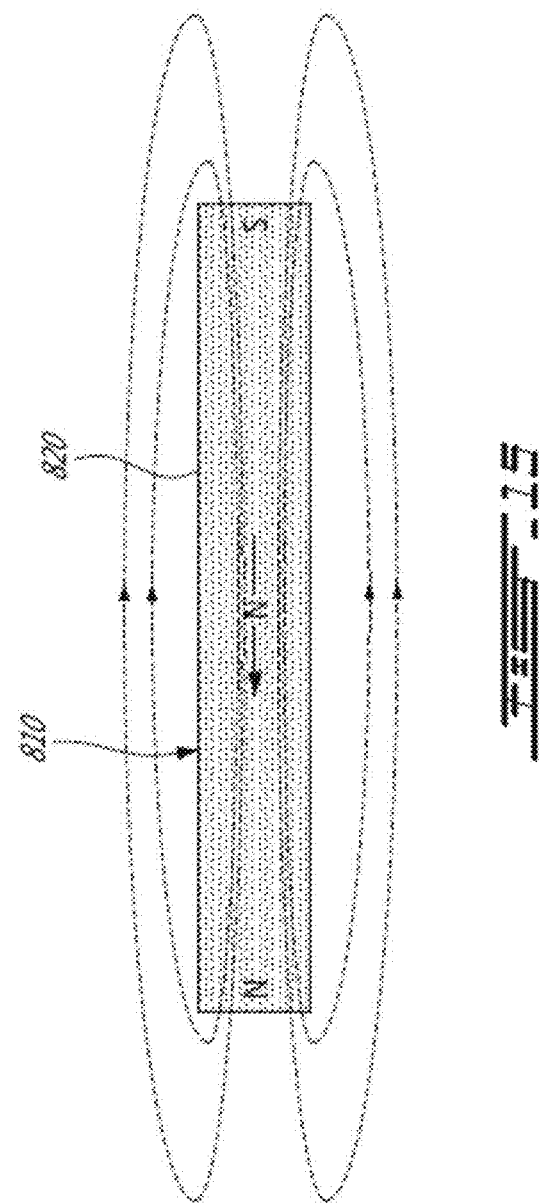
FIG. 15 is a top plan view of the magnetic hammer of FIG. 14, showing exemplary magnetic field lines therearound.

The actuator 800 has a stopper 802, a magnetic dampening assembly 804, a hammer path 806 defined between the stopper 802 and the magnetic dampening assembly 804, and a coil element 808 fixedly mounted relative to the hammer path 806. A magnetic hammer 810 is guidingly mounted for movement along the hammer path 806. In this example, the magnetic hammer 810 includes a single permanent magnet 820 having a north pole on the left side and a south pole on the right side. Accordingly, the magnetic hammer 810 has magnetic field lines which encircle the magnetic hammer 810 as shown in FIG. 15. The magnetic hammer 810 is thus different from the magnetic hammer 110 in that it has only one permanent magnet (or a plurality of permanent magnets having aligned polarities), instead of two permanent magnets of opposing polarities.

In this specific example, the magnetic dampening assembly 804 includes an attractor magnet 831 and a damper magnet 832. Both the attractor magnet 831 and the damper magnet 832 are made of a ferromagnetic material having permanently aligned poles. The magnetic hammer 810 is disposed within a hammer path guide 814 of the actuator 800 with magnetic poles aligned with the magnetic poles of the attractor magnet 831 such that the magnetic hammer 810 and the attractor magnet 831 are mutually attractive. As a consequence, the magnetic poles of the magnetic hammer 810 and the damper magnet 832 are mutually repulsive. The attractive and repulsive forces exerted on the magnetic hammer 810 by attractor magnet 831 and damper magnet 832, respectively, create a rest position along the hammer path 806 along which the magnetic hammer 810 can be slid.

However, as described above, the attractor magnet 831 can be replaced, partially or wholly, by a ferromagnetic element formed of material that is ferromagnetic but does not have permanently aligned poles. In these embodiments, the ferromagnetic element would need to be larger or placed closer to the magnetic hammer 810 in order to achieve a magnetic attraction similar to the magnetic attraction between the attractor magnet 831 and the magnetic hammer 810.

During operation of the actuator 800, as detailed below with reference to FIGS. 16A and 16B, the coil element 808 can be activated to cause the magnetic hammer 810 to move from the rest position towards the stopper 802, in which case the magnetic hammer 810 strikes the stopper 802 to provide an audible feedback (e.g., an audible click), before being attracted back towards the rest position via a magnetic attraction between the permanent magnet 820 and the attractor magnet 831 of the magnetic dampening assembly 804.

In the embodiment depicted in FIG. 14, a center C1 of the magnetic hammer 810 is offset relative to a center C2 of the coil element 808 along the hammer path 806. More specifically, in this example, the center C1 of the magnetic hammer 810 is to the left of the center C2 when the magnetic hammer 810 is in the rest position. Accordingly, the coil element 808 can be activated with a voltage of a given polarity to repel the magnetic hammer 810 leftward. Conversely, the coil element 808 can be activated with a voltage of an opposite polarity to attract the magnetic hammer 810 rightward until the center C1 of the magnetic hammer 810 moves past the center C2 of the coil element 808.

In this embodiment, no rest position for the magnetic hammer 810 is provided at the stopper 802. More specifically, the stopper 802 is formed of a material that is not magnetically attractive to the magnetic hammer 810. However, such an additional rest position can be provided in another embodiment.

As there is only one rest position, whenever the coil element 808 is unpowered, the magnetic hammer 810 will return to the rest position, under the influence of the magnetic dampening assembly 804.

FIGS. 16A and 16B show an example of a movement sequence of the magnetic hammer 810 wherein the magnetic hammer 810 initially rests at the rest position, proximate to the magnetic dampening assembly 804. More specifically, FIGS. 16A and 16B include a snapshot at different moments in time t1 to t5 during the movement sequence wherein t5>t4>t3>t2>t1.

As shown in FIG. 16A, at moment in time t1, the magnetic hammer 810 is in the rest position. At this stage, the coil element 808 is not activated. Both the magnetic attraction between the permanent magnet 820 and the attractor magnet 831, and the magnetic repulsion between the permanent magnet 820 and the damper magnet 832 maintain the magnetic hammer 810 in the rest position.

As shown in FIG. 16A, at moment in time t2, the activation of the coil element 808 with the second polarity (e.g., −5V) causes acceleration of the magnetic hammer 810 from the rest position to a given velocity towards the stopper 802. At this point, the activation of the coil element 808 repels the permanent magnet 820 towards the stopper 802. The magnetic repulsion between the damper magnet 832 and the permanent magnet 820 can help in this step.

As shown in FIG. 16A, at moment in time t3, the magnetic hammer 810 strikes a non-magnetic striking surface 812 of the stopper 802 at the given velocity which stops the movement of the magnetic hammer 810. Operation of the actuator 800 as shown in FIG. 16A can create a click including both a tactile feedback and an audible feedback.

As shown in FIG. 16B, at a moment in time t4 after said strike, the magnetic hammer 810 is attracted back into the rest position due to the magnetic attraction between the permanent magnet 820 and the attractor magnet 831 of the magnetic dampening assembly 804, even when the coil element 808 is deactivated, and returns in the rest position as shown at moment in time t5.

Conversely, during operation of the actuator 800, as detailed below with reference to FIGS. 17A and 17B, the coil element 808 can also be activated to cause the magnetic hammer 810 to move from a rest position towards the magnetic dampening assembly 804, in which case the magnetic dampening assembly 804 dampens the movement of the magnetic hammer 810 to prevent a strike between the magnetic hammer 810 and the magnetic dampening assembly 804 to provide a tactile feedback but not an audible feedback. The magnetic hammer 810 is then repelled back into the rest position by the damper magnet 832 of the magnetic dampening assembly 804.

FIGS. 17A and 17B show an example of another movement sequence of the magnetic hammer 810 wherein the magnetic hammer 810 initially rests at the rest position proximate the magnetic dampening assembly 804, moves rightwards towards the magnetic dampening assembly 804, in response to the activation of the coil element 808, and is repelled back to the rest position by the magnetic dampening assembly 804 when the coil element 808 is deactivated.

More specifically, FIGS. 17A and 17B include a snapshot at different moments in time t6 to t11 during the movement sequence wherein t11>t10>t9>t8>t7>t6. As shown in FIG. 17A at moment in time t6, the magnetic hammer 810 is in the rest position. At this stage, the coil element 808 is not activated and the magnetic hammer 810 rests at the rest position due to the magnetic equilibrium between the magnetic hammer 810 and the magnetic dampening assembly 804. More specifically, a repulsive force between the damper magnet 832 of the magnetic dampening assembly 804 and the permanent magnet 820 of the magnetic hammer 810 cancels out an attractive force between the attractor magnet 831 of the magnetic dampening assembly 804 and the permanent magnet 820 of the magnetic hammer 810.

To initiate the movement of the magnetic hammer 810 in this sequence, the controller activates the coil element 808 by a voltage of the first polarity (e.g., +5V) via the signal source 824 in a manner to generate a magnetic force between the coil element 808 and the magnetic hammer 810. This activation of the coil element 808 is maintained for the moments in time t7 and t8.

As shown in FIG. 17A, at moment in time t7, the activation of the coil element 808 causes acceleration of the magnetic hammer 810 from the rest position to a given velocity towards the magnetic dampening assembly 804. At this point, the activation of the coil element 808 attracts the permanent magnet 820 towards the magnetic dampening assembly 804.

As shown in FIG. 17A, at moment in time t8, the activation of the coil element 808 still causes the coil element 810 to attract the permanent magnet 820. The coil element 808 is deactivated before the center C1 of the magnetic hammer 810 passes the center C2 of the coil element 808. Then, as the magnetic hammer 810 continues to move towards the magnetic dampening assembly 804 due to momentum, the magnetic repelling between the damper magnet 832 of the magnetic dampening assembly 804 and the permanent magnet 820 causes the magnetic hammer 810 to decelerate, eventually at a null speed, to avoid striking the magnetic dampening assembly 804 and produce a thump.

As shown in FIG. 17B, at moment in time t9, the tip 836 of the magnetic hammer 810 lies between the rest position and the magnetic dampening assembly 804 and the magnetic repelling between the damper magnet 832 and the permanent magnet 820 causes the magnetic hammer 810 to "bounce" without striking the magnetic dampening assembly 804 and to move towards the rest position, even when the coil element 808 is deactivated. In this way, a tactile feedback is produced but no audible feedback is produced.

As shown in FIG. 17B, at moment in time t10, the magnetic hammer 810 returns to the rest position wherein both the magnetic attraction between the permanent magnet 820 and the attractor magnet 831, and the magnetic repelling between the permanent magnet 820 and the damper magnet 832 maintain the magnetic hammer 810 at the rest position.

Operation of the actuator 800 as shown in FIGS. 17A and 17B can create a thump including a tactile feedback. For instance, the thump can be provided in response to press a button on a touchscreen of an electronic device including the actuator 800. The movement of the magnetic hammer 810 is dampened by the magnetic dampening assembly 804, and the magnetic hammer 810 does not strike the magnetic dampening assembly 804. Accordingly, the thump may be felt, but not heard.

Actuator 900—Ninth Example

FIG. 18 shows a ninth example of an actuator 900 according to another embodiment. As shown, the actuator 900 has a coil element 908 fixedly mounted relatively to a hammer path guide 914, and a magnetic hammer 910 which is longitudinally slidable along a hammer path 906 defined by a stopper 902 on the right and a magnetic dampening assembly 904 on the left.

In this example, the magnetic hammer 910 includes a series of permanent magnets 920 having aligned polarities (i.e. aligned magnetic poles), forming a permanent magnet having a 2 mm diameter and a 6 mm length.

Still in this example, the damper magnet 932 is made of NdFeB N45. The damper magnet 932 has a 1 mm diameter and a 2 mm length.

Further in this example, the attractor magnet 931 is made of NdFeB N45. The attractor magnet 931 has a 2 mm diameter and a 7 mm length. The attractor magnet 931 and the damper magnet 932 are spaced from one another by a spacing distance of 0.5 mm along the hammer path 906, with the damper magnet 932 closer from the coil element 908 than the attractor magnet 931.

In this embodiment, the magnetic hammer 910 has a rest position of approximately 2.50 mm from the damper magnet 932 of the magnetic dampening assembly 904. The center C1 of the magnetic hammer 910 is 0.50 mm to the right of the center C2 of the coil element 908.

In this example, the hammer path guide 914 is made of acrylic plastic, the hammer path guide 914 has a length L1 of 25 mm, and has an end portions having rectangular cross-sections with sides of length L2 of 3.7 mm. As depicted, the end portion on the left is shaped and sized to receive the attractor magnet 931 and the damper magnet 932. The middle portion of the hammer path guide 914 has a circular cross-section of diameter 2.7 mm around which the coil element 908 is wrapped.

Actuator 1000—Tenth Example

FIG. 19 shows a tenth example of an actuator 1000 according to another embodiment. As depicted, the actuator 1000 can be housed within a housing 12 of an electronic device. In this example, the actuator 1000 has a first dampening assembly 1004L on the left, a second dampening assembly 1004R on the right, a hammer path 1006 between the first and second dampening assemblies 1004L and 1004R. A coil element 1008 is fixedly mounted relative to the hammer path 1006, and a magnetic hammer 1010 is guidingly mounted for movement along the hammer path 1006. As in the embodiment of FIG. 2, the magnetic hammer 1010 has two opposite ends wherein each end of the magnetic hammer 1010 has a corresponding one of two permanent magnets 1020L and 1020R. The two permanent magnets 1020L and 1020R have opposing polarities as described above.

In this embodiment, the magnetic hammer 1010 is electromagnetically engageable by a magnetic field emitted upon activation of the coil element 1008 so as to be longitudinally slid along the hammer path 1006 in any one of two opposite directions depending on a polarity of activation of the coil element 1008. Each one of the first and second dampening assemblies 1004L and 1004R is adapted for decelerating the magnetic hammer 1010 as the magnetic hammer 1010 is longitudinally slid towards a corresponding one of the first and second dampening assemblies 1004L and 1004R.

As can be seen, the first dampening assembly 1004L includes an attractor magnet 1031L and a damper magnet 1032L. Similarly, the second dampening assembly 1004R includes an attractor magnet 1031R and a damper magnet 1032R.

Using the first and second dampening assemblies 1004L and 1004R allows two rest positions to exist. More specifically, the magnetic hammer 1010 can rest in a first one of the two rest positions, proximate to the first dampening assembly 1004L or in a second one of the two rest positions, proximate to the second dampening assembly 1004R.

Haptic Effect—Click-Bounce Example

Figure 20:
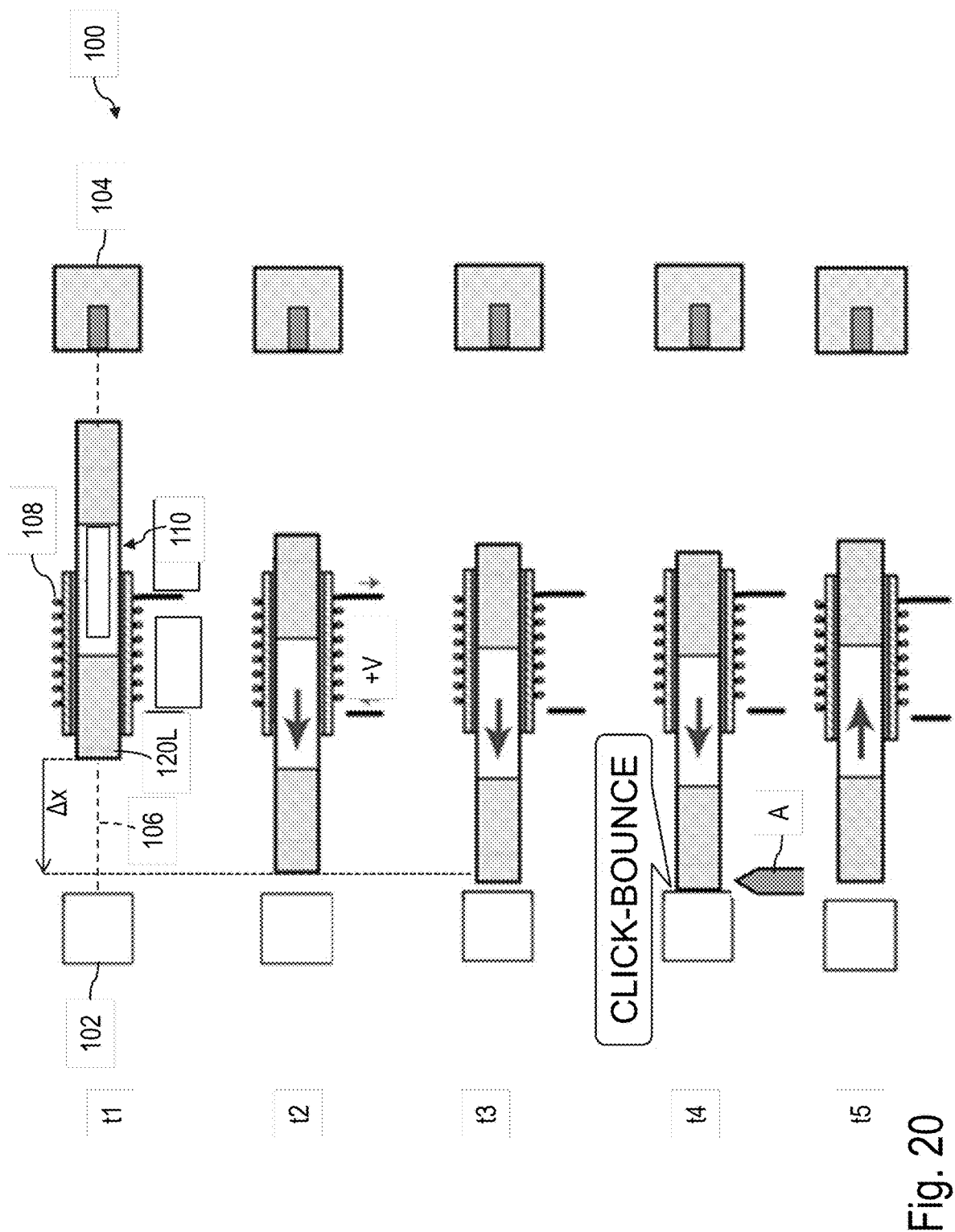
FIG. 20 shows cross-sectional views of the tactile feedback actuator of FIG. 2 taken at different moments in time during a swing to the right of the magnetic hammer to produce a click-bounce.

FIG. 20 shows an example of another movement sequence of the magnetic hammer 110. In this exemplary movement sequence, the magnetic hammer 110 initially lies at a first rest position along the hammer path 106, proximate to the damper 104. Upon activation of the coil element 108, the magnetic hammer 110 is moved leftward towards the stopper 102 so as to strike it, and then allowed to bounce after the strike.

More specifically, FIG. 20 includes a snapshot at different moments in time t1 to t5 during the movement sequence wherein t5>t4>t3>t2>t1. As shown in FIG. 20, at moment in time t1, the magnetic hammer 110 lies at the first rest position, leaving a spacing distance between an end of the permanent magnet 120L and the stopper 102. As discussed above, the magnetic hammer 110 can be accelerated along an acceleration length $\Delta x$, which may correspond to such spacing distance.

At moment in time t2, the coil element 108 is activated with a first amplitude V of the first polarity (e.g., +5 V), which causes the magnetic hammer 110 to be accelerated from the first rest position, along the acceleration length $\Delta x$ and towards the stopper 102.

At moment in time t3, the coil element 108 is deactivated, however, the momentum carried by the moving magnetic hammer 110 still causes the magnetic hammer 110 to move towards the stopper 102.

At moment in time t4, the magnetic hammer 110 strikes the stopper 102 with a given momentum to produce a click. Moreover, in this example, the magnetic hammer 110 strikes the stopper 102 and bounces back towards the damper 104 (e.g., back towards the first rest position) following impact, as shown at moment in time t5. The bouncing back can be achieved by deactivating the coil element 108 prior to the strike, which was the case in moment in time t3.

Such a haptic effect is referred to as a click-bounce herein, and is represented by pointy arrow A in FIG. 20. The click-bounce includes an audible feedback and a tactile feedback, and can thus be felt and heard by a user holding an electronic device incorporating the actuator 100. The strength of the click-bounce can be adjusted by modifying the acceleration length $\Delta x$ along which the magnetic hammer 110 is accelerated and/or the amplitude V with which the coil element 108 is activated.

Haptic Effect—Click-Press Example

Figure 21:
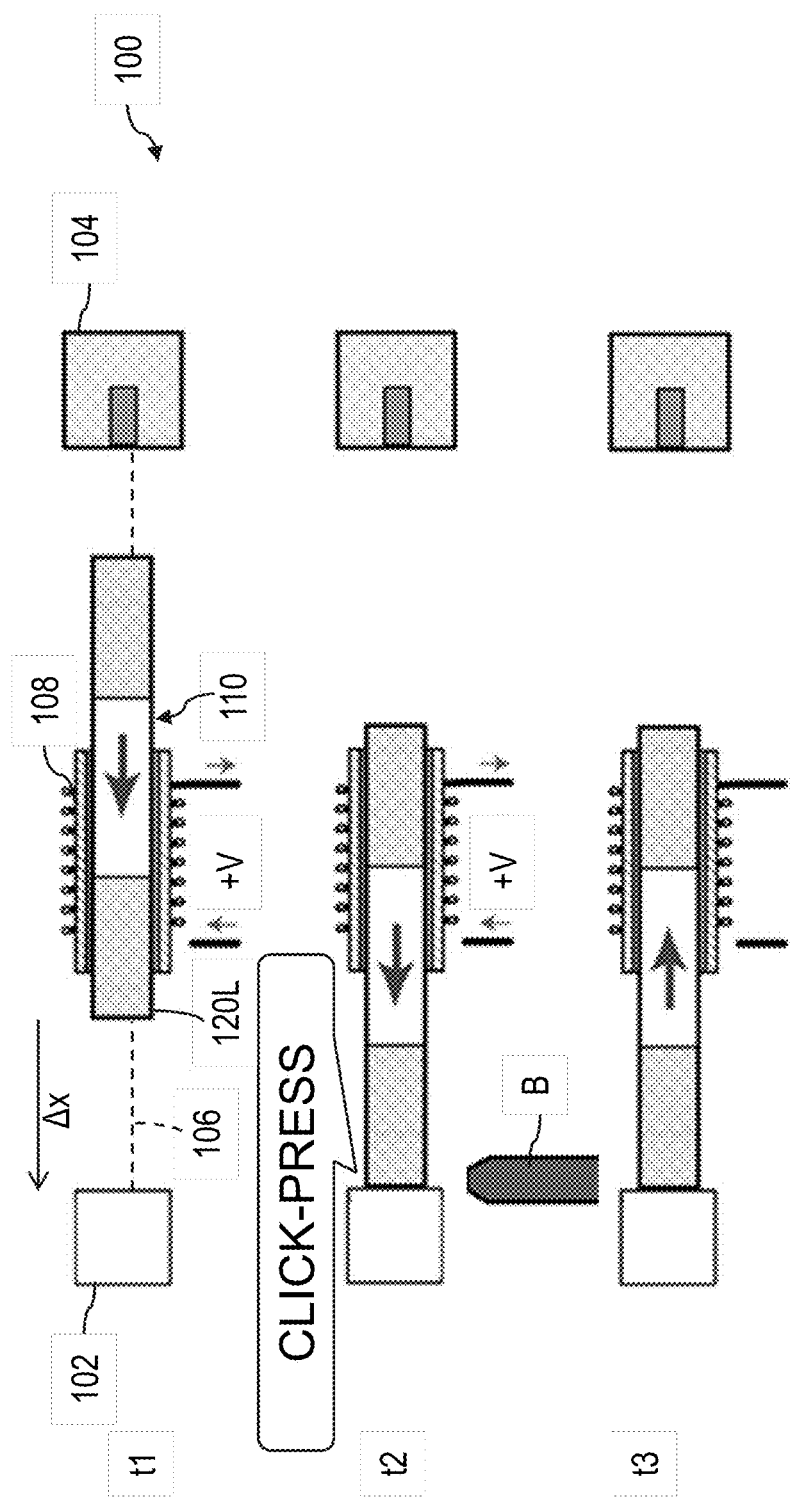
FIG. 21 shows cross-sectional views of the tactile feedback actuator of FIG. 2 taken at different moments in time during a swing to the left of the magnetic hammer to produce a click-press.

FIG. 21 shows an example of another movement sequence of the magnetic hammer 110. In this exemplary movement sequence, the magnetic hammer 110 is being moved leftward towards the stopper 102 so as to strike it in response to the activation of the coil element 108, and is not allowed to bounce after the strike.

More specifically, FIG. 21 includes a snapshot at different moments in time t1 to t3 during the movement sequence wherein t3>t2>t1. As shown in FIG. 21, at moment in time t1, the magnetic hammer 110 is being accelerated leftwards along an acceleration length $\Delta x$ as the coil element 108 is activated with a first amplitude V of the first polarity (e.g., +5 V).

At moment in time t2, the magnetic hammer 110 strikes the stopper 102 while maintaining the activation of the coil element 108 so as to press the magnetic hammer 110 onto the stopper 102 and thus refrain the magnetic hammer 110 from bouncing back towards the damper 104 for a given period of time.

At moment in time t3, the coil element 108 is deactivated and the magnetic hammer 110 moves towards damper 104, and more specifically towards the first rest position, which can be caused by way of magnetic attraction between the magnetic hammer 110 and the damper 104.

Such a haptic effect is referred to as a click-press herein, and is represented by truncated arrow B. The click-press includes an audible feedback and a tactile feedback, and can thus be felt and heard by a user holding an electronic device incorporating the actuator 100. The strength of the click-press can be adjusted by modifying the acceleration length $\Delta x$ along which the magnetic hammer 110 is accelerated and/or the amplitude V with which the coil element 108 is activated.

As can be understood, the haptic effect resulting from a click-bounce is different from that of a click-press. The click-bounce can thus be distinguished from the click-bounce from a user holding the electronic device, for instance. Indeed, the tactile feedback of the click-press can be different from the tactile feedback of the click-bounce. Similarly, the audible feedback of the click-press can be different from the audible feedback of the click-bounce.

Haptic Effect—Thump-Bounce Example

Figure 22:
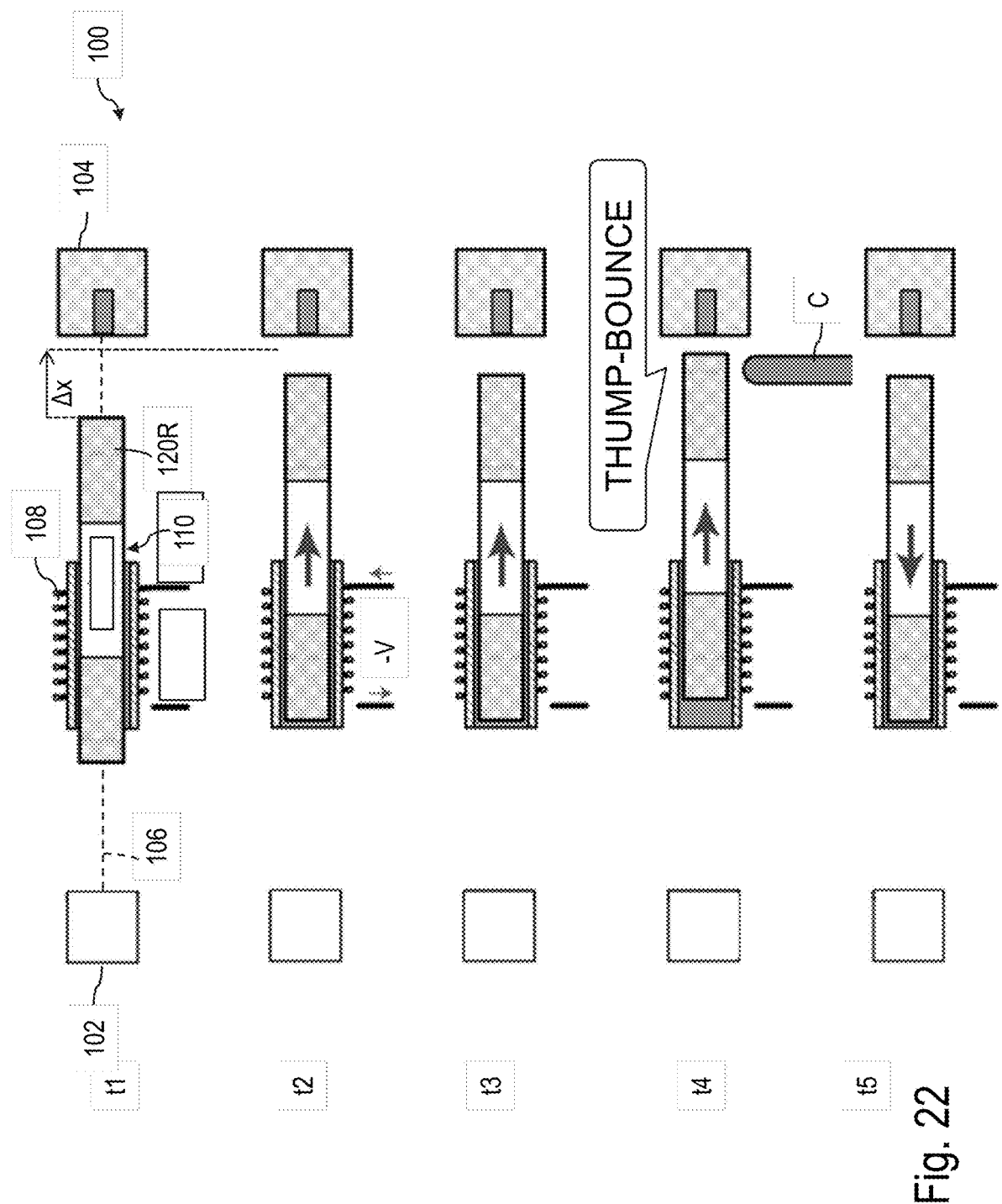
FIG. 22 shows cross-sectional views of the tactile feedback actuator of FIG. 2 taken at different moments in time during a swing to the right of the magnetic hammer to produce a thump-bounce.

FIG. 22 shows an example of another movement sequence of the magnetic hammer 110. In this exemplary movement sequence, the magnetic hammer 110 initially lies at the first rest position along the hammer path 106, proximate to the damper 104. The magnetic hammer 110 is moved rightwards towards the damper 104 so that the magnetic hammer 110 is decelerated by the damper 104 as it is longitudinally slid towards the damper 104 until the magnetic hammer 110 changes direction to produce a thump, in response to the activation of the coil element 108, and is allowed to bounce after the deceleration.

More specifically, FIG. 22 includes a snapshot at different moments in time t1 to t5 during the movement sequence wherein t5>t4>t3>t2>t1. As shown in FIG. 22, at moment in time t1, the magnetic hammer 110 lies at the first rest position, leaving a spacing distance between an end of the permanent magnet 120R of the magnetic hammer 110 and the damper 104. As discussed above, the magnetic hammer 110 can be accelerated along an acceleration length Δx, which may correspond to such spacing distance.

At moment in time t2, the coil element 108 is activated with a first amplitude V of the second polarity (e.g., −5 V), which causes the magnetic hammer 110 to be accelerated from the first rest position, along the acceleration length Δx and towards the damper 104.

At moment in time t3, the coil element 108 is deactivated, and the magnetic hammer 110 carries enough momentum to continue its movement towards the damper 104.

At moment in time t4, the magnetic hammer 110 reaches a given momentum prior to being decelerated by the damper 104 until the magnetic hammer 110 changes direction in response to repulsive force exerted on the magnetic hammer 110 to produce a thump. Moreover, in this example, the magnetic hammer 110 engages the damper 104 and bounces back towards the stopper 102 following impact, as shown at moment in time t5. The bouncing back can be achieved by deactivating the coil element 108 prior to the deceleration of the magnetic hammer 110 by the damper 104.

Such a haptic effect is referred to as a thump-bounce herein, and is represented by rounded tab C. The thump-bounce includes a tactile feedback, and can thus be felt by a user holding an electronic device incorporating the actuator 100. As discussed above, the strength of the thump-bounce can be adjusted by modifying the acceleration length Δx along which the magnetic hammer 110 is accelerated and/or the amplitude V with which the coil element 108 is activated.

Haptic Effect—Thump-Press Example

Figure 23:
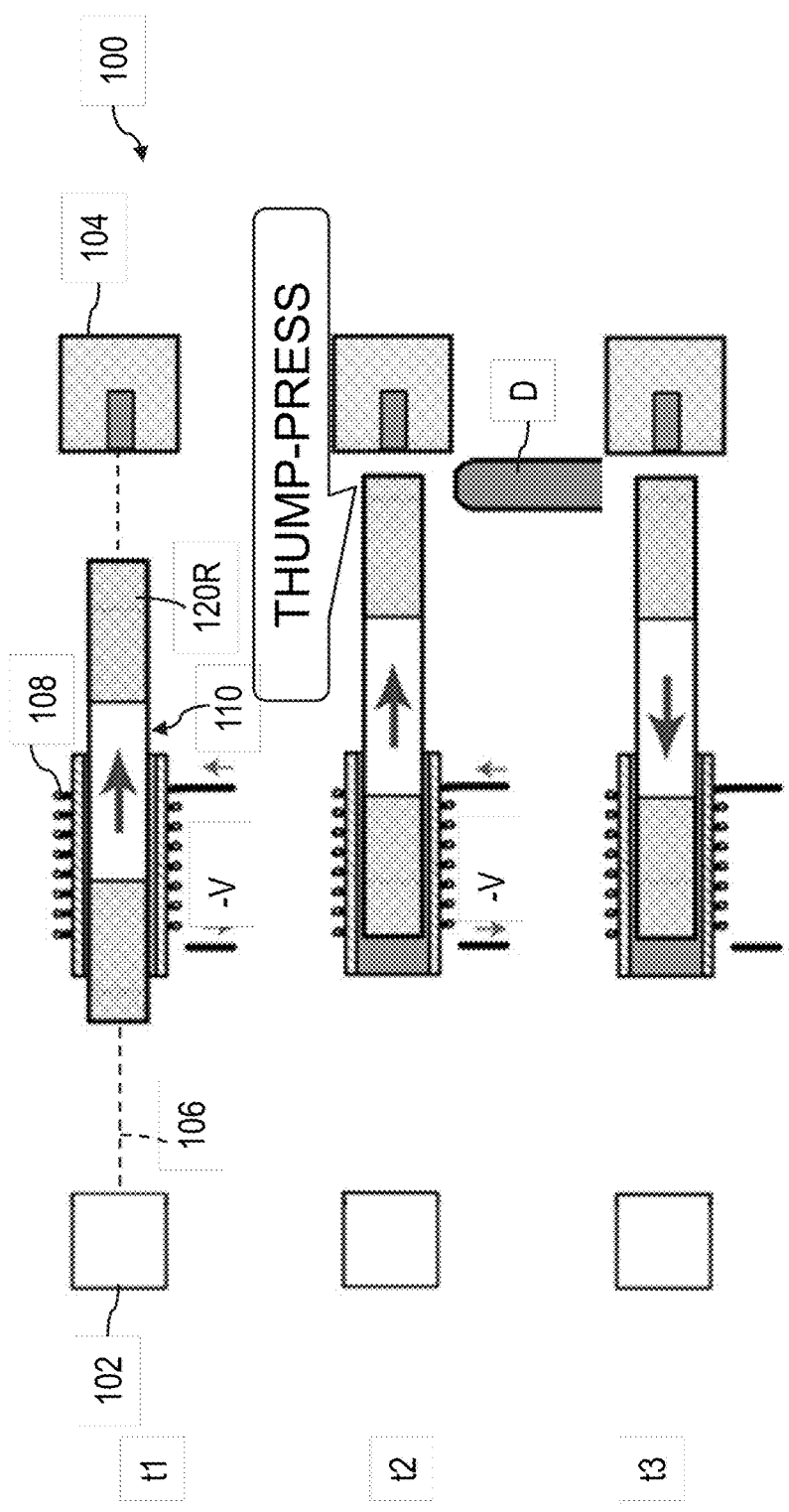
FIG. 23 shows cross-sectional views of the tactile feedback actuator of FIG. 2 taken at different moments in time during a swing to the right of the magnetic hammer to produce a thump-press.

FIG. 23 shows an example of another movement sequence of the magnetic hammer 110. In this exemplary movement sequence, the magnetic hammer 110 is being moved rightwards towards the damper 104 so as to produce a thump in response to the activation of the coil element 108, and is not allowed to bounce after the deceleration.

More specifically, FIG. 23 includes a snapshot at different moments in time t1 to t3 during the movement sequence wherein t3>t2>t1. As shown in FIG. 21, at moment in time t1, the magnetic hammer 110 is being accelerated rightwards along an acceleration length Δx as the coil element 108 is activated with a first amplitude V of the second polarity (e.g., −5 V).

At moment in time t2, the magnetic hammer 110 is decelerated by the damper 104 until the magnetic hammer 110 changes direction in response to repulsive force exerted on the magnetic hammer 110 to produce a thump while maintaining the activation of the coil element 108 so as to press the magnetic hammer 110 onto the damper 104 and thus refrain the magnetic hammer 110 from bouncing back towards the stopper 102 for a given period of time.

At moment in time t3, the magnetic hammer 110 is moving towards the stopper 102, and more specifically towards the first rest position, which can be caused by way of magnetic repulsion between the magnetic hammer 110 and the damper 104.

Such a haptic effect is referred to as a thump-press herein, and is represented by rounded corners tab D. The thump-press includes a tactile feedback, and can thus be felt by a user. The strength of the thump-press can be adjusted by modifying the acceleration length Δx along which the magnetic hammer 110 is accelerated and/or the amplitude V with which the coil element 108 is activated.

It is noted that the haptic effect resulting from a thump-bounce is different from that of a thump-press, and can be distinguished from one another from a user holding the electronic device, for instance. Indeed, the tactile feedback of the thump-press can be different from the tactile feedback of the thump-bounce.

As can be understood from the above, the coil element 108 can be activated with a given sequence to produce a sequence of haptic effects which simulate a real world event. The sequence of haptic effects can include an activation function to produce at least one click and at least one thump, where the click may be either click-bounce or a click-press and where the thump may either be a thump-bounce or a thump-press.

More specifically, the sequence can include at least one of activating the coil element 108 with a given amplitude V of a first polarity for a given duration Δt, thereby accelerating the magnetic hammer 110 in a first direction towards the stopper 102 along the hammer path 106 and resulting in the magnetic hammer 110 striking the stopper 102; and at least one of activating the coil element 108 with a given amplitude V of a second polarity for a given duration Δt, thereby accelerating the magnetic hammer 110 in a second direction towards the damper 104 along the hammer path 106 and resulting in the magnetic hammer 110 being decelerated by the damper 104 until the magnetic hammer 110 changes direction to produce a thump.

Various parameters of the haptic effects can be adjusted, such as e.g., the timing, strength or frequency (if repeated). Indeed, as discussed below, the different haptic effects produced by the actuator 100 may be sequenced in time, at various strengths, to create compound haptic effects, which may simulate the sensation of various real-world phenomena. Some compound haptic effects may, for example, be used to enhance the immersive quality of video games, virtual reality (VR)/augmented reality (AR) simulations, movies, etc. To this end, the actuator 100 may be included in game controllers (e.g., joysticks, gamepads), VR/AR peripherals such as hand-held controllers or headsets, hand-held devices such as smartphones or tablets, movie seats, etc.

As mentioned above, the actuator 100 is operated using the controller 16. The controller 16 can be provided as a combination of hardware and software components. The hardware components can be implemented in the form of a computing device 1100, an example of which is described with reference to FIG. 24. Moreover, the software components of the controller 16 can be implemented in the form of a software application 1110, an example of which is described with reference to FIG. 25.

Figure 24:
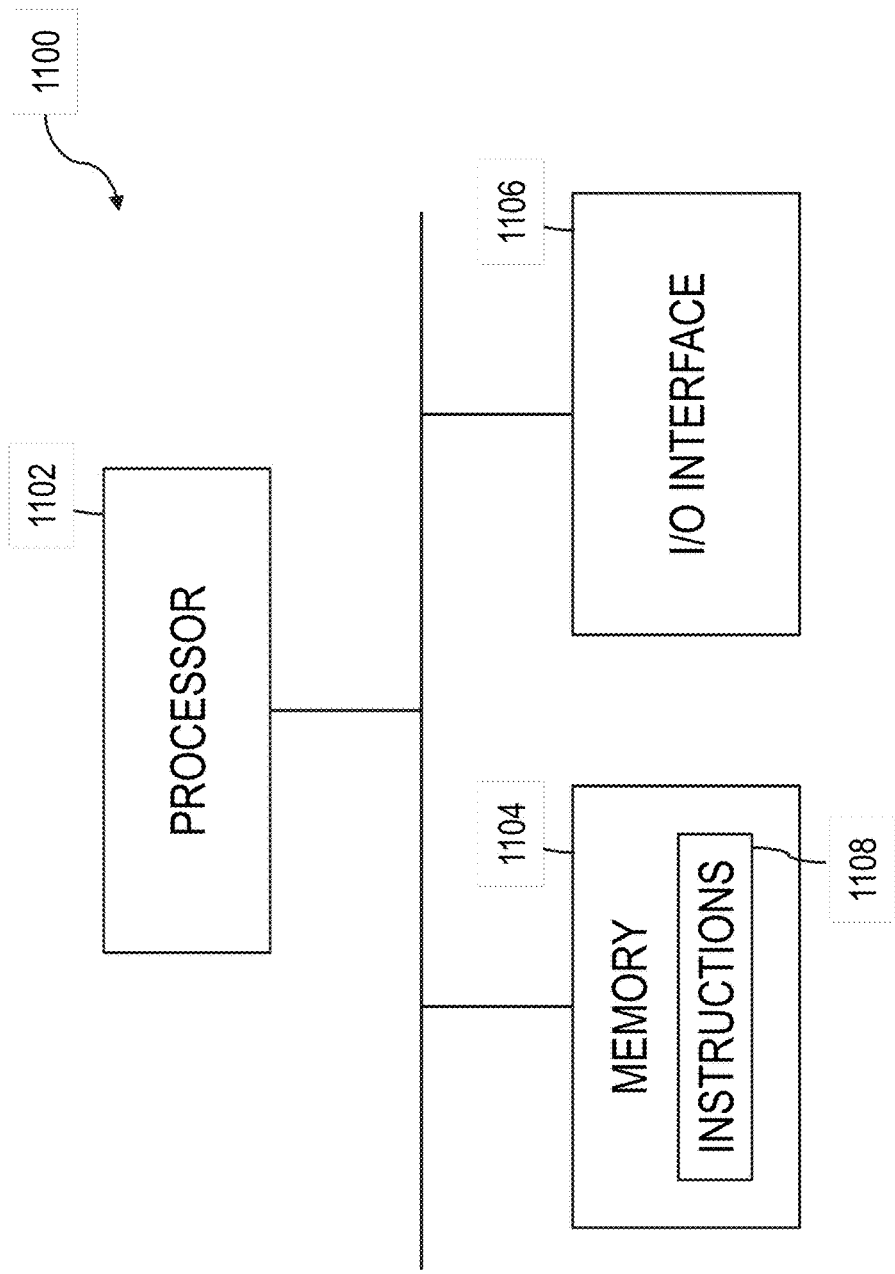
FIG. 24 is a schematic view of an example of a computing device for controlling the operation of a tactile feedback actuator.

Referring to FIG. 24, the computing device 1100 can have a processor 1102, a memory 1104, and I/O interface 1106. Instructions 1108 for operating the actuator 100 are stored on the memory 1104 and accessible by the processor 1102.

The processor 1102 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 1104 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables the computing device 1100 to interconnect with one or more input devices, such as the electronic device 10 and the user interface 14, or with one or more output devices such as the actuator 100.

Each network interface enables the controller 16 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, the computing device 1100 is communicatively coupled to the main CPU of the electronic device 10. The computing device 1100 can thus be separated from the main CPU of the electronic device 10. However, in some other embodiments, the computing device 1100 is provided as part of the main CPU of the electronic device 10.

Figure 25:
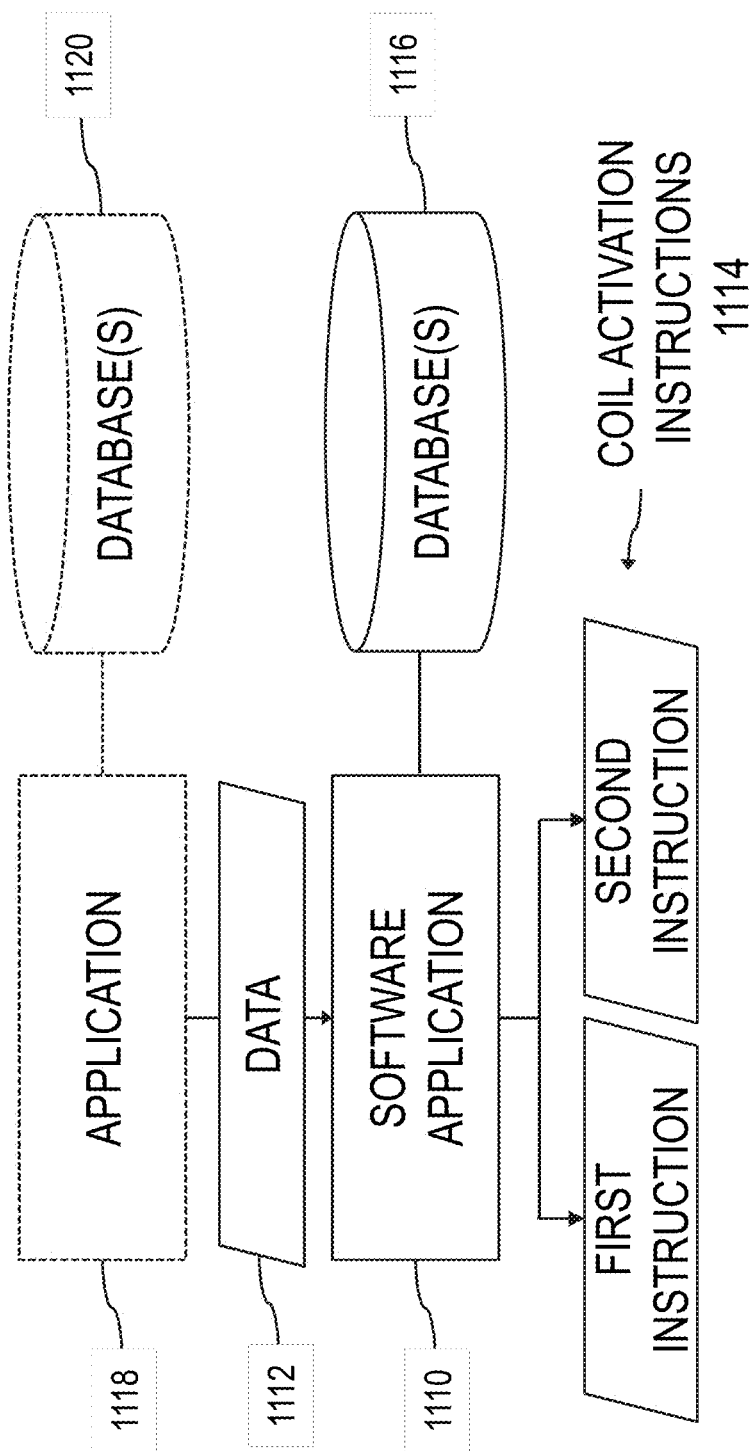
FIG. 25 is a schematic view of an example of a software application for controlling the operation of a tactile feedback actuator.

Referring now to FIG. 25, the software application 1110 is configured to receive data 1112 being indicative of coil activation instructions 1114 and to determine the coil activation instructions 1114 upon processing the data 1112.

The coil activation instructions 1114 include one or more instructions for generating a given haptic effect by activating the coil element 108 for an instructed amplitude at an instructed polarity for an instructed duration to accelerate the magnetic hammer 110 in one of the first and second directions along the hammer path 106, to generate the corresponding haptic effect(s).

In the illustrated example, the received data 1112 are indicative of coil activation instructions 1114 which include a first instruction to produce a first haptic effect and a second instruction to produce a second haptic effect.

Upon processing activation instructions 1114, the actuator 100 is activated by software application 1110 by way of electrical signals sent through I/O interface 1106.

In some embodiments, the software application 1110 is stored on the memory 1104 and accessible by the processor 1102 of the computing device 1100. In these embodiments, the software application 1110 can be communicatively coupled to an operating system ran by the main CPU of the electronic device 10. The software application 1110 can thus be separated from the operating system of the main CPU of the electronic device 10. However, in some other embodiments, the software application 1110 can be stored on a memory of the main CPU and accessible by a processor of the main CPU of the electronic device. In these embodiments, the software application 1110 can be part of and/or be an application executed by the operating system of the main CPU of the electronic device 10.

The computing device 1100 and the software application 1110 described above are meant to be examples only. Other suitable embodiments of the controller 16 can also be provided, as it will be apparent to the skilled reader.

As can be understood, based on the so determined coil activation instructions 1114, the software application 1110 can instruct the computing device 1100 to activate the coil element 108 of the actuator 100 in an instructed manner to generate the desired haptic effect(s).

In some embodiments, the received data 1112 correspond to the coil activation instructions 1114. In these embodiments, the determination of the coil activation instructions 1114 requires minimal processing of the data 1112.

In some other embodiments, the received data 1112 are only indicative of the coil activation instructions 1114, and processing is required to determine the coil activation instructions 1114 from the received data 1112. In such embodiments, one or more databases 1116 stored on the memory 1104 of the computing device 1100 and accessible to the software application 1110 can be used for the processing of the data 1112.

In these embodiments, the received data 1112 can correspond to an haptic effect identifier, in which case a database of pre-programmed haptic effect types such as the one shown in FIG. 26A can be used.

More specifically, FIG. 26A shows a table in which the haptic effect identifiers are associated to corresponding coil activation instructions. As shown, in this specific embodiment, the haptic effect identifier of a click-bounce is A, the haptic effect identifier of a click-press is B, the haptic effect identifier of a thump-bounce is C and the haptic effect identifier of a thump-press is D. Accordingly, when the received data 1112 identify a selection of the haptic effect identifier A, the software application 1110 can use the databases 1116 to determine the coil activation instructions associated to producing a click-bounce; when the received data 1112 identify a selection of the haptic effect identifier C, the software application 1110 can use the databases 1116 to determine the coil activation instructions associated to producing a thump-bounce, and so forth.

Additionally or alternately, the received data 1112 can correspond to an haptic effect identifier including a numerical indicator, in which case a database of pre-programmed haptic effect types such as the one shown in FIG. 26B can be used.

More specifically, FIG. 26B shows a table in which the haptic effect identifiers of different numerical indicators are associated to corresponding coil activation instructions. In this specific embodiment, the numerical indicator indicates a strength of the corresponding haptic effect, and varies between 1 and 5. Accordingly, when the received data 1112 identify a selection of the haptic effect identifier A1, the software application can use the databases 1116 to determine the coil activation instructions associated to producing a click-bounce of a first strength; when the received data 1112 identify a selection of the haptic effect identifier A2, the software application can use the databases 1116 to determine the coil activation instructions associated to producing a click-bounce of a second strength greater than the first strength, and so forth.

Figure 27:
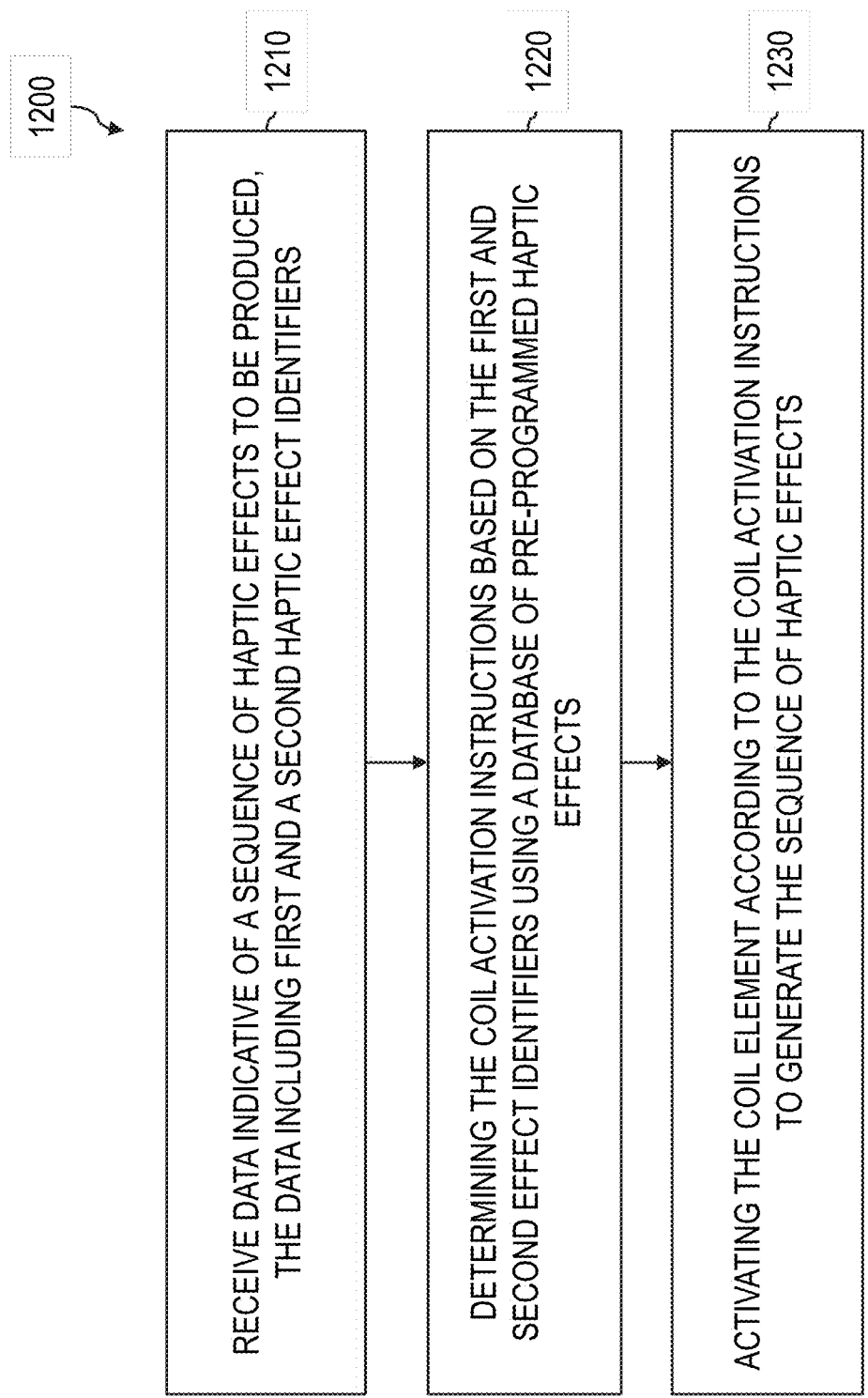
FIG. 27 is a flowchart of an example of a method for operating a tactile feedback actuator based on receiving haptic effect identifiers.

FIG. 27 shows a flowchart of an example method 1200 for operating the actuator 100. As depicted, at step 1210, the controller 16 receives data 1112 being indicative of a sequence of haptic effects to be produced. In this embodiment, the received data 1112 includes first and second haptic effect identifiers A and C, for instance. At step 1220, the controller 16 processes the first and second haptic effect identifiers A and C to determine corresponding coil activation instructions. In this specific example, the coil activation instructions associated with the haptic effect identifiers A and C can be determined from the table of FIG. 26A. At step

1230, the controller 16 activates the coil element 108 of the actuator 100 according to the coil activation instructions to generate the sequence of haptic effects.

In further embodiments, the received data 1112 can include actions to be performed by the actuator 100, in which case a database of pre-programmed instructions such as the one shown in FIG. 28 can be used.

More specifically, FIG. 28 shows a table including coil activation instructions associated to actions such as silence the actuator 100 and reinitialize the magnetic hammer 110 to a rest position. As shown, the numerical indicator of the action of silencing the actuator 100 corresponds to the duration of the corresponding silence. In this case, when the received data 1112 identify a selection of the identifier E1, the software application can use the databases 1116 to determine the coil activation instructions associated to producing a silence of a first duration; when the received data 1112 identify a selection of the identifier E2, the software application can use the databases 1116 to determine the coil activation instructions associated to producing a silence of a second duration longer than the first duration, and so forth.

The databases referenced to herein can be provided in the form of relational databases. The software application 1110 and/or the application 1118 can include or have access to a relational database management system to querying and maintaining the relational databases. In some other embodiments, the databases can be provided in the form of lookup tables, in-memory databases, Hadoop/NoSQL databases, virtualized or "federated" databases, columnar databases and/or streaming databases.

Figure 30:
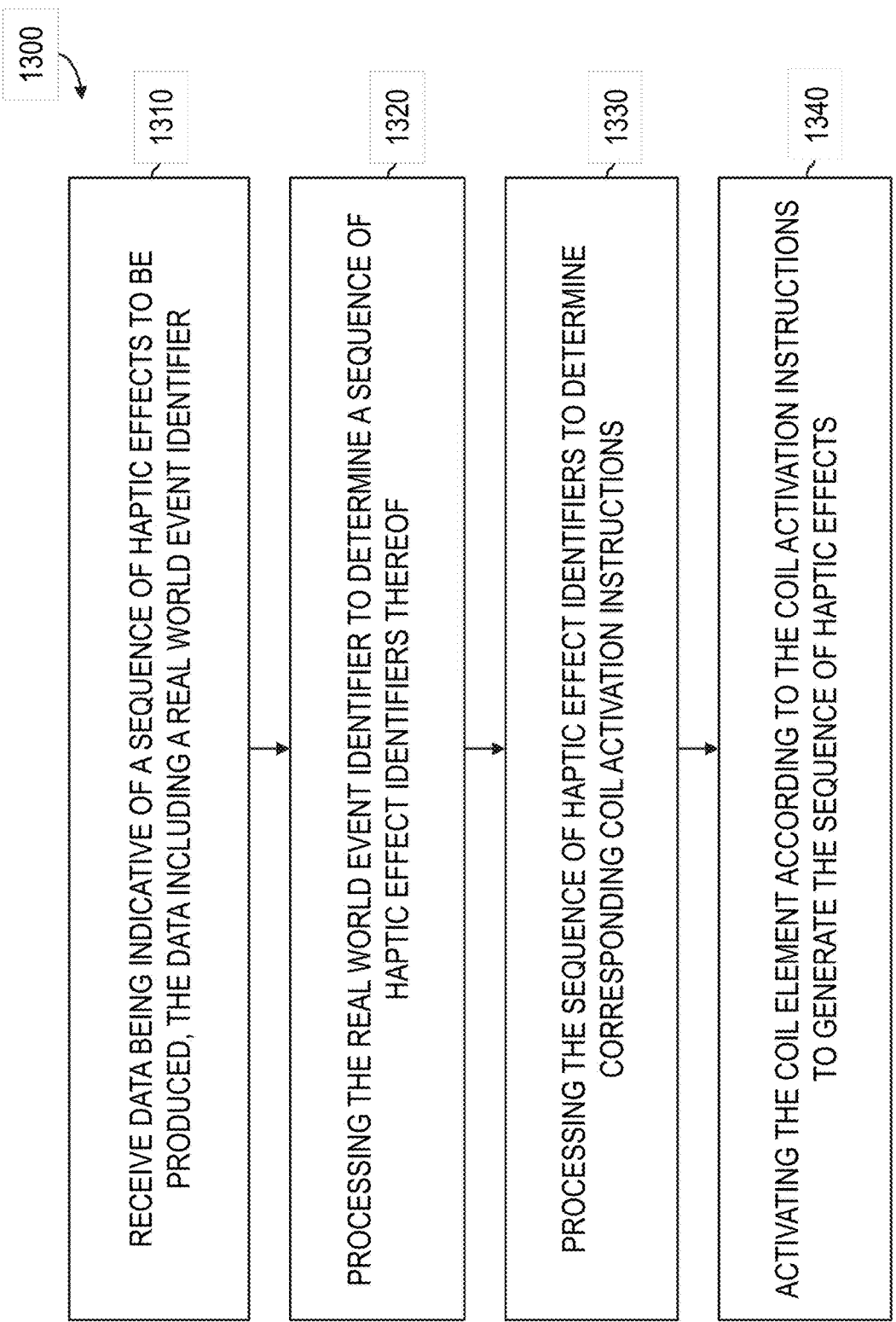
FIG. 30 is a flowchart of an example of a method for operating a tactile feedback actuator based on receiving a real world event identifier.

FIG. 30 shows a flowchart of an example method 1300 for operating the actuator 100. As depicted, at step 1310, the controller 16 receives data 1112 being indicative of a sequence of haptic effects to be produced. In this embodiment, the received data 1112 includes a real world event identifier "firing a shotgun" or J. At step 1320, the controller 16 processes the real world event identifier J to determine a sequence of haptic effect identifiers F, A5, E3, C5, E1, A3, E1 and C1 associated to the real world event identifier J. In this specific example, the sequence of haptic effect identifiers associated with the real world event identifier J can be determined from the table of FIG. 29. At step 1330, the controller 16 processes the sequence of haptic effect identifiers to determine corresponding coil activation instructions. In this specific example, the coil activation instructions associated with the haptic effect identifiers F, A5, E3, C5, E1, A3, E1 and C1 can be determined from the table of FIGS. 26B and 28. At step 1340, the controller 16 activates the coil element 108 of the actuator 100 according to the coil activation instructions to generate the sequence of haptic effects which simulates the real world event of firing a shotgun.

In some embodiments, the controller 16 sequentially activates the coil element 108 of the actuator 100 as function of a queue of coil activation instructions. During which, the controller 16 can monitor for an interrupt request, in which case the controller 16 may flush the coil activation instructions which are remaining in the queue.

In the following embodiments, the actuator 100 is operated with the controller 16 to generate a sequence of haptic effects. More specifically, the data 1112 are indicative of coil activation instructions to be performed for moving the magnetic hammer 110 to generate a sequence of haptic effects that simulate a real world event.

Such a sequence of haptic effects can include one or more of the haptic effects described above. For instance, in some embodiments, the sequence of haptic effects includes one or more clicks (e.g., click-bounce, click-press). In some other embodiments, the sequence of haptic effects includes one or more thumps (e.g., thump-bounce, thump-press). In alternate embodiments, the sequence of haptic effects can include a combination of clicks and thumps of varying types and/or of varying strengths.

In such embodiment, the coil activation instructions include at least a first instruction for generating a first haptic effect by activating the coil element 108 for an instructed amplitude at the first polarity for an instructed duration to accelerate the magnetic hammer 110 in a first direction towards the stopper 102 along the hammer path 106 and resulting in the magnetic hammer 110 striking the stopper 102, to produce a click; and a second instruction for generating a second haptic effect by activating the coil element 108 for an instructed amplitude at a second polarity for an instructed duration to accelerate the magnetic hammer 110 in a second direction towards the damper 104 along the hammer path 106 and resulting in the magnetic hammer 110 decelerating as the magnetic hammer 110 is longitudinally slid towards the damper 104, until the magnetic hammer 110 changes direction, to produce a thump. Upon processing the data 1112 indicative of the coil activation instructions 1114, the controller 16 activates the coil element 108 to generate the sequence of haptic effects.

In some embodiments, the received data 1112 can correspond to a sequence of haptic effect identifiers, in which case the controller 16 can process the received data 1112 using a database such as the database of pre-programmed haptic effect types of FIG. 26A and/or FIG. 26B.

In some other embodiments, the received data 1112 can correspond to a real world event or to an identifier thereof, in which a database of preprogrammed real world event types such as the one shown in FIG. 29 can be used.

More specifically, FIG. 29 shows a table in which each pre-programmed real world event (or each real world event identifier) is associated to corresponding sequence of haptic effect identifiers. Accordingly, when the received data 1112 identify a selection of the real world event "firing a machine gun" or to a selection of the identifier G, the controller 16 can use the databases 1116 to determine the coil activation instructions associated to producing the sequence of haptic effects which simulate firing a machine gun; when the received data 1112 identify a selection of the real world event "feeling a heartbeat" or to a selection of the identifier H, the controller 16 can use the databases 1116 to determine the coil activation instructions associated to producing the sequence of haptic effects which simulate feeling a heartbeat, and so forth.

As can be noticed by the presence of the action identifier F at the beginning of each one of the pre-programmed sequences of haptic effect identifiers, it can be convenient to reinitialize the position of the magnetic hammer 110 when beginning a new sequence of haptic effects.

Referring back to FIG. 25, in the illustrated embodiment, the received data 1112 are received from an application 1118 which can have access to databases 1120 such as a database of haptic effect identifiers, a database of action identifiers and/or a database of real world event identifiers.

The application 1118 and the database 1120 can be stored on a memory of the main CPU of the electronic device. For instance, the application 1118 can be a game which sends data to the software application 1110 when a given condition is met, so that the controller 16 activate the coil element 108 of the actuator 100 to produce the desired sequence of haptic effects. For instance, a given sequence of haptic effects may be performed when the application 1118 detects that a button is pressed. Some haptic effects of the sequence may be repeated as long as the pressing of the button is maintained. For instance, the real world event resembling firing a machine gun can be repeated as long as the application 1118 detects that a trigger button is maintained. Another sequence of haptic effects may be performed when the application 1118 determines that a player in the game knocks on a door and/or opens a door.

The following presents examples of sequences of haptic effects that can be produced to simulate real world events.

Sequence of Haptic Effects—Machine Gun Example

FIG. 31A shows a series of identifiers distributed over time representing a sequence of haptic effects including a plurality of successive click-bounces of a given strength interspersed with periods of silence, to simulate a real world event resembling firing a machine gun, for instance. Each click-bounce may thus correspond to a round being fired by the machine gun. Thirteen rounds are being shown in FIG. 31A.

In this specific case, the controller 16 can receive data indicative of the sequence of haptic effect identifiers A5, E2, A5, E2, etc., which the controller 16 processes to activate the coil element 108 of the actuator 100 to generate a sequence of haptic effects resembling firing a machine gun.

FIG. 31B shows an example of an activation function representing coil activation instructions used to provide such a sequence. As depicted, to provide a single click-bounce, the coil element 108 is first activated with a first amplitude V1 of the second polarity for a first duration $\Delta t1$ to accelerate the magnetic hammer 110 in a second direction towards the damper 104. Prior to the magnetic hammer 110 producing a thump, the coil element 108 is then activated with a second amplitude V2 of the first polarity for a second duration $\Delta t2$ to decelerate the magnetic hammer 110 and then to accelerate the magnetic hammer 110 in a first direction towards the stopper 102. Prior to the magnetic hammer 110 striking the stopper and for a period of time after said strike, the coil element 108 is maintained deactivated for a third duration $\Delta t3$, to allow the magnetic hammer 110 to bounce after the strike and thereby produce a click-bounce.

As can be understood, when the sequence described to produce a single click-bounce is repeated sequentially, a series of click-bounces can be produced. Indeed, by adjusting the active identifiers corresponding to silence, the timing of the click-bounces can be adjusted as desired. For instance, modifying the action identifier E2 for action identifier E1 would increase the frequency of the corresponding haptic effects whereas modifying the action identifier E2 for action identifier E3 would provide more time between two successive haptic effects.

More specifically, in this example, the strength of the click-bounces is adjusted so as to be maximal. Accordingly, the haptic effect identifier selected is A5 in this example. As shown in FIG. 26B, the coil activation instructions includes activating the coil element 108 with a first amplitude V1 for a first duration $\Delta t1$ to position the magnetic hammer 110 adjacent the damper 104 without producing a thump, and allowing a maximal acceleration length $\Delta x_{max}$ between the magnetic hammer 110 and the stopper 102. Moreover, the coil activation instructions includes activating the coil element 108 with a second amplitude V2 set to the maximal amplitude $V_{max}$ of the coil element 108 and is maintained for a second duration $\Delta t2$, during acceleration of the magnetic hammer 110 along the maximal acceleration length $\Delta x_{max}$ towards the stopper 102, so that the magnetic hammer 110 strikes the stopper 102 with a maximal momentum $p_{max}$.

Sequence of Haptic Effects—Heartbeat Example

Figure 32A:
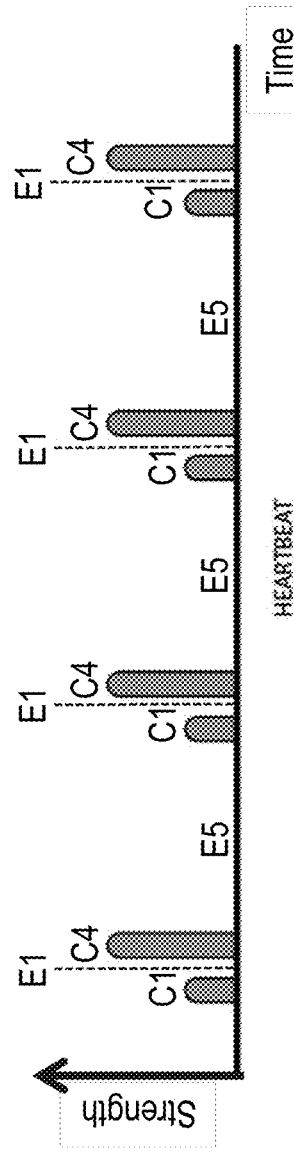
FIG. 32A is a graph showing an example of a sequence of haptic effects to simulate a real world event such as heartbeats.

FIG. 32A shows a series of identifiers over time representing a sequence of haptic effects including a first thump-bounce of a first strength, a period of silence, and a second thump-bounce of a second strength being greater than the first strength. Such a sequence may simulate a real world event resembling heartbeats, for instance. More specifically, the first thump-bounce can correspond to the first (S1 or lub) heart sound and second thump-bounce can correspond to the second (S2 or dub) heart sound. Four heartbeats are shown in FIG. 32A.

In this specific case, the controller 16 can receive data indicative of the sequence of haptic effects identifiers C1, E1, C5, E5, etc., which the controller 16 processes to activate the coil element 108 of the actuator 100 to generate a sequence of haptic effects resembling feeling a heartbeat.

Figure 32B:
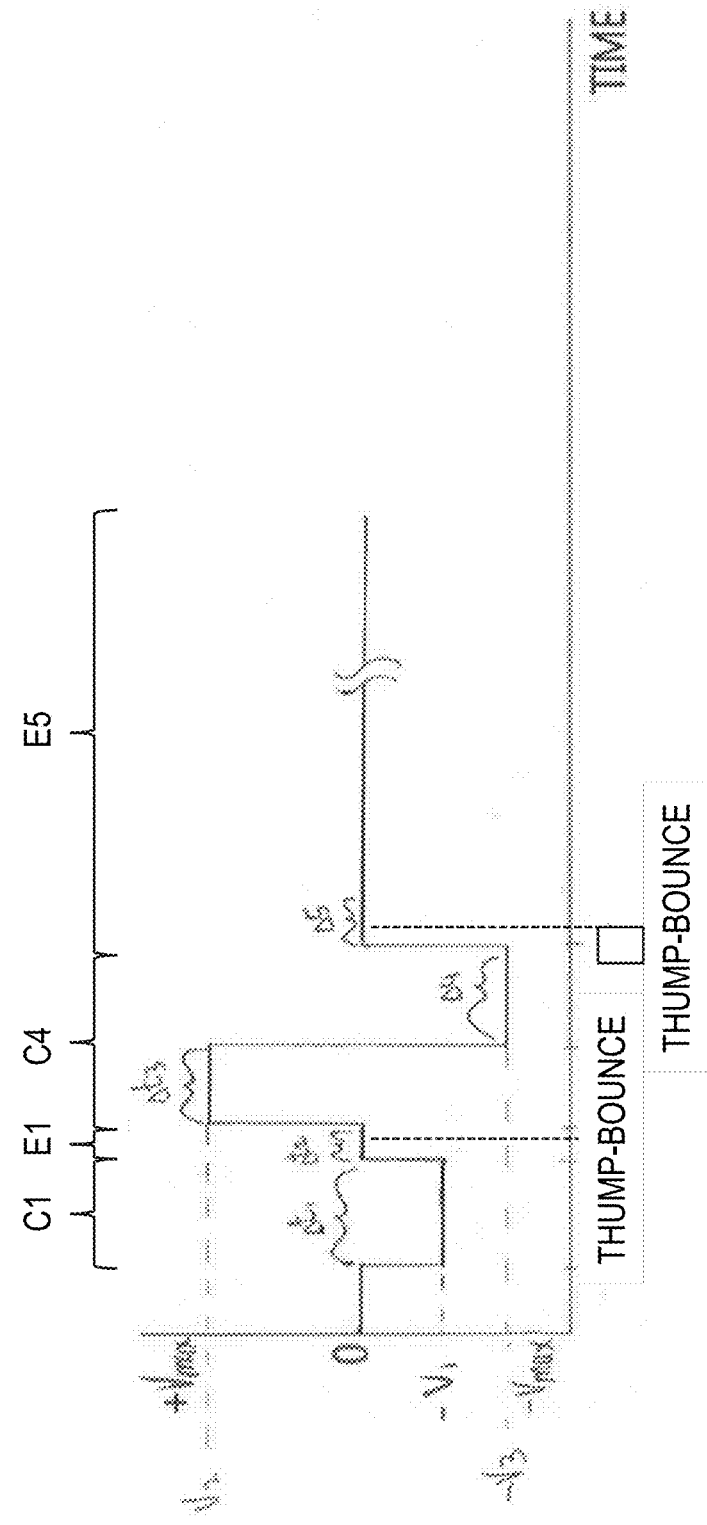
FIG. 32B is a graph showing an example of an activation function for producing the sequence of haptic effects of FIG. 32A.

FIG. 32B shows an example of an activation function representing coil activation instructions used to provide such a sequence. As depicted, to provide the first thump-bounce, the coil element 108 is first activated with a first amplitude V1 of the second polarity for a first duration $\Delta t1$ to accelerate the magnetic hammer 110 along a first acceleration length $\Delta x1$ in the second direction so that the magnetic hammer 110 reaches the damper 104 with a first momentum. Prior to the magnetic hammer 110 producing a thump, the coil element 108 is deactivated for a second duration $\Delta t2$ so as to let the magnetic hammer 110 be decelerated by the damper 104 until the magnetic hammer 110 changes direction to produce the first thump-bounce.

To provide the second thump-bounce, after the second duration $\Delta t2$ has elapsed, the coil element 108 is activated with a second amplitude V2 of the first polarity for a third duration $\Delta t3$ so as to move the magnetic hammer 110 in the first direction towards the stopper 102. Prior to the magnetic hammer 110 striking the stopper 102, the coil element 108 is activated with a third amplitude V3 of the second polarity for a fourth duration $\Delta t4$ so as to accelerate the magnetic hammer 110 along a second acceleration length $\Delta x2$ in the second direction with a second momentum so that the magnetic hammer 110 reaches a second momentum before its deceleration by the damper 104, until the magnetic hammer 110 changes direction, to produce the second thump-bounce. Prior to the magnetic hammer 110 being decelerated by the damper 104, the coil element 108 is deactivated for a fifth duration $\Delta t5$ so as to let the magnetic hammer 110 bounce after its deceleration, and change of direction due to repulsive force exerted on the magnetic hammer 110 by the damper 104.

As can be understood, in this example, the second momentum of the second thump-bounce is greater than the first momentum of the first thump-bounce as the third amplitude V3 is greater than the first amplitude V1, and as the second acceleration length $\Delta x2$ is greater than the first acceleration length $\Delta x1$.

As can be understood, when the sequence described above is repeated at regular intervals, a series of thump-bounces of increasing strengths resembling heartbeats can be produced.

Sequence of Haptic Effects—Pistol Example

FIG. 33A shows a series of identifiers distributed over time representing a sequence of successive click-bounce and thump-bounce of different strengths. The sequence including a first click-bounce of a first strength, a silence, and a second thump-bounce of a second strength being weaker than the first strength. Such a sequence may simulate a real world event resembling firing pistol shots, for instance. The first click-bounce can correspond to a round being fired whereas the quickly following second thump-bounce can correspond to the next round being chambered in the pistol. Two shots are shown in FIG. 33A.

In this specific case, the controller 16 can receive data indicative of the sequence of haptic effect identifiers A5, E1, C1, etc., which the controller 16 processes to activate the coil element 108 of the actuator 100 to generate a sequence of haptic effects resembling firing a pistol.

FIG. 33B shows an example of an activation function representing coil activation instructions used to provide such a sequence. As depicted, to provide the first click-bounce, the coil element 108 is first activated with a first amplitude V1 of the second polarity for a first duration $\Delta t1$ to accelerate the magnetic hammer 110 towards the damper 104 in order to allow a greater acceleration length $\Delta x$. Prior to the magnetic hammer 110 producing a thump, the coil element 108 is activated with a second amplitude V2 of the first polarity for a second duration $\Delta t2$ to accelerate the magnetic hammer 110 along the acceleration length $\Delta x$ in the first direction so that the magnetic hammer 110 strikes the stopper with a first momentum. Prior to the magnetic hammer 110 striking the stopper 102, the coil element 108 is deactivated for a third duration $\Delta t3$ so as to let the magnetic hammer 110 bounce after its strike on the stopper 102.

To provide the second thump-bounce, after said second duration $\Delta t2$, the coil element 108 is activated with a third amplitude V3 of the second polarity for a fourth duration $\Delta t4$ to accelerate the magnetic hammer 110 in the second direction to cause the magnetic hammer 110 to be decelerated by the damper 104. Prior to the magnetic hammer 110 producing the thump, the coil element 108 is deactivated for a fifth duration $\Delta t5$ so as to let the magnetic hammer 110 bounce after its deceleration, and thus change of direction in response to repulsive force exerted on the magnetic hammer 110 by the damper 104.

Sequence of Haptic Effects—Shotgun Example

Figure 34A:
FIG. 34A is a graph showing an example of a sequence of haptic effects to simulate a real world event such as firing a shotgun.

FIG. 34A shows a sequence of identifiers distributed over time to simulate a real world event such as firing a shotgun, for instance. In this sequence, a first click-bounce of a first strength is provided, after a silence a second thump-bounce of a second strength is provided and rapidly followed by a third click-bounce of a third strength and a fourth thump-bounce of a fourth strength. In this example, the first, second, third and fourth strengths are of decreasing strengths. In this example, the first click-bounce corresponds to a round being fired followed by other haptic effects corresponding to the pump action of the shotgun to eject a spent round and to the chambering of a fresh round.

In this specific case, the controller 16 can receive data indicative of the sequence of haptic effect identifiers A5, E3, C5, E1, A3, E1, C1, etc., which the controller 16 processes to activate the coil element 108 of the actuator 100 to generate a sequence of haptic effects resembling firing a shotgun.

Figure 34B:
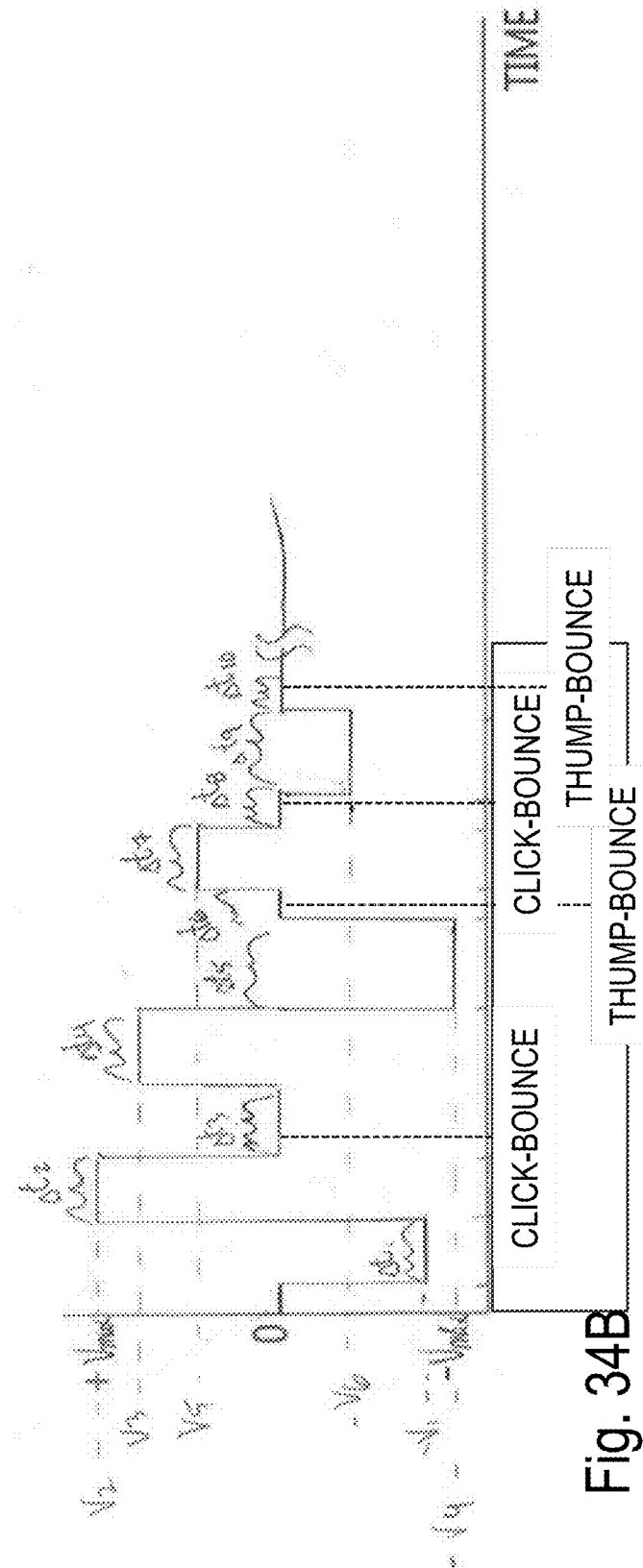
FIG. 34B is a graph showing an example of an activation function for producing the sequence of haptic effects of FIG. 34A.

FIG. 34B shows an example of an activation function representing coil activation instructions used to provide such a sequence. As depicted, to provide the first click-bounce, the coil element 108 is first activated with a first amplitude V1 of the second polarity for a first duration $\Delta t1$ to accelerate the magnetic hammer 110 towards the damper 104 in order to allow a greater first acceleration length $\Delta x1$. Prior to the magnetic hammer 110 producing a thump, the coil element 108 is activated with a second amplitude V2 of the first polarity for a second duration $\Delta t2$ to accelerate the magnetic hammer 110 along the first acceleration length $\Delta x1$ in the first direction so that the magnetic hammer 110 strikes the stopper 102 with a first momentum. Prior to the magnetic hammer 110 striking the stopper 102, the coil element 108 is deactivated for a third duration $\Delta t3$ so as to let the magnetic hammer 110 bounce after its strike on the stopper 102.

To provide the second thump-bounce, after the third duration $\Delta t3$ has elapsed, the coil element 108 is activated with a third amplitude V3 of the first polarity for a fourth duration $\Delta t4$ so as to move the magnetic hammer 110 in the first direction towards the stopper 102. Prior to the magnetic hammer 110 striking the stopper 102, the coil element 108 is activated with a fourth amplitude V4 of the second polarity for a fifth duration $\Delta t5$ so as to accelerate the magnetic hammer 110 along a second acceleration length $\Delta x2$ in the second direction towards the damper 104 so that the magnetic hammer 110 reaches a second momentum prior to being decelerated by the damper 104. Prior to the magnetic hammer 110 producing a thump, the coil element 108 is deactivated for a sixth duration $\Delta t6$ so as to let the magnetic hammer 110 bounce after its deceleration, and thus change of direction due to repulsive force exerted on the magnetic hammer 110 by the damper 104.

To provide the third click-bounce, after the sixth duration $\Delta t6$, the coil element 108 is activated with a fifth amplitude V5 of the first polarity for a seventh duration $\Delta t7$ to accelerate the magnetic hammer 110 in the first direction towards the stopper 102 so as to strike it with a third momentum. Prior to the magnetic hammer 110 striking the stopper 102, the coil element 108 is deactivated for an eighth duration $\Delta t8$ to let the magnetic hammer 110 bounce after the strike with the stopper 102.

To provide the fourth thump-bounce, after the eighth duration $\Delta t8$, the coil element 108 is activated with a sixth amplitude V6 of the second polarity to accelerate the magnetic hammer 110 towards the damper 104 so as to reach a fourth momentum prior to being decelerated until the magnetic hammer 110 changes of direction in response to repulsive force exerted on the magnetic hammer 110 by the damper 104.

As can be understood, the amplitudes and the durations during which the coil element is activated or deactivated can be adjusted to that the first, second, third and fourth momentums be decreasing. Many combinations thereof are possible to achieve a similar result. Such a sequence is described for exemplary purposes only.

Sequence of Haptic Effects—Door Opening Example

Figure 35A:
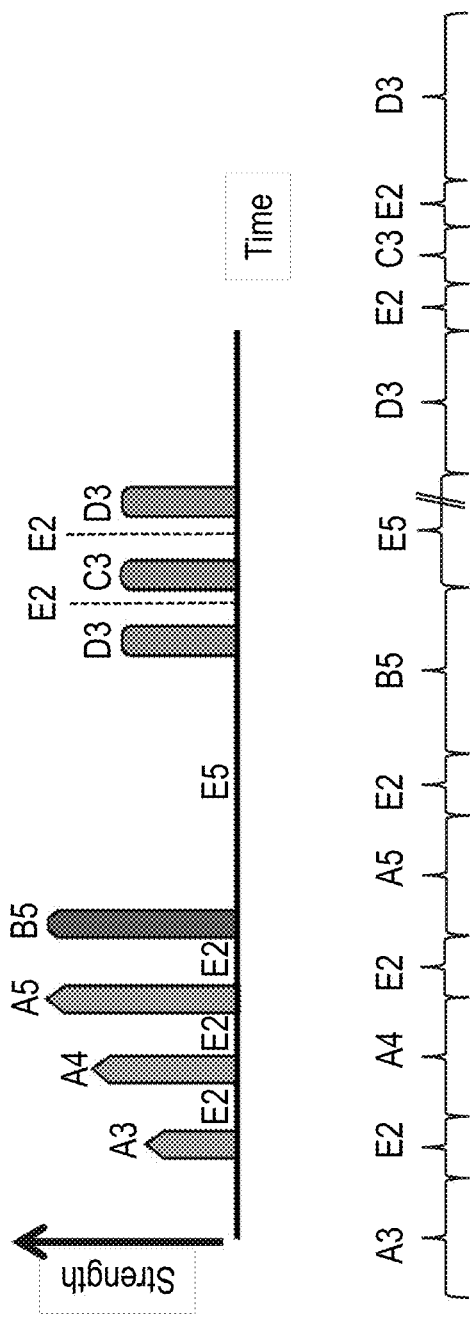
FIG. 35A is a graph showing an example of a sequence of haptic effects to simulate a real world event such as opening a door.

FIG. 35A shows a sequence of identifiers distributed over time to simulate a real world event such as knocking on a door and opening the door, for instance. In this sequence, the coil element 108 is activated so as to produce a sequence including a first click-bounce of a first strength, a second click-bounce of a second strength, a third click-bounce of a third strength, a fourth click-press of a fourth strength, followed by a fifth thump-press of a fifth strength, a sixth thump-bounce of a sixth strength and a seventh thump-press of a seventh strength. In this specific example, the first, second and third strengths are increasing from one another.

The fourth strength of the fourth thump-press is equivalent to the third strength of the third click-bounce. The fifth, sixth and seventh strengths are relatively equivalent to one another. As can be understood, such haptic effects can represent a series of knocks on a door (of escalating strength) followed by the door being opened.

In this specific case, the controller 16 can receive data indicative of the sequence of haptic effect identifiers A3, E2, A4, E2, A5, E2, B5, E5, D3, E2, C3, E2, D3, which the controller 16 processes to activate the coil element 108 of the actuator 100 to generate a sequence of haptic effects resembling knocking on a door and then opening the door.

Figure 35B:
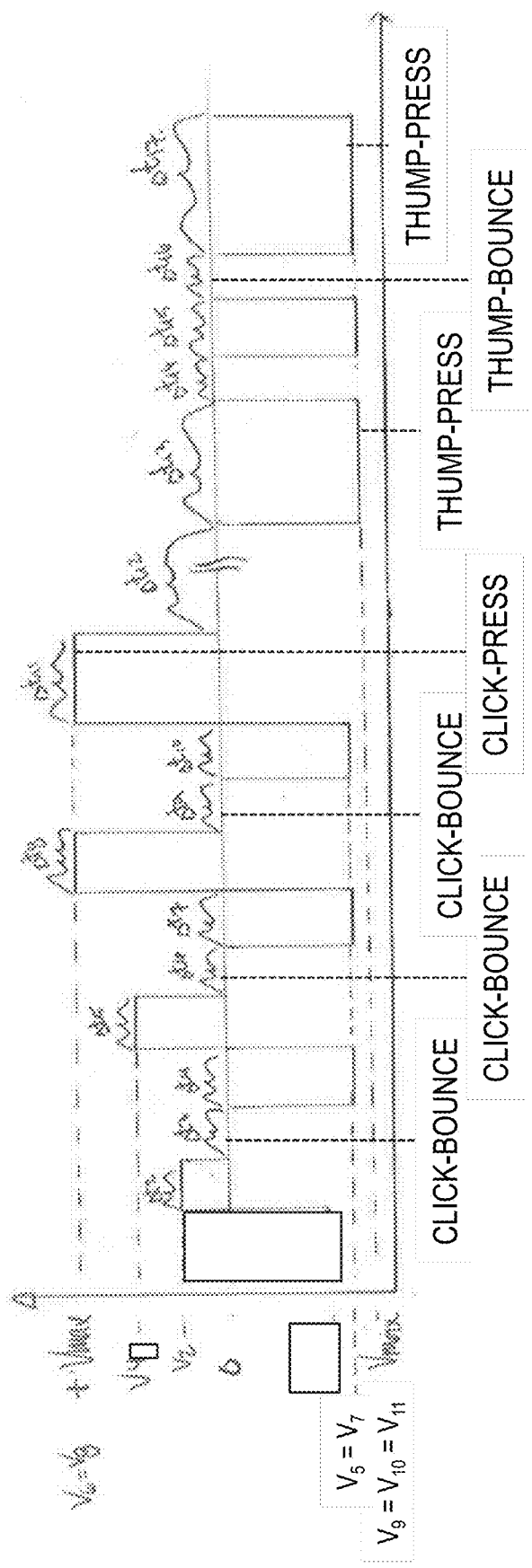
FIG. 35B is a graph showing an example of an activation function for producing the sequence of haptic effects of FIG. 35A.

FIG. 35B shows an example of an activation function representing coil activation instructions used to provide such a sequence. As illustrated, to provide the first click-bounce, the coil element 108 is first activated with a second amplitude V2 of the first polarity for a second duration $\Delta t2$ to accelerate the magnetic hammer 110 along the first acceleration length $\Delta x1$ in the first direction so that the magnetic hammer 110 strikes the stopper 102 with a first momentum. Prior to the magnetic hammer 110 striking the stopper 102, the coil element 108 is deactivated for a third duration $\Delta t3$ so as to let the magnetic hammer 110 bounce after its strike on the stopper 102.

To provide the second click-bounce, the coil element 108 is activated with a third amplitude V3 of the second polarity for a fourth duration $\Delta t4$ to accelerate the magnetic hammer 110 towards the damper 104 in order to allow the first acceleration length $\Delta x1$. Prior to the magnetic hammer 110 producing a thump, the coil element 108 is activated with a fourth amplitude V4 of the first polarity for a fifth duration $\Delta t5$ to accelerate the magnetic hammer 110 along a second acceleration length $\Delta x2$ in the first direction so that the magnetic hammer 110 strikes the stopper 102 with a second momentum. Prior to the magnetic hammer 110 striking the stopper 102, the coil element 108 is deactivated for a sixth duration $\Delta t6$ so as to let the magnetic hammer 110 bounce after its strike on the stopper 102.

As will be understood, the third amplitude V3 being greater than the first amplitude V1 allows the magnetic hammer 110 to be accelerated along the second acceleration length $\Delta x2$ which is greater than the first acceleration length $\Delta x1$, and thus enables the second momentum of the second click-bounce to be greater than the first momentum of the first click-bounce. Moreover, the fourth amplitude V4 being greater than the second amplitude V2 can also contribute in providing a greater momentum to the second click-bounce than to the first click-bounce.

Similarly, to provide the third click-bounce, the coil element 108 is activated with a fifth amplitude V5 of the second polarity for a seventh duration $\Delta t7$ to accelerate the magnetic hammer 110 towards the damper 104 in order to allow the second acceleration length $\Delta x2$ again. Prior to the magnetic hammer 110 producing a thump, the coil element 108 is activated with a sixth amplitude V6 of the first polarity for an eighth duration $\Delta t8$ to accelerate the magnetic hammer 110 along the second acceleration length $\Delta x2$ in the first direction so that the magnetic hammer 110 strikes the stopper 102 with a third momentum. Prior to the magnetic hammer 110 striking the stopper 102, the coil element 108 is deactivated for a ninth duration $\Delta t9$ so as to let the magnetic hammer 110 bounce after its strike on the stopper 102.

In this example, the third amplitude V3 is similar to the fifth amplitude V5, thereby allowing the magnetic hammer 110 to be accelerated along the second acceleration length $\Delta x2$ in both cases. However, as can be understood, the sixth amplitude V6 being greater than the fourth amplitude V4 contributes in providing a greater momentum to the third click-bounce than to the second click-bounce.

To provide the fourth click-press, the coil element 108 is activated with a seventh amplitude V7 of the second polarity for a tenth duration $\Delta t10$ to accelerate the magnetic hammer 110 towards the damper 104 in order to allow the second acceleration length $\Delta x2$ again. Prior to the magnetic hammer 110 producing a thump, the coil element 108 is activated with an eighth amplitude V8 of the first polarity for an eleventh duration $\Delta t11$ to accelerate the magnetic hammer 110 along the second acceleration length $\Delta x2$ in the first direction so that the magnetic hammer 110 strikes the stopper 102 with a fourth momentum. As depicted, the eleventh duration $\Delta t11$ is greater than the eighth duration $\Delta t8$, which causes the magnetic hammer 110 in this embodiment to be maintained and pressed against the stopper 102 after the strike, to provide a different haptic feedback.

After a twelfth duration $\Delta t12$ has elapsed, the fifth thump-press can be produced. To do so, the coil element 108 is activated with a ninth amplitude V9 of the second polarity for a thirteenth duration $\Delta t13$ so that the magnetic hammer 110 be accelerated in the second direction towards the damper 104 so as to produce a thump. The thirteenth duration $\Delta t13$ is long enough so as to maintain the magnetic hammer 110 pressed towards the damper 104 for a given duration after the deceleration of the magnetic hammer 110.

After a fourteenth duration $\Delta t14$ has elapsed, the sixth thump-bounce can be produced by activating the coil element 108 with a tenth amplitude V10 for a fifteenth duration $\Delta t15$ so that the magnetic hammer 110 be accelerated in the second direction towards the damper 104 so as to produce a thump. Prior to the magnetic hammer 110 producing the thump, the coil element 108 is deactivated for a sixteenth duration $\Delta t16$ so as to let the magnetic hammer 110 bounce after its deceleration.

Similarly, after the sixteenth duration $\Delta t16$ has elapsed, the seventh thump-press can be produced. To do so, the coil element 108 is activated with an eleventh amplitude V11 for a seventeenth duration $\Delta t17$ so that the magnetic hammer 110 be accelerated in the second direction towards the damper 104 so as to produce a thump. The seventeenth duration $\Delta t17$ is long enough in this example so as to maintain the magnetic hammer 110 pressed towards the damper 104 for a moment after the deceleration of the magnetic hammer 110.

As will be understood, in this embodiment, the third, fifth and seventh amplitudes are equivalent to one another, the sixth and eighth amplitudes are equivalent to one another, and the ninth, tenth and eleventh amplitudes are equivalent to one another. However, this may differ in some other embodiments.

As can be understood, the examples described above and illustrated are intended to be exemplary only. For instance, although the illustrated embodiments show that the activation of the coil element in either the first polarity or the second polarity is performed with square-waves, it is envisaged that the activation of the coil element in either the first polarity or the second polarity can be performed using other types of functions. For instance, the amplitude with which the coil element is activated can be ramped up progressively in a linear or curvilinear fashion. The scope is indicated by the appended claims.

What is claimed is:

1. A method of operating a tactile feedback actuator with a controller, the tactile feedback actuator having a magnetic hammer guidingly mounted for movement along a hammer path, a damper at a first end of the hammer path, a stopper at a second end of the hammer path, and a coil element, the method comprising:

the controller receiving data indicative of coil activation instructions for moving the magnetic hammer to generate a sequence of haptic effects that simulate a real world event, the coil activation instructions including:
  a first instruction for generating a first haptic effect by activating the coil element for an instructed amplitude at a first polarity for an instructed duration to accelerate the magnetic hammer in a first direction towards the stopper along the hammer path and resulting in the magnetic hammer striking the stopper, and
  a second instruction for generating a second haptic effect by activating the coil element for an instructed amplitude at a second polarity for an instructed duration to accelerate the magnetic hammer in a second direction towards the damper along the hammer path and resulting in the magnetic hammer decelerating as the magnetic hammer is longitudinally slid towards the damper; and
the controller activating the coil element upon processing the data indicative of the coil activation instructions to generate the sequence of haptic effects.

2. The method of claim 1 wherein the data identify a selection of the first haptic effect and the second haptic effect from a database of pre-programmed haptic effects.

3. The method of claim 2 wherein the database of pre-programmed haptic effects comprises instructions for generating corresponding pre-programmed haptic effects at a plurality of different strengths.

4. The method of claim 1 wherein the data includes a first haptic effect identifier indicative of the first haptic effect and a second haptic effect identifier indicative of the second haptic effect, said processing including determining the first and second instructions based on the first and second haptic effect identifiers using a database of pre-programmed haptic effects.

5. The method of claim 1 wherein the data identify a selection of the sequence of haptic effects from a database of pre-programmed sequences of haptic effects.

6. The method of claim 1 wherein the data identify a selection of the real world event from a database of pre-programmed real world events, the database having instructions for sequentially generating the haptic effects of the sequence of each of the pre-programmed real world events.

7. The method of claim 1 wherein the data includes a real world event identifier indicative of the sequence of haptic effects to generate, said processing including determining the first and second instructions based on the real world event identifier using a database of pre-programmed real world events.

8. The method of claim 1 wherein the first haptic effect is a click-bounce.

9. The method of claim 1 wherein the first haptic effect is a click-press.

10. The method of claim 1 wherein the second haptic effect is a thump-bounce.

11. The method of claim 1 wherein the real world event to be simulated is firing a pistol.

12. The method of claim 1 wherein the real world event to be simulated is firing a shotgun.

13. The method of claim 1 wherein the real world event to be simulated is knocking on a door.

14. A computer-readable memory having stored thereon instructions executable by a computer to operate a tactile feedback actuator to generate a sequence of haptic effects that simulate a real world event, the tactile feedback actuator having a magnetic hammer guidingly mounted for movement along a hammer path, a damper at a first end of the hammer path, a stopper at a second end of the hammer path, and a coil element, the instructions comprising:
  a first instruction for generating a first haptic effect by activating the coil element for an instructed amplitude at a first polarity for an instructed duration to accelerate the magnetic hammer in a first direction towards the stopper along the hammer path and resulting in the magnetic hammer striking the stopper, and
  a second instruction for generating a second haptic effect by activating the coil element for an instructed amplitude at a second polarity for an instructed duration to accelerate the magnetic hammer in a second direction towards the damper along the hammer path and resulting in the magnetic hammer decelerating as the magnetic hammer is longitudinally slid towards the damper.

15. The computer-readable memory of claim 14 further comprising a database of pre-programmed haptic effects stored on the computer-readable memory, the database having an instruction for generating each of the pre-programmed haptic effects.

16. The computer-readable memory of claim 14 further comprising a database of pre-programmed real world events stored on the computer-readable memory, the database having instructions for sequentially generating the haptic effects of the sequence of each of the pre-programmed real world events.

17. The computer-readable memory of claim 14 wherein the real world event to be simulated is firing a pistol.

18. The computer-readable memory of claim 14 wherein the real world event to be simulated is firing a shotgun.

19. The computer-readable memory of claim 14 wherein the real world event to be simulated is knocking on a door.

20. The computer-readable memory of claim 14 wherein the real world event to be simulated is opening a door.

* * * * *